United States Patent

Mizobe et al.

[11] Patent Number: 6,059,862
[45] Date of Patent: May 9, 2000

[54] SEPARATION MODULE PROVIDED WITH ANTISTATIC DEVICE

[76] Inventors: Kunitaka Mizobe, 1-6-7, Hoshikuma Jyonann-ku, Fukuoka-shi, Fukuoka, 814-01; Shohei Kato, 3-21-11, Kawaturu, Kawagoe-shi, Saitama, 350-11, both of Japan

[21] Appl. No.: 09/101,137

[22] PCT Filed: Dec. 27, 1996

[86] PCT No.: PCT/JP96/03882

§ 371 Date: Jun. 26, 1998

§ 102(e) Date: Jun. 26, 1998

[87] PCT Pub. No.: WO97/24171

PCT Pub. Date: Jul. 10, 1997

[30] Foreign Application Priority Data

Dec. 28, 1995 [JP] Japan .................. 7-352644

[51] Int. Cl.[7] .................................... B01D 53/22
[52] U.S. Cl. ................... 96/7; 95/52; 96/13; 55/360
[58] Field of Search ................ 55/360; 95/52; 96/4, 7–13

[56] References Cited

U.S. PATENT DOCUMENTS

| 693,638 | 2/1902 | Breuer ............................. 96/4 X |
|---|---|---|
| 4,280,909 | 7/1981 | Deutsch .......................... 96/13 X |
| 4,583,996 | 4/1986 | Sakata et al. .................... 95/52 X |
| 5,066,683 | 11/1991 | Dillon et al. ..................... 95/52 X |
| 5,154,740 | 10/1992 | Motoniaga et al. ................ 96/12 |
| 5,157,058 | 10/1992 | Dillon et al. ..................... 95/52 X |
| 5,316,568 | 5/1994 | Brown ............................ 96/4 X |
| 5,431,864 | 7/1995 | Rao et al. ....................... 96/11 X |
| 5,487,774 | 1/1996 | Peterson et al. ................. 96/11 X |
| 5,575,835 | 11/1996 | Bailey et al. .................... 95/52 X |
| 5,665,146 | 9/1997 | Mizobe ........................... 96/7 |

FOREIGN PATENT DOCUMENTS

| 0322866 | 7/1989 | European Pat. Off. ............ 96/12 |
|---|---|---|
| 3719118 | 12/1988 | Germany ........................ 96/13 |
| 59-112802 | 6/1984 | Japan ............................ 96/12 |
| 60-102902 | 6/1985 | Japan ............................ 96/14 |
| 1-094917 | 4/1989 | Japan ............................ 96/12 |
| 2-280812 | 11/1990 | Japan ............................ 96/4 |
| 4-156915 | 5/1992 | Japan ............................ 96/4 |
| 5-115735 | 5/1993 | Japan ............................ 96/4 |
| 7-68124 | 3/1995 | Japan . |
| 8-206438 | 8/1996 | Japan . |
| 8-323132 | 12/1996 | Japan . |
| 1662603 | 7/1991 | U.S.S.R. ........................ 96/4 |

OTHER PUBLICATIONS

The Static Electricity Handbook, 11th ed., pp. 72–73 by Chijin Syokan printed in Japan, ISBN 4–8052–0017–0 C3042 (3 sheets).

Journal of Applied Meteorology, vol. 15, pp. 282–291 (Mar., 1976) A Numerical Simulation of Warm Fog Dissipation by Electrically Enhanced Coalescence: Part I. An Applied Electric Field (10 sheets).

(List continued on next page.)

*Primary Examiner*—Robert H. Spitzer
*Attorney, Agent, or Firm*—Flynn, Thiel, Boutell & Tanis, P.C.

[57] ABSTRACT

This invention relates to a miniaturizable separation module (dehumidifier, humidifier) utilizing the gas separation property of waterproof membranes having fine moisture-permeable through holes. The separation module according to the invention comprises: a cylindrical casing 10 installed at the wall of a moisture-proof and drip-proof box 4, so as to form a gas passage communicating the inside and the outside of the box; a plurality of waterproof membranes 1, 2, 3, having fine moisture-permeable through holes, disposed in the cylindrical casing at intervals of spacing, so as to form chambers 5, 6 in the gas passage; and conductive porous structures disposed in proximity of the waterproof membranes. The longitudinal section of the solid portion around the holes of the conductive porous structure is formed into an essentially egg-like shape, and the acute angle side of the egg-like longitudinal sectional shape is disposed so as to direct to the waterproof membrane.

5 Claims, 63 Drawing Sheets

OTHER PUBLICATIONS

Transport Phenomena, 8th ed., pp. 316–323 by Sangyo Tosyo (ISBN 4–7828–2520–X C3058) (1981) (10 sheets).

Corrosion Chemistry and Anticorrosion Technology, Corona Co., Ltd., p. 88 (ISBN 4–339–04290–0), Corrosion Science and Engineering ©Goro Ito 1979 (3 sheets).

Kyoritsu Publishing Co. Chemical Dictionary, 4th vol., 23rd printing p. 651 (3543–310044–1371) ©(1963) (3 sheets).

Acoustic Engineering of Mechanical System, Corona Co. Ltd. 1st printing, pp. 123–124, Acoustical Engineering ©Reyoichi Ichimiya 1992 (4 sheets).

Fig.1
(a)

| a | b | c | d | e | f | g | h | i | j | k | l | m | n | o | p | q | r | s |
|---|---|---|---|---|---|---|---|---|---|---|---|---|---|---|---|---|---|---|
| TIME VALUE | BOX C. | BOX RH. | INNER CHAMBER C. | INNER CHAMBER RH. | INNER SUPPORT BOX C. | INNER SUPPORT BOX RH. | OUTER CHAMBER C. | OUTER CHAMBER RH. | OUTER SUPPORT BOX C. | OUTER SUPPORT BOX RH. | OUT-SIDE C. | OUT-SIDE RH. | SUR-FACE VOLTAGE OF MEMBRANE 1 | SUR-FACE VOLTAGE OF MEMBRANE 1 | SUR-FACE VOLTAGE OF MEMBRANE 2 | SUR-FACE VOLTAGE OF MEMBRANE 2 | SUR-FACE VOLTAGE OF MEMBRANE 3 | SUR-FACE VOLTAGE OF MEMBRANE 3 |
| 0.896527778 | 20.2 | 99.0 | 21.3 | 65.6 | 67.1 | 20.7 | 21.4 | 60.7 | 20.9 | 67.4 | 19.9 | 67.5 | −0.5 | −13.0 | −3.0 | −15.7 | 11.4 | −8.7 |
| 0.952083333 | 20.3 | 97.0 | 21.3 | 65.7 | 67.1 | 20.8 | 21.4 | 60.9 | 20.9 | 67.5 | 20.0 | 67.8 | −0.3 | −12.0 | −2.4 | −15.6 | 11.6 | −6.3 |
| 0.007638889 | 20.3 | 95.9 | 21.4 | 65.8 | 67.0 | 20.0 | 21.4 | 61.1 | 20.9 | 67.4 | 20.1 | 67.8 | −0.7 | −13.4 | −2.4 | −16.0 | 12.5 | −8.6 |
| 0.063194444 | 20.4 | 95.2 | 21.4 | 65.8 | 66.9 | 20.8 | 21.4 | 61.1 | 20.9 | 67.3 | 20.1 | 68.0 | −0.2 | −13.0 | −2.7 | −15.6 | 11.3 | −7.5 |
| 0.11875 | 20.3 | 94.4 | 21.4 | 65.7 | 66.9 | 20.8 | 21.4 | 61.0 | 20.9 | 67.2 | 20.0 | 68.0 | −0.3 | −12.3 | −2.8 | −15.7 | 11.7 | −7.4 |
| 0.174305556 | 20.3 | 93.6 | 21.4 | 65.6 | 66.8 | 20.8 | 21.4 | 61.2 | 20.9 | 67.1 | 20.0 | 68.1 | −0.3 | −13.0 | −2.3 | −16.1 | 13.0 | −9.6 |
| 0.229986111 | 20.3 | 93.0 | 21.4 | 65.6 | 66.8 | 20.0 | 21.4 | 61.3 | 20.9 | 67.0 | 20.0 | 68.2 | 0.0 | −13.0 | −2.2 | −15.5 | 12.6 | −6.3 |
| 0.285416667 | 20.3 | 92.3 | 21.4 | 65.6 | 66.7 | 20.8 | 21.4 | 61.4 | 20.9 | 67.0 | 20.0 | 68.4 | −0.1 | −12.8 | −2.2 | −15.8 | 12.8 | −8.5 |
| 0.340972222 | 20.3 | 91.6 | 21.3 | 65.6 | 66.6 | 20.7 | 21.3 | 61.4 | 20.9 | 67.0 | 19.9 | 68.7 | −0.2 | −13.2 | −2.1 | −15.9 | 12.8 | −5.9 |
| 0.396527778 | 20.1 | 91.5 | 21.3 | 65.2 | 66.4 | 20.7 | 21.3 | 60.8 | 20.9 | 66.8 | 19.5 | 68.8 | −0.2 | −12.8 | −2.5 | −15.9 | 11.9 | −7.3 |

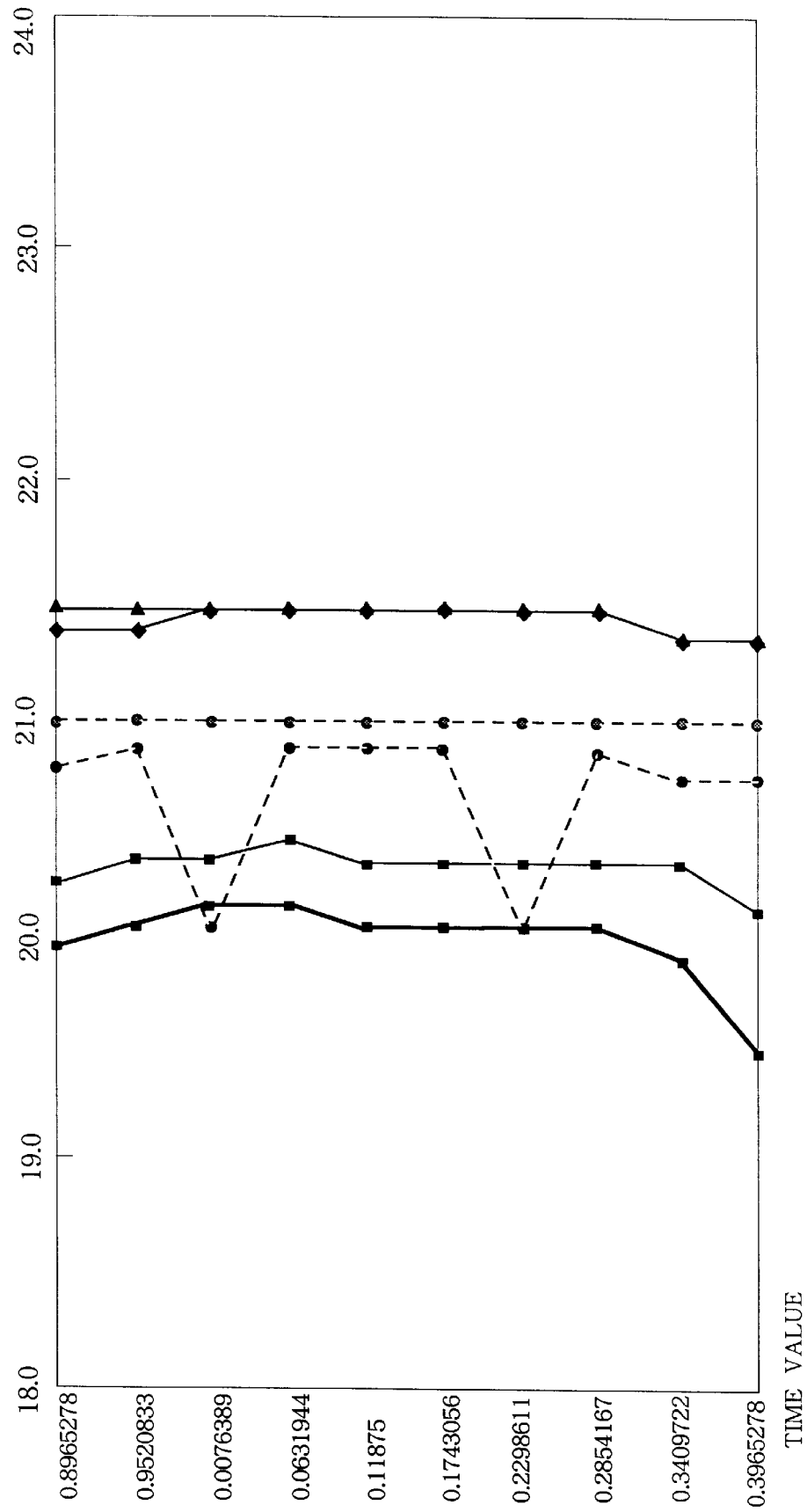

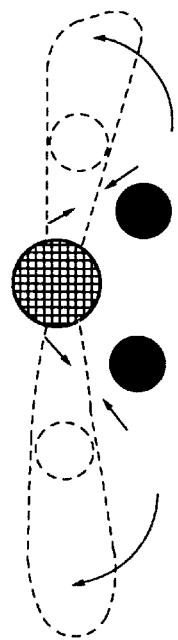
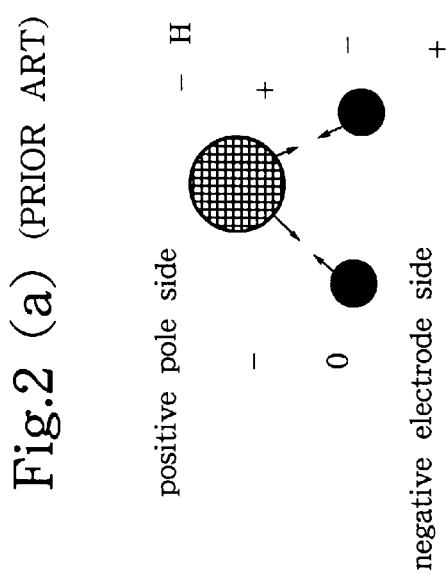
Fig.2 (a) (PRIOR ART) — a schematic showing an orientation under electrical field
Fig.2 (b) (PRIOR ART) — a schematic diagram showing electron cloud

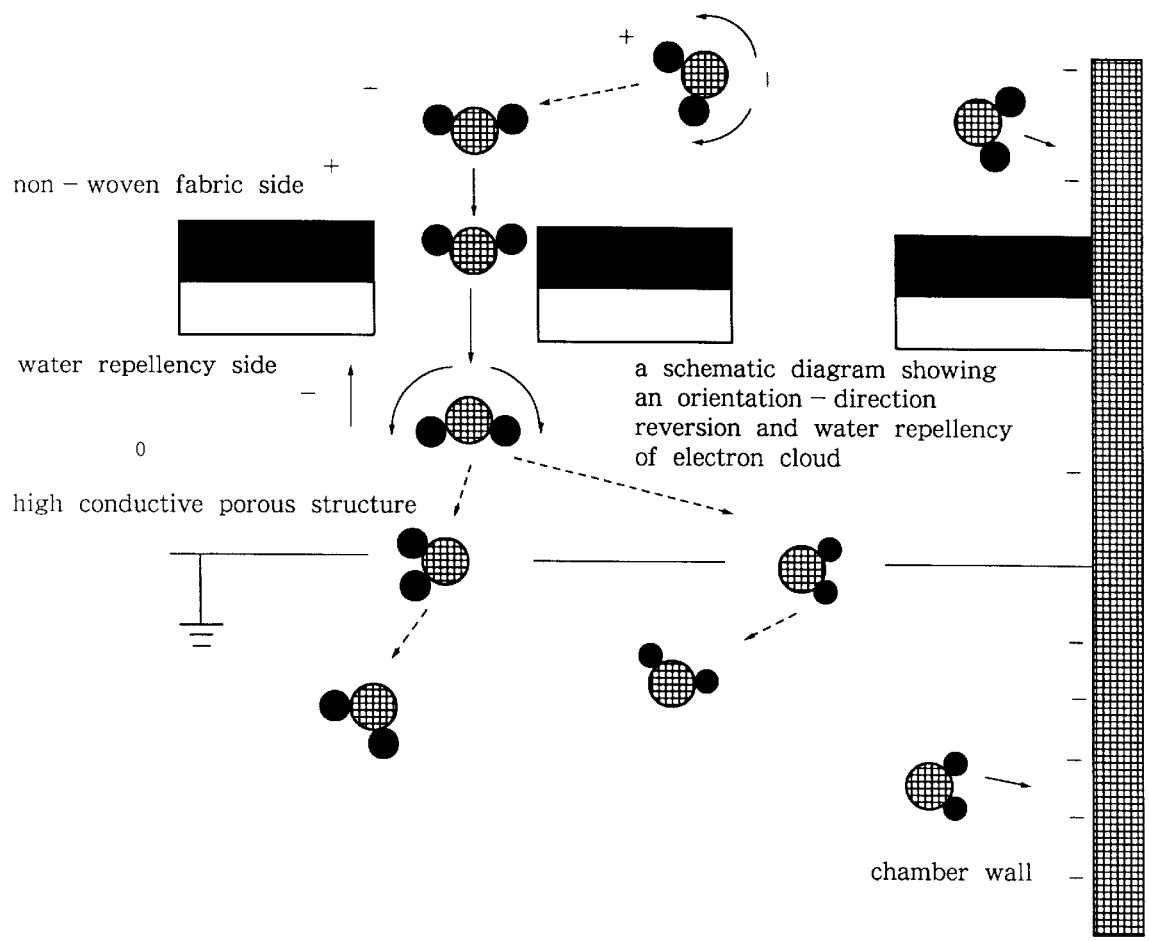
Fig.2 (c) (PRIOR ART)
a schematic diagram showing an orientation-direction reversion and water repellency of electron cloud

Fig.3 (a)

| TIME VALUE | BOX C. | BOX RH. | INNER CHAMBER C. | INNER CHAMBER RH. | INNER SUPPORT BOX C. | INNER SUPPORT BOX RH. | OUTER CHAMBER C. | OUTER CHAMBER RH. | OUTER SUPPORT BOX C. | OUTER SUPPORT BOX RH. | OUTSIDE C. | OUTSIDE RH. | SURFACE VOLTAGE OF MEMBRANE 1 | SURFACE VOLTAGE OF MEMBRANE 1 | SURFACE VOLTAGE OF MEMBRANE 2 | SURFACE VOLTAGE OF MEMBRANE 2 | SURFACE VOLTAGE OF MEMBRANE 3 | SURFACE VOLTAGE OF MEMBRANE 3 |
|---|---|---|---|---|---|---|---|---|---|---|---|---|---|---|---|---|---|---|
| 0.9604166667 | 19.4 | 98.5 | 20.5 | 71.4 | 20.4 | 67.9 | 20.8 | 67.9 | 20.5 | 70.5 | 19.4 | 75.7 | −0.3 | −13.5 | −2.1 | −15.9 | 14.8 | −8.4 |
| 0.0159722222 | 19.3 | 96.2 | 20.5 | 70.7 | 20.3 | 67.7 | 20.7 | 67.3 | 20.4 | 70.3 | 19.3 | 75.5 | −0.1 | −12.9 | −2.1 | −15.5 | 14.9 | −9.9 |
| 0.0715277778 | 19.2 | 94.9 | 20.5 | 70.2 | 20.3 | 67.6 | 20.6 | 66.9 | 20.4 | 70.3 | 19.3 | 75.1 | −0.5 | −13.9 | −2.5 | −15.7 | 14.7 | −6.6 |
| 0.1270833333 | 19.0 | 93.7 | 20.5 | 69.7 | 20.3 | 67.5 | 20.6 | 66.4 | 20.3 | 70.2 | 19.2 | 74.6 | −0.2 | −14.2 | −2.6 | −16.2 | 14.2 | −6.4 |
| 0.1826388889 | 19.0 | 92.3 | 20.5 | 69.5 | 20.3 | 67.5 | 20.6 | 66.3 | 20.1 | 70.0 | 18.3 | 74.3 | 0.1 | −13.1 | −2.3 | −15.6 | 14.7 | −7.2 |
| 0.2381944444 | 19.0 | 91.0 | 20.5 | 69.5 | 20.3 | 67.4 | 20.6 | 66.3 | 20.1 | 70.0 | 19.3 | 74.1 | −0.1 | −14.3 | −2.1 | −15.0 | 15.4 | −7.6 |
| 0.29375 | 19.2 | 90.3 | 20.5 | 69.3 | 20.3 | 67.3 | 20.6 | 66.1 | 20.2 | 69.8 | 19.3 | 73.9 | 0.0 | −12.0 | −2.4 | −15.7 | 14.7 | −6.7 |
| 0.3493055556 | 19.2 | 89.7 | 20.5 | 69.1 | 20.3 | 67.2 | 20.6 | 65.9 | 20.3 | 69.8 | 19.3 | 73.7 | −0.2 | −13.5 | −2.6 | −15.8 | 14.5 | −7.3 |
| 0.4048611111 | 19.3 | 89.1 | 20.5 | 68.8 | 20.3 | 67.3 | 20.6 | 65.7 | 20.3 | 69.6 | 19.3 | 73.5 | −0.4 | −13.9 | −2.8 | −15.9 | 15.7 | −9.6 |
| 0.4604166667 | 18.9 | 89.2 | 20.3 | 67.9 | 20.2 | 67.0 | 20.4 | 64.6 | 20.1 | 69.4 | 18.6 | 73.9 | −1.3 | −13.8 | −3.4 | −16.4 | 14.5 | −8.6 |

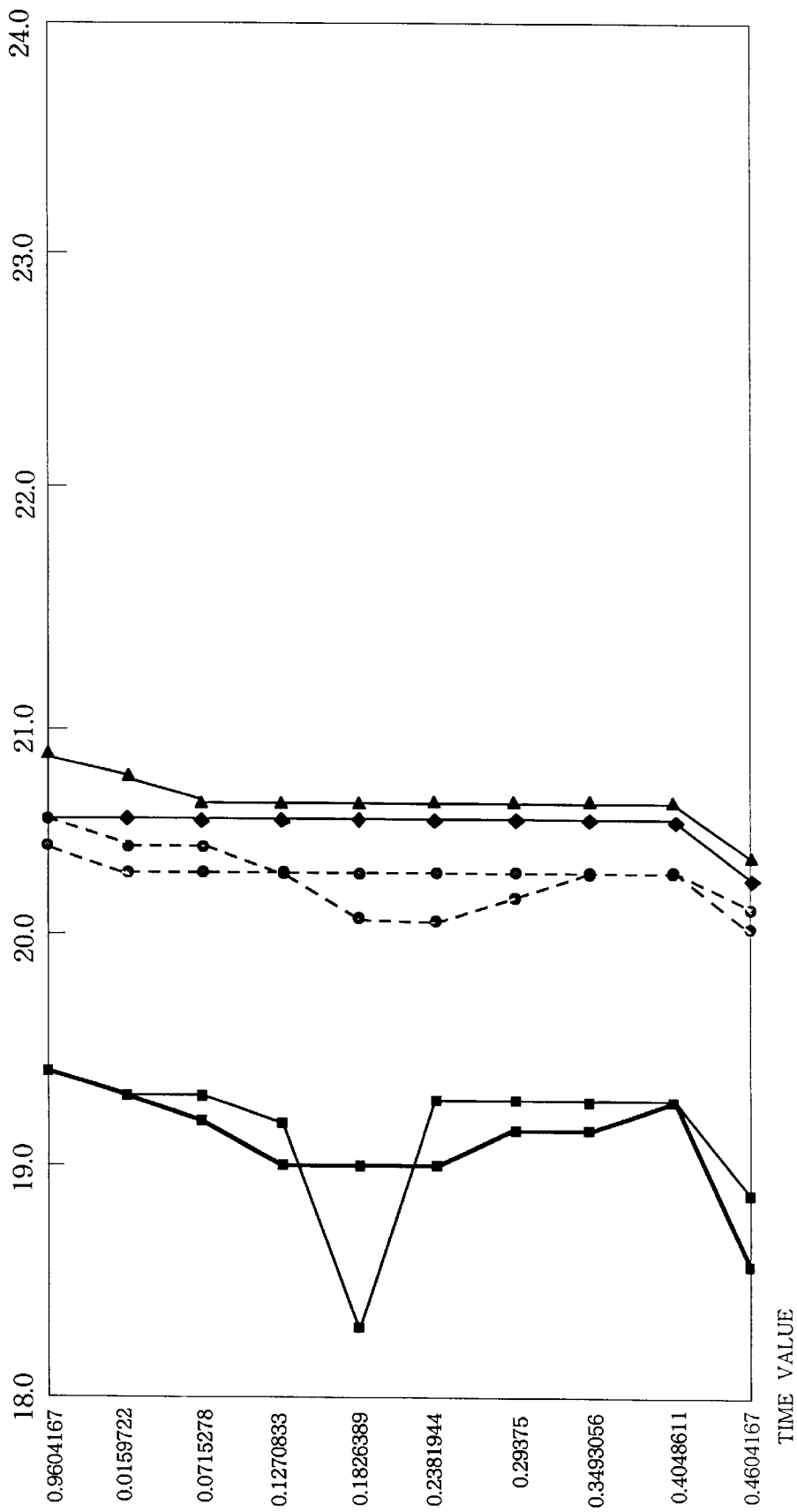

Fig.4 (PRIOR ART)

| | (+) | (+) | (+) | (+) | (+) | (+) | (+) | (+) | (+) | (+) | (+) |
|---|---|---|---|---|---|---|---|---|---|---|---|
| | Polished glass | Cat fur | Cat fur Glass | Asbestos Men's hair Glass Mica Wool | Asbestos Glass Mica | Glass Men's hair | | | | Glass Hard hair Nylon Wool | Mica |
| | Wool | Cat fur | Wool | | Wool | Nylon thread | Wool | Wool | | | |
| | Feather for quills | Flint glass | Feather | | Cat fur | Nylon polymer | Nylon | Nylon | | Rayon | |
| Pb | | Cotton Hemp | | | Lead Silk | Wool | Viscose | Viscose | Ethyl cellulose | | |
| | Wood | Men's skin Wood | Wood | Silk | Aluminum | Silk Viscose rayon | Silk Viscose | Cotton Silk | | Silk fabric | Acrylic |
| | | | | Aluminum Zinc, Cadmium, Chrome | | Cotton Paper | Men's skin Glass fiber, Cotton,Glass | Acetate Lucite PVAL | Casein Perspex | Rayon acetate Orlon Orlon/ Cottonmixed Pulp and Filter paper | |
| Cd Zn Al | Paper | | Paper Silk Resin Polished glass | Felter paper | Paper | | | | | | |
| Cr | Sealing wax White wax Unpolished glass | | | Ebonite | Cotton Sealing wax Ebonite | Hemp | Dacron Chromium | Dacron | Ebonite Cellulose acetate Glass | | Amber |
| Fe Cu Ni Ag Au | Lead Sulfur | Fe,Cu,Ag, Pb,Sulfer | | Silk,Copper Silver brass Sulfur | Brass Sulfur Platinum | Hemp Steel Hard rubber Rayon acetate Synthetic rubber | | | Metal | Black rubber Terylne (Mitsubishi) | |
| Pt | Other metals | | | | | | | | | | |
| | | | | Celluoid Indian rubber | Indian rubber | Orlon (Acrylic fiber) SARAN Polyethylene | Orlon Polyethylene | Orlon Daynel Polyethylene Teflon Cellulose nitrate | Polyethylene Polyethylene Teflon | SARAN Dacron Terylene (ICI) Celluloid Polyethylene Kanekalon Celluloid Cellophane Vinylchloride and Rabello Teflon | Polyethylene Teflon |
| | (−) | (−) | (−) | (−) | (−) | (−) | (−) | (−) | (−) | (−) | (−) |
| | 1756 WILCHE | 1840 FARADAY | 1949 IAMAIN BOUTY PHYSIQUE | 1917 SHAW | 1924 SILABEF | 1949 Lehmicke | 1954 BALLOU | 1955 HERASH MONTGOMERY | 1957 ROSE WARD | 1958 T.Kitagawa | 1959 FUKADA FOWLER |

Fig.5 (a)

| TIME VALUE | BOX C. | BOX RH. | INNER CHAMBER C. | INNER CHAMBER RH. | INNER SUPPORT BOX C. | INNER SUPPORT BOX RH. | OUTER CHAMBER C. | OUTER CHAMBER RH. | OUTER SUPPORT BOX C. | OUTER SUPPORT BOX RH. | OUT-SIDE C. | OUT-SIDE RH. | SUR-FACE VOLTAGE OF MEMBRANE 1 | SUR-FACE VOLTAGE OF MEMBRANE 1 | SUR-FACE VOLTAGE OF MEMBRANE 2 | SUR-FACE VOLTAGE OF MEMBRANE 2 | SUR-FACE VOLTAGE OF MEMBRANE 3 | SUR-FACE VOLTAGE OF MEMBRANE 3 |
|---|---|---|---|---|---|---|---|---|---|---|---|---|---|---|---|---|---|---|
| 0.403472222 | 19.0 | 93.3 | 20.6 | 70.9 | 20.3 | 65.0 | 20.8 | 69.1 | 20.3 | 70.9 | 19.3 | 79.5 | -1.5 | -18.5 | -1.8 | -14.8 | 9.3 | -7.3 |
| 0.459027778 | 19.4 | 86.2 | 20.5 | 82.4 | 20.2 | 64.7 | 20.7 | 88.6 | 20.1 | 71.5 | 19.8 | 96.9 | 1.8 | -11.5 | -0.8 | -14.2 | 12.4 | -2.6 |
| 0.514583333 | 19.7 | 78.8 | 20.6 | 85.0 | 20.2 | 64.7 | 20.7 | 91.3 | 20.4 | 71.8 | 20.0 | 97.7 | 1.9 | -12.5 | -0.6 | -14.1 | 12.4 | -1.4 |
| 0.570138889 | 19.8 | 76.7 | 20.6 | 85.8 | 20.4 | 64.8 | 21.2 | 92.1 | 20.9 | 72.1 | 20.2 | 98.4 | 1.9 | -11.1 | -0.6 | -13.8 | 13.7 | -1.1 |
| 0.625694444 | 20.2 | 74.0 | 20.8 | 86.3 | 20.7 | 65.0 | 21.2 | 93.0 | 20.9 | 72.4 | 20.5 | 98.7 | 2.3 | -11.5 | -0.3 | -13.3 | 12.7 | -0.1 |
| 0.68125 | 20.3 | 72.8 | 21.0 | 85.8 | 21.1 | 65.1 | 21.6 | 91.5 | 20.9 | 72.6 | 20.6 | 98.8 | 2.0 | -11.4 | -0.2 | -13.6 | 12.9 | -1.5 |
| 0.736805556 | 20.2 | 71.8 | 21.0 | 84.5 | 21.1 | 65.2 | 21.6 | 90.6 | 20.9 | 72.7 | 20.6 | 99.0 | 2.2 | -12.0 | -0.5 | -13.4 | 15.0 | -0.8 |
| 0.792361111 | 20.1 | 71.1 | 21.3 | 83.2 | 21.1 | 65.3 | 21.6 | 89.9 | 20.9 | 72.7 | 20.2 | 99.4 | 2.3 | -12.0 | 0.6 | -13.5 | 14.8 | -0.9 |
| 0.847916667 | 20.1 | 70.1 | 21.0 | 83.3 | 21.1 | 65.4 | 21.6 | 90.3 | 20.9 | 72.8 | 20.5 | 99.1 | 2.5 | -10.4 | -0.4 | -13.5 | 13.5 | -2.5 |
| 0.903472222 | 20.1 | 69.6 | 21.0 | 83.2 | 21.1 | 65.6 | 21.6 | 89.8 | 20.9 | 72.9 | 20.5 | 99.1 | 2.4 | -11.8 | -0.4 | -13.7 | 13.5 | -2.2 |

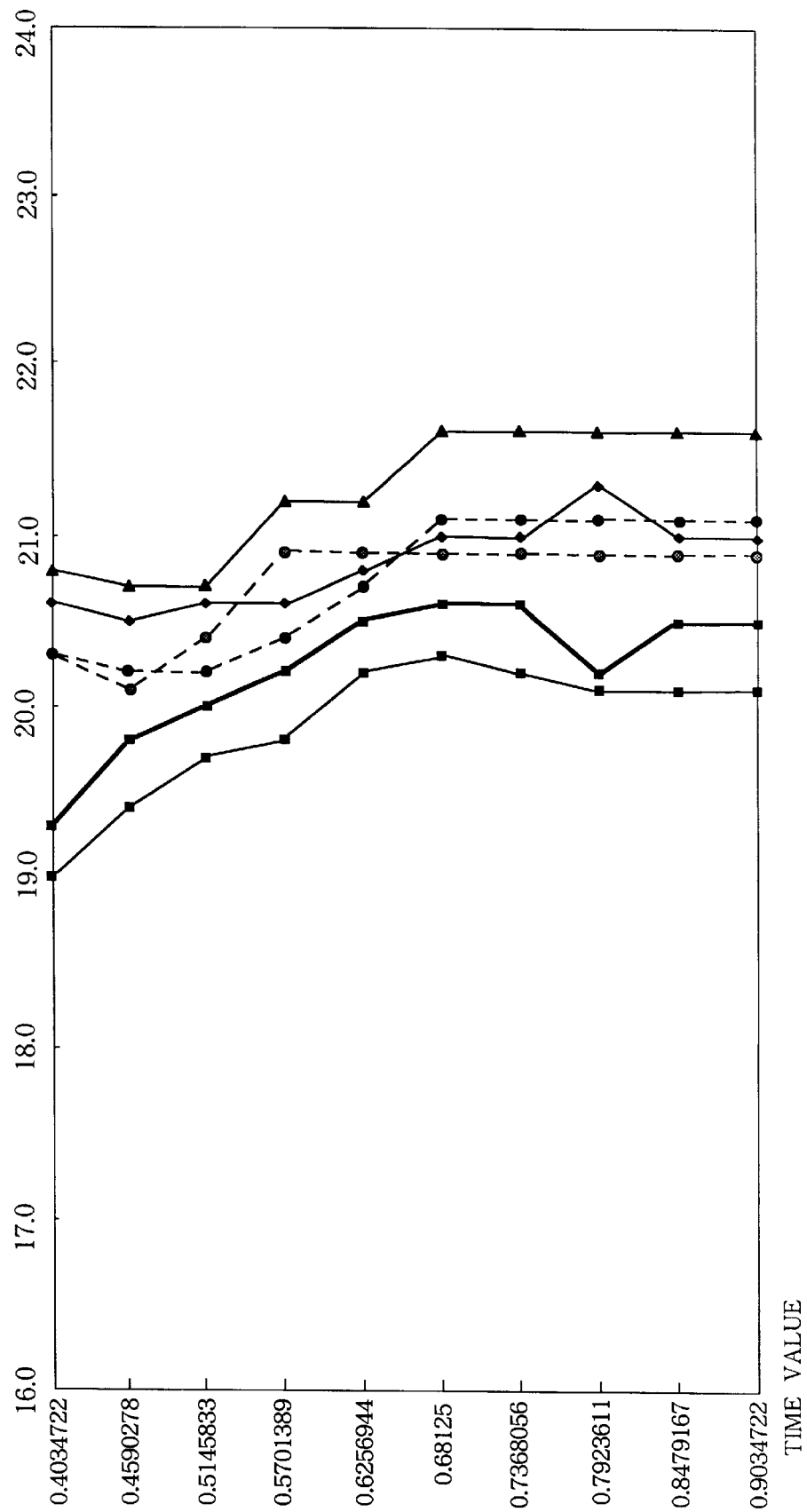

Fig.7 (a) (PRIOR ART)

BRN 1108 – N40C

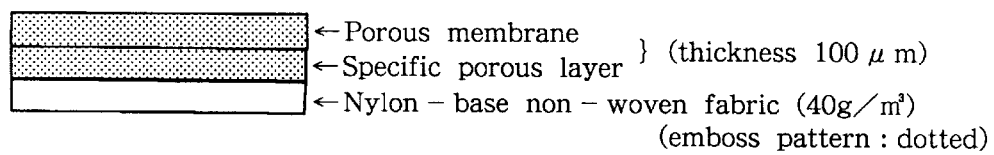

← Porous membrane
← Specific porous layer } (thickness 100 μm)
← Nylon – base non – woven fabric (40g/m³)
(emboss pattern : dotted)

Fig.7 (b) (PRIOR ART)

BRN1100 – C40A

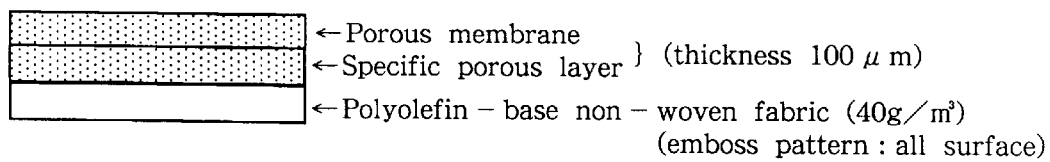

← Porous membrane
← Specific porous layer } (thickness 100 μm)
← Polyolefin – base non – woven fabric (40g/m³)
(emboss pattern : all surface)

Fig.7 (c) (PRIOR ART)

BRN1050 – P20B

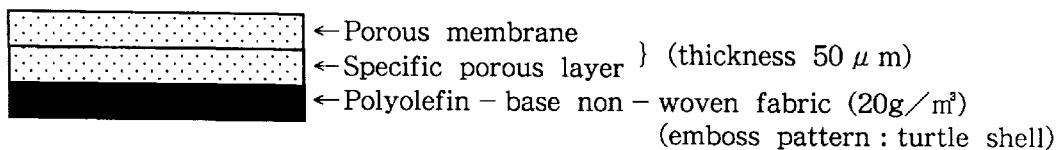

← Porous membrane
← Specific porous layer } (thickness 50 μm)
← Polyolefin – base non – woven fabric (20g/m³)
(emboss pattern : turtle shell)

Fig.8 (PRIOR ART)

| Item | | Test Method | BRN1108 – N40C | BRN1100 – C40A | BRN1050 – P20B |
|---|---|---|---|---|---|
| Thickness (mm) | | — | 0.30 | 0.25 | 0.20 |
| Tensile strength (kg/25mm width) | Long | JIS L – 1085 | 7.4 | 12.5 | 3.5 |
| | Lateral | JIS L – 1085 | 2.3 | 13.0 | 1.0 |
| Elongation (%) | Long | JIS L – 1085 | 38 | 12 | 33 |
| | Lateral | JIS L – 1085 | 48 | 19 | 35 |
| Tearing (kg) | Long | JIS L – 1085 | 0.9 | 1.0 | 0.6 |
| | Lateral | JIS L – 1085 | 1.2 | 1.2 | 0.7 |
| Maximum dia of hole (μm) | | Gas permeation method | 1.0 | 1.5 | 2.0 |
| Moisture permeability (g/m²·day) | | JIS L – 1099 | 250 | 2000 | 4600 |
| Air permeability (sec/100cc) | | JIS P – 8117 | 18000 | 1000 | 350 |
| Air permeabilty (high water pressure method) | | In accordance with JIS P – 8117 | 8000 | — | — |
| Water proof pressure (mm) | | JIS L – 1092 | >2000 | >2000 | >2000 |
| Color of porous layer | | — | White | White | White |
| Raw material of laminatio layer | | — | Nylon – base non – woven fabric (40g/m²) | Polyolefin – base – non – woven fabric (40g/m²) | Polyolefin – base – non – woven fabric (40g/m²) |
| Emboss pattern | | | Dotted | All surface | Turtle shell |
| Main applications | | — | Wrapping material for body warmer | Wrapping material for desiccant | Japanese mat sheet material Fruit tree sheet material |

Fig.10 (a)

| TIME VALUE | BOX C. | BOX RH. | INNER CHAMBER C. | INNER CHAMBER RH. | INNER SUPPORT BOX C. | INNER SUPPORT BOX RH. | OUTER CHAMBER C. | OUTER CHAMBER RH. | OUTER SUPPORT BOX C. | OUTER SUPPORT BOX RH. | OUTSIDE C. | OUTSIDE RH. | SURFACE VOLTAGE OF MEMBRANE 1 | SURFACE VOLTAGE OF MEMBRANE 1 | SURFACE VOLTAGE OF MEMBRANE 2 | SURFACE VOLTAGE OF MEMBRANE 2 | SURFACE VOLTAGE OF MEMBRANE 3 | SURFACE VOLTAGE OF MEMBRANE 3 |
|---|---|---|---|---|---|---|---|---|---|---|---|---|---|---|---|---|---|---|
| 0.650694444 | 21.8 | 100.0 | 21.5 | 65.9 | 21.5 | 64.1 | 22.2 | 61.1 | 21.9 | 61.3 | 21.0 | 67.8 | 0.1 | -12.4 | -12.0 | -14.2 | -4.8 | -7.7 |
| 0.705555556 | 21.7 | 95.2 | 22.2 | 64.4 | 21.8 | 62.6 | 22.3 | 58.8 | 22.0 | 61.3 | 20.8 | 65.8 | 0.0 | -11.5 | -12.0 | -13.0 | -4.3 | -5.0 |
| 0.761111111 | 21.6 | 91.2 | 22.2 | 63.4 | 22.1 | 62.4 | 22.3 | 57.9 | 21.9 | 61.3 | 20.8 | 65.6 | -0.4 | -12.7 | -11.6 | -13.5 | -3.9 | -5.5 |
| 0.816666667 | 21.7 | 90.0 | 22.2 | 62.7 | 21.8 | 62.3 | 22.3 | 57.4 | 21.8 | 61.2 | 20.5 | 65.4 | -0.2 | -13.1 | -11.8 | -13.5 | -3.4 | -3.7 |
| 0.872222222 | 21.2 | 89.2 | 21.7 | 62.3 | 21.6 | 62.2 | 22.3 | 57.2 | 21.8 | 61.2 | 20.5 | 64.9 | 0.0 | -12.2 | -11.6 | -13.7 | -2.9 | -7.7 |
| 0.927777778 | 21.1 | 88.8 | 21.8 | 62.0 | 21.5 | 62.2 | 22.3 | 56.7 | 21.8 | 61.2 | 20.5 | 64.3 | 0.0 | -13.0 | -12.0 | -13.6 | -9.9 | -5.9 |
| 0.983333333 | 20.8 | 88.2 | 21.6 | 61.0 | 21.3 | 62.1 | 21.8 | 55.7 | 21.8 | 60.9 | 20.2 | 64.0 | -0.2 | -12.6 | -11.8 | -14.4 | -4.2 | -4.8 |
| 0.038888889 | 20.8 | 87.1 | 21.4 | 60.8 | 21.1 | 62.0 | 21.6 | 55.8 | 21.8 | 61.0 | 20.2 | 63.6 | -0.3 | -12.1 | -12.0 | -14.3 | -4.1 | -4.8 |
| 0.094444444 | 20.8 | 86.3 | 21.2 | 60.6 | 21.1 | 62.0 | 21.6 | 55.5 | 21.3 | 60.9 | 20.0 | 63.4 | 0.0 | -12.1 | -11.8 | -14.0 | -3.6 | -6.3 |
| 0.15 | 20.8 | 85.7 | 21.2 | 60.2 | 21.1 | 61.9 | 21.3 | 55.1 | 21.2 | 60.8 | 19.8 | 63.2 | -0.2 | -13.2 | -11.9 | -14.4 | -3.7 | -8.4 |

| TIME VALUE | BOX C. | BOX RH. | INNER CHAMBER C. | INNER CHAMBER RH. | INNER SUPPORT BOX C. | INNER SUPPORT BOX RH. | OUTER CHAMBER C. | OUTER CHAMBER RH. | OUTER SUPPORT BOX C. | OUTER SUPPORT BOX RH. | OUTSIDE C. | OUTSIDE RH. | SURFACE VOLTAGE OF MEMBRANE 1 | SURFACE VOLTAGE OF MEMBRANE 1 | SURFACE VOLTAGE OF MEMBRANE 2 | SURFACE VOLTAGE OF MEMBRANE 2 | SURFACE VOLTAGE OF MEMBRANE 3 | SURFACE VOLTAGE OF MEMBRANE 3 |
|---|---|---|---|---|---|---|---|---|---|---|---|---|---|---|---|---|---|---|
| 0.880555556 | 21.7 | 100.0 | 23.3 | 55.8 | 22.7 | 61.8 | 23.4 | 52.2 | 22.9 | 59.7 | 20.8 | 63.0 | -5.2 | -15.8 | -13.9 | -17.1 | -11.2 | -14.5 |
| 0.936111111 | 21.7 | 82.0 | 23.3 | 55.8 | 22.7 | 61.8 | 23.4 | 52.2 | 22.9 | 59.7 | 20.8 | 63.0 | -1.0 | -12.8 | -11.0 | -13.3 | -5.8 | -10.1 |
| 0.991666667 | 21.1 | 77.8 | 22.5 | 55.7 | 22.2 | 61.7 | 22.5 | 52.0 | 22.2 | 60.0 | 20.3 | 62.3 | -1.1 | -13.1 | -11.3 | -14.2 | -5.5 | -11.7 |
| 0.047222222 | 20.8 | 75.8 | 22.2 | 55.6 | 21.6 | 61.6 | 22.3 | 52.1 | 21.9 | 60.1 | 20.2 | 62.0 | -0.9 | -12.7 | -11.4 | -14.3 | -6.3 | -8.5 |
| 0.102777778 | 20.7 | 74.6 | 21.5 | 55.9 | 21.2 | 61.5 | 21.6 | 52.2 | 21.4 | 60.2 | 19.8 | 62.0 | -1.0 | -13.2 | -11.2 | -14.7 | -5.5 | -12.0 |
| 0.158333333 | 20.3 | 73.9 | 21.2 | 56.0 | 21.1 | 61.4 | 21.3 | 52.3 | 21.0 | 60.2 | 19.5 | 61.7 | -0.8 | -13.2 | -11.3 | -14.4 | -5.0 | -12.2 |
| 0.213888889 | 20.1 | 73.4 | 21.2 | 56.0 | 20.7 | 61.3 | 21.3 | 52.3 | 20.8 | 60.2 | 19.2 | 61.6 | -1.1 | -13.6 | -11.8 | -14.6 | -5.2 | -7.5 |
| 0.269444444 | 19.7 | 73.1 | 20.0 | 56.0 | 20.5 | 61.2 | 20.9 | 52.3 | 20.9 | 60.1 | 19.1 | 61.4 | -1.1 | -12.3 | -11.7 | -15.0 | -6.7 | -9.9 |
| 0.325 | 19.7 | 73.2 | 20.6 | 55.7 | 20.2 | 61.1 | 20.8 | 51.9 | 20.3 | 60.1 | 18.5 | 61.7 | -2.0 | -14.3 | -12.9 | -16.2 | -5.4 | -9.0 |
| 0.380555556 | 19.7 | 72.9 | 20.3 | 55.8 | 20.2 | 61.0 | 20.4 | 52.2 | 20.1 | 60.0 | 18.3 | 61.4 | -2.1 | -13.7 | -12.8 | -16.1 | -6.6 | -10.6 |

Fig.12
(a)

| TIME VALUE | BOX C. | BOX RH. | INNER CHAMBER C. | INNER CHAMBER RH. | INNER SUPPORT BOX C. | INNER SUPPORT BOX RH | OUTER CHAMBER C. | OUTER CHAMBER RH. | OUTER SUPPORT BOX C. | OUTER SUPPORT BOX RH. | OUT-SIDE C. | OUT-SIDE RH. | SURFACE VOLTAGE OF MEMBRANE 1 | SURFACE VOLTAGE OF MEMBRANE 1 | SURFACE VOLTAGE OF MEMBRANE 2 | SURFACE VOLTAGE OF MEMBRANE 2 | SURFACE VOLTAGE OF MEMBRANE 3 | SURFACE VOLTAGE OF MEMBRANE 3 |
|---|---|---|---|---|---|---|---|---|---|---|---|---|---|---|---|---|---|---|
| 0.880555556 | 20.9 | 98.5 | 21.2 | 57.8 | 21.1 | 62.2 | 21.5 | 50.7 | 21.3 | 60.1 | 20.2 | 56.4 | -1.4 | -12.7 | -12.5 | -14.9 | -8.1 | -6.9 |
| 0.936111111 | 20.8 | 91.4 | 21.1 | 58.5 | 21.1 | 61.9 | 21.5 | 52.2 | 21.1 | 60.1 | 20.1 | 58.9 | -1.4 | -13.5 | -12.5 | -15.0 | -7.4 | -7.1 |
| 0.991666667 | 20.8 | 89.4 | 21.1 | 58.8 | 21.1 | 61.7 | 21.4 | 52.8 | 21.1 | 60.1 | 19.8 | 60.2 | -1.0 | -14.2 | -12.8 | -15.0 | -6.0 | -5.4 |
| 0.047222222 | 20.8 | 88.7 | 21.2 | 58.5 | 21.1 | 61.5 | 21.3 | 52.8 | 21.0 | 60.0 | 19.4 | 60.9 | -1.7 | -13.6 | -13.2 | -15.2 | -7.4 | -9.9 |
| 0.102777778 | 20.3 | 87.7 | 21.2 | 58.4 | 20.6 | 61.5 | 21.3 | 52.9 | 20.8 | 60.0 | 19.1 | 61.1 | -1.7 | -14.0 | -13.0 | -15.2 | -5.5 | -7.1 |
| 0.158333333 | 20.1 | 86.6 | 20.7 | 58.3 | 20.6 | 61.4 | 21.3 | 52.9 | 20.8 | 59.9 | 19.0 | 61.1 | -1.6 | -13.9 | -13.1 | -15.4 | -6.9 | -8.3 |
| 0.158333333 | 19.8 | 85.6 | 20.7 | 58.4 | 20.4 | 61.3 | 20.9 | 53.2 | 20.9 | 59.9 | 19.3 | 60.6 | -0.6 | -13.2 | -11.8 | -14.4 | -5.2 | -9.4 |
| 0.269444444 | 20.0 | 84.6 | 20.6 | 58.4 | 20.4 | 61.3 | 20.9 | 53.1 | 20.9 | 59.9 | 19.3 | 60.4 | -0.6 | -13.1 | -12.0 | -14.7 | -4.6 | -8.0 |
| 0.325 | 19.9 | 83.8 | 20.6 | 58.1 | 20.2 | 61.3 | 20.9 | 52.8 | 20.9 | 59.9 | 19.1 | 60.3 | -0.9 | -12.5 | -12.2 | -15.0 | -5.8 | -6.0 |
| 0.380555556 | 19.9 | 83.1 | 20.6 | 58.0 | 20.2 | 61.2 | 20.9 | 52.7 | 20.8 | 59.8 | 19.0 | 60.4 | -1.6 | -12.6 | -12.8 | -15.4 | -6.7 | -8.4 |

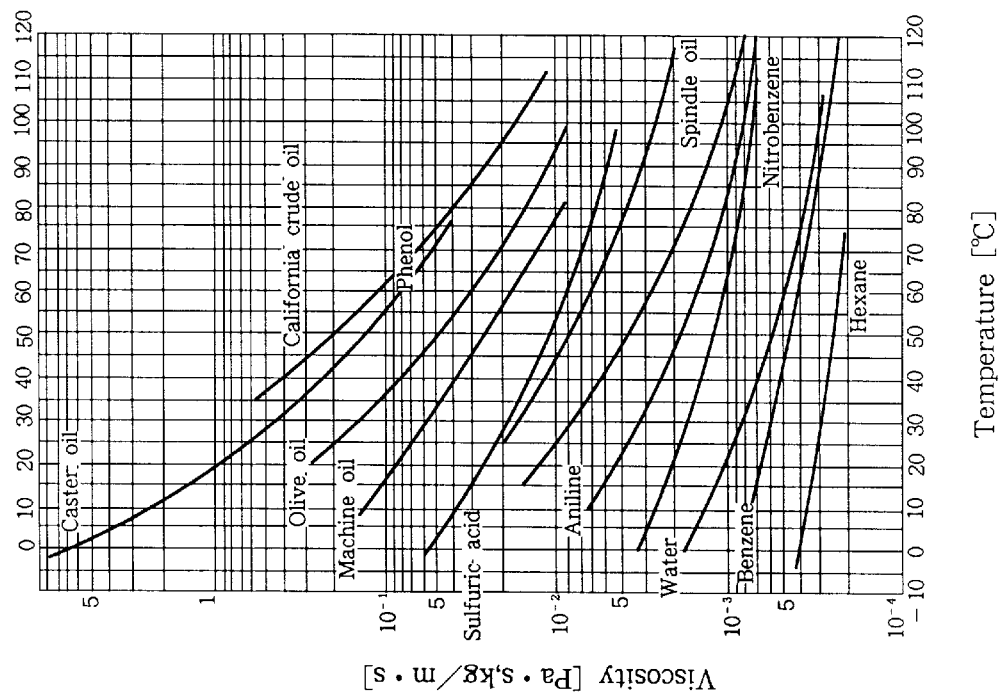
Fig.14 (a) (PRIOR ART) Viscosity of gases
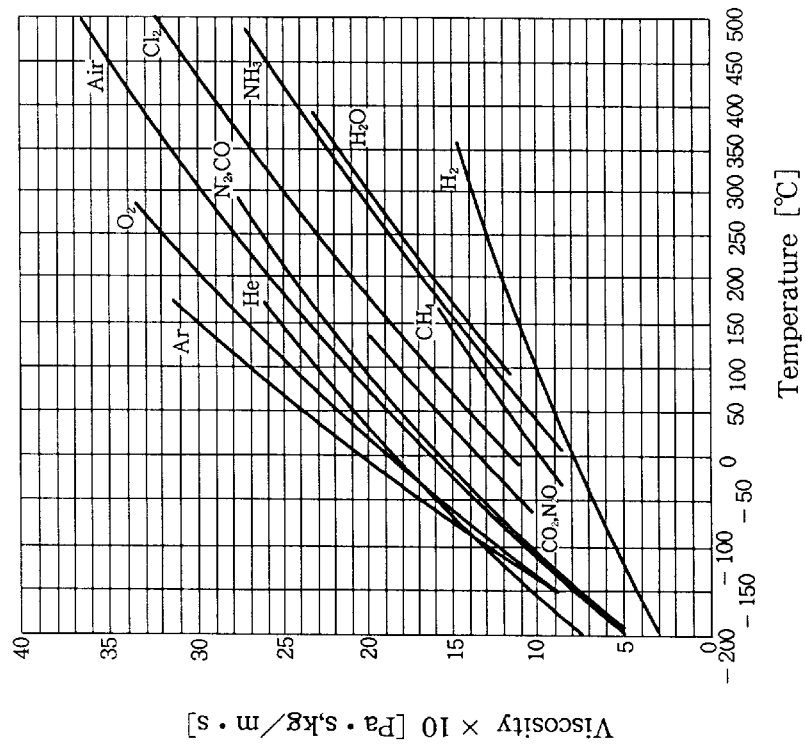
Fig.14 (b) (PRIOR ART) Viscosity of liquids Movable conductive porous structure Fig.18 (PRIOR ART)

| Low potential (anode side) | Solder | Ag wax |
|---|---|---|
| Mg and Mg alloy<br>Zn<br>Zn plated steel | 18 – 8 stainless steel (active)<br>Pb<br>Sn | Ni (passive)<br>Inconel |
| Al – Mg alloy<br>Al – Mn – Mg alloy<br>Al – Zn alloy<br>Al – Mn alloy<br>Al<br>Al – Mg – Si alloy<br>Al joint plate | 4 – 6brass<br>Mnbronze<br>Brass inclusive of Sn<br>Ni (active)<br>Inconel (active)<br>Hastelloy C (active) | Monel<br>13 Cr stainless steel (passive)<br>Ti<br>18 – 8 stainless steel (passive)<br>Hastelloy C (passive) |
| Cd | 7 – 3 brass<br>7 – 3 brass inclusive of Sn | Ag<br>Hg |
| Mild steel<br>Al – Cu – Mg alloy | Al bronze<br>Red copper | C<br>Au<br>Pt |
| Cast iron | Cu<br>Si bronze<br>Cu – Ni alloy | |
| Ni cast iron | Bronze | |
| 13Cr stainless steel (active) | | [High potential (cathode side)] |

Fig.20 (PRIOR ART)

Thermal conductivity and specific thermal capacity of solids

| Substance | Thermal conductivity | | Mean specific thermal capacity | |
|---|---|---|---|---|
| | Temperature [°C] | $\left[\frac{w}{m \cdot k}\right]$ | Temperature range [°C] | $\left[\frac{kj}{kg \cdot K}\right]$ |
| Metal | | | | |
| Zinc | 0 | 110 ± 5% | 0~100 | 0.392 |
| | 200 | 105 ± 10% | 0~300 | 0.410 |
| Aluminium | −200 | 201 ± 5% | −200~0 | 0.686 |
| | 100 | 205 ± 5% | 0~100 | 0.908 |
| | 300 | 230 ± 2% | 0~300 | 0.954 |
| Copper (Pure) | 20 | 386 ± 3% | 10~300 | 0.399 |
| (Impure) | 20 | 52~142 | − | − |
| Silver | −160~100 | 418 ± 5% | 18~600 | 0.249 |
| Plating | 0~200 | 69.8 | 0~200 | 0.135 |
| Gold | 0 | 311 | 0~851 | 0.140 |
| Lead | 0 | 35.6 ± 5% | − | − |
| | 100 | 33.5 ± 5% | 0~100 | 0.131 |
| Nickel | 10 | 58 ± 10% | 15~100 | 0.454 |
| | 500 | 48 ± 10% | $\left\{\begin{array}{l}30~250\\18~600\end{array}\right.$ | 0.478<br>0.525 |
| Brass | 20 | 92 | − | − |
| | 100 | 105 | 20~100 | 0.384 |
| Bronze | 20 | 58 | − | − |
| Tin | 0 | 65 ± 5% | 18~200 | 0.244 |
| Iron (steel) C < 0.1% | 100 | 55 | 30~250 | 0.490 |
| 0.6% C | 300 | 42 | − | − |
| | 300 | 42 | − | − |
| 1.6% C | 100 | 37 | 17~100 | 0.452 |
| | 300 | 36 | 17~680 | 0.556 |
| Cast iron | 10 | 50 ± 25% | − | − |
| 5% Cr steel (slow cooling from 900°C) | 30 | 30.6 | − | − |
| 20% Cr steel (slow cooling from 900°C) | 30 | 18.0 | − | − |
| 5% Cr steel (quenching cooling from 1100°C) | 30 | 18.4 | − | − |
| 10% Nickel steel | 30 | 25.6 | 30~250 | 0.497 |
| 20% Nickel steel | 30 | 16.3 | 30~250 | 0.499 |
| 18−8 Ni−Cr steel | 330 | 26 | − | − |

Fig.21 (PRIOR ART)

| Substance | Thermal conductivity | | Mean specific thermal capacity | |
|---|---|---|---|---|
| | Temperature [°C] | $\left[\dfrac{W}{m \cdot k}\right]$ | Temperature range [°C] | $\left[\dfrac{kj}{kg \cdot K}\right]$ |
| Structural material and fire protection material | | | | |
| Asphalt | 20 | 0.76 | — | — |
| Soil.(clay,wet) | 0 | 2.3 | — | — |
| (dry) | 20 | 0.52 | — | — |
| Glass | 17 | 0.72 | 17~329 | 0.962 |
| | 100 | 0.76 | 100~157 | 1.03 |
| Granite | about 50 | 1.3~2.6 | 20~400 | 1.05 |
| Concrete | 20 | 0.7~0.9 | — | — |
| Timber (maple,dry) (at right angles with fiber) | 15 | 0.21 | 0~100 | 2.4 |
| (parallel to fiber) | 20 | 0.36 | — | — |
| Timber (pine,dry) (at right angles with fiber) | 15 | 0.15 | 0~100 | 2.7 |
| (parallel to fiber) | 20 | 0.35 | 0~100 | 1.4 |
| Common brick (machine-finished,dry) | 50 | 0.49 | 0~100 | 0.92 |
| Common brick wall (used,dry) | 20 | 0.41 | — | — |
| Common brick wall | 47 | 0.44 | — | — |
| (new,wet) | 10 | 1.4 | — | — |
| Chamotte brick | 400 | 0.67~0.76 | 0~400 | 0.92~1.0 |
| | 800 | 0.87~0.92 | 0~800 | 1.0~1.2 |
| | 1200 | 1.1~2.3 | 0~1200 | 1.1~1.3 |
| Silica brick | 400 | 0.67~1.13 | 0~400 | 1.0~1.1 |
| | 800 | 0.76~1.46 | 0~800 | 1.0~1.2 |
| | 1200 | 0.87~2.1 | 0~1200 | 1.1~1.2 |
| Magnesia brick | 400 | about 0.5 | 0~400 | 1.0~1.2 |
| | 1000 | about 0.6 | 0~1000 | 1.2~1.3 |
| Carborundum brick | 20~100 | 9.5~10.3 | — | about 0.8 |
| Lime stone | 100~300 | 1.26~1.32 | 15~100 | 0.908 |
| Silica (at right angles with axis) | 25 | 7.3 | 0~100 | 0.782 |
| (parallel to axis) | 40 | 10.2 | 0~500 | 0.996 |
| Sand (common,wet) | 20 | 1.13 | — | — |
| (Perfectly dry) | 20 | 0.83 | 20~98 | 0.799 |

Fig.22 (PRIOR ART)

| Substance | Thermal conductivity | | Mean specific thermal capacity | |
|---|---|---|---|---|
| | Temperature [°C] | $\left[\dfrac{w}{m \cdot k}\right]$ | Temperature range [°C] | $\left[\dfrac{kj}{kg \cdot K}\right]$ |
| Porcelain | 95 | 1.03 | 15~912 | 1.08 |
| | 1055 | 1.96 | 15~1075 | 1.06 |
| Insulating | | | | |
| Alfol† (air layer 10mm thick) | 0 | 0.030 | — | — |
| | 300 | 0.056 | — | — |
| Felt (wool) | 30 | 0.036 | — | — |
| Glass cotton | 0 | 0.035 | — | — |
| | 100 | 0.052 | — | — |
| | 300 | 0.10 | — | — |
| Asbestos (flocculent) | 0 | 0.156 | 20~98 | 0.816 |
| | 100 | 0.162 | — | — |
| (platy) | 40 | 0.12~0.16 | — | — |
| Kapok | 20 | 0.035~0.040 | — | — |
| Diatomaceous earth (calcination,dry) | 100 | 0.077 | — | — |
| (cemented,dry) | 150 | 0.096 | — | — |
| (brick,calcined) | 200 | 0.107 | 0~200 | 0.849 |
| Pumice powder (dry) | 20 | 0.09~0.23 | — | — |
| Silk | 50 | 0.053 | — | — |
| Cork plate | 0 | 0.036~0.52 | — | — |
| Slag cotton (filled) | 30 | 0.040 | — | — |
| | 200 | 0.08 | — | — |
| Cotton | 30 | 0.042 | 0~100 | 1.51 |
| Saw chips | 20 | 0.07 | — | — |
| Feather | 25 | 0.037 | — | — |
| Wool | 0 | 0.038 | 0~100 | 1.36~1.72 |
| Insulation brick (calcination,29% clay 28% saw chips,48% coke power) | 100 | 0.058 | — | — |
| | 200 | 0.26 | — | — |
| Solids | | | | |
| Ebonite | 25~50 | 0.159 | — | — |

† A kind of insulator made by overlapped aluminum foils interleaved with air layers.

Fig.23 (PRIOR ART)

| Substance | Thermal conductivity | | Mean specific thermal capacity | |
|---|---|---|---|---|
| | Temperature [°C] | $\left[\frac{w}{m \cdot k}\right]$ | Temperature range [°C] | $\left[\frac{kj}{kg \cdot K}\right]$ |
| Powdered coal (dry) | 30 | 0.110 | 0~100 | 1.30 |
| Impermeable graphite (Carbate) | – | 70 | – | – |
| Rubber (soft) | 30 | 0.175 | – | – |
| Graphite | 50 | 44 | 19~1040 | 1.30 |
| Coke power | 20 | 0.15 | 20~500 | 1.23 |
| Charcoal | 100 | 0.073 | 0~224 | 1.00 |
| Paraffin | 23 | 0.267 | – | – |
| Retored carbon | 20 | 3.56 | 24~68 | 0.854 |
| Celluloid | 30 | 0.209 | – | – |
| Coal | 20~100 | 0.180 | 0~12 | 1.31 |
| Scale (gypsum like) | 300 | 0.6~2.3 | – | – |

Thermal conductivity of liquids

| Liquids | Temperature [°C] | Thermal conductivity [W/m·K] | Liquids | Temperature [°C] | Thermal conductivity [W/m·K] |
|---|---|---|---|---|---|
| Acetic acid | 20 | 0.172 | Mercury | 0 | 8.34 |
| Acetone | 20 | 0.180 | Methanol | 30 | 0.212 |
| Ammonia | −15~30 | 0.501 | | 75 | 0.206 |
| Aniline | 0 | 0.180 | Olive oil | 4 | 0.174 |
| Benzene | 30 | 0.153 | Terpene oil | 12 | 0.127 |
| Butanol | 20 | 0.167 | Petroleum | 15 | 0.138 |
| CaCl₂ Brine 15% | 32 | 0.579 | Nacl Brine 12.5% | 32 | 0.586 |
| 30% | 32 | 0.550 | 25% | 32 | 0.569 |
| Ethanol 100% | 20 | 0.172 | Sulfuric acid 30% | 32 | 0.521 |
| 80% | 20 | 0.215 | 60% | 32 | 0.437 |
| 60% | 20 | 0.273 | 90% | 32 | 0.354 |
| 40% | 20 | 0.370 | Toluene | 30 | 0.152 |
| 20% | 20 | 0.467 | Water | 0 | 0.583 |
| Ethylether | 20 | 0.138 | O – Xylene | 60 | 0.666 |
| Glycerine 95% | 20 | 0.286 | | 21 | 0.156 |
| Kerosene | 20 | 0.149 | | | |

Fig.24 (PRIOR ART)

Thermal conductivity of gases and vapor [W/m·K]

$\mathrm{I}. k = k_0 + at$

|  | $10^4 k_0$ | $10^4 a$ | Temperature range [°C] |
|---|---|---|---|
| NO | 150 | 0.71 | −70∼100 |
| NH$_3$ | 221 | 0.99 | −60∼100 |
| CO$_2$ | 146 | 0.84 | −80∼500 |
| CH$_4$ | 302 | 1.34 | −180∼0 |

$\mathrm{II}. k = k_0 \left(\dfrac{273 + C}{t + 273 + C}\right)\left(\dfrac{t + 273}{273}\right)^{3/2}$

|  | $10^4 k_0$ | C | Temperature range [°C] |
|---|---|---|---|
| Air | 242 | 125 | −185∼100 |
| CO | 232 | 156 | −185∼75 |
| NO$_2$ | 238 | 195 | −70∼100 |
| O$_2$ | 245 | 144 | −185∼100 |
| H$_2$ | 1734 | 94 | −185∼100 |
| N$_2$ | 242 | 114 | −185∼100 |

$\mathrm{III}. k = k_0 \left(\dfrac{t + 273}{273}\right)^n$

|  | $10^4 k_0$ | n | Temperature range [°C] |
|---|---|---|---|
| SO$_2$ | 86.5 | 1.03 | 0∼100 |
| Acetylene | 186.9 | 1.49 | −75∼100 |
| Acetone | 98.6 | 1.77 | 0∼184 |
| Ethane | 183.4 | 1.60 | −70∼100 |
| Ethyl ether | 033.1 | 1.70 | 0∼212 |
| Ethylene | 174.4 | 1.50 | −70∼100 |
| Ethyl chloride | 95.1 | 1.75 | 0∼214 |
| Chloroform | 65.7 | 1.35 | 0∼184 |
| Methyl acetate | 102.0 | 2.01 | 0∼20 |
| Propane | 150.4 | 1.76 | 0∼100 |
| n − Hexane | 124.4 | 1.51 | 0∼20 |
| Benzene | 90.0 | 2.19 | 0∼212 |
| n − Pentane | 127.8 | 1.64 | 0∼20 |
| Methyl alcohol | 143.5 | 1.38 | 0∼100 | k = Thermal conductivity at t°C [W/m·K]
$K_0$ = Thermal conductivity at t°C [W/m·K]

Fig.25 (PRIOR ART)

Diffusion coefficient of gas $D_{AB} \times 10^4 [m^2/s]$ (0°C, 1atm)

| Diffusion gas | Chemical formula | In air | In $CO_2$ | In $H_2$ |
|---|---|---|---|---|
| Sulfur dioxide | $SO_2$ | – | – | 0.480 |
| Carbon monoxide | CO | – | 0.137 | 0.651 |
| Ethyl alcohol | $C_2H_5OH$ | 0.102 | 0.0685 | 0.3753 |
| Ethyl ether | $(C_2H_5)_2O$ | 0.0778 | 0.05525 | 0.2964 |
| Acetic acid | $CH_2COOH$ | 0.1064 | 0.0716 | 0.4163 |
| Oxygen | $O_2$ | 0.176 | 0.139 | 0.697 |
| Hydrogen | $H_2$ | 0.611 | 0.550 | – |
| Carbon dioxide | $CO_2$ | 0.138 | – | 0.550 |
| Nitrogen | $N_2$ | – | – | 0.674 |
| Carbon disulfide | $CS_2$ | 0.0892 | 0.063 | 0.3689 |
| Benzene | $C_6H_6$ | 0.077 | 0.0528 | 0.2948 |
| Water | $H_2O$ | 0.220 | 0.1387 | 0.7516 |
| Methane | $CH_4$ | – | 0.153 | 0.625 |
| Methyl alcohol | $CH_3OH$ | 0.1325 | 0.0879 | 0.5059 |

Diffusion coefficient of dilution

| | Diffusion gas | Chemical formula | Temperature [°C] | $D_{AB} \times 10^4$ [$m^2/s$] |
|---|---|---|---|---|
| Gas : | Ammonia | $NH_3$ | 20 | 2.03 |
| | Chlorine | $Cl_2$ | 12 | 1.40 |
| | Oxygen | $O_2$ | 25 | 2.60 |
| | Hydrogen | $H_2$ | 25 | 3.36 |
| | Carbon dioxide | $CO_2$ | 18 | 1.71 |
| | Nitrogen | $N_2$ | 22 | 2.02 |
| Electrolyte : | Calcium chloride | $CaCl_2$ | 9 | 0.79 |
| | Sodium chloride | NaCl | 18 | 1.26 |
| | Lithium chloride | LiCl | 18 | 1.16 |
| | Hydrochloric acid | HCl | 0 | 1.61 |
| | Caustic potash | KOH | 13.5 | 1.99 |
| | Caustic soda | NaOK | 12 | 1.30 |
| | Nitric acid | $HNO_3$ | 5.5 | 1.74 |
| | Sulfuric acid | $H_2SO_4$ | 18 | 1.51 |
| | Copper sulphate | $CuSO_4$ | 17 | 0.45 |

Fig.26 (PRIOR ART)

Diffusion coefficient of acetic acid in dilutions

| Solvent | Temperature [°C] | $D_{AB} \times 10^4$ [m²/s] |
|---|---|---|
| Acetone $C_2H_6O$ | 15.0 | 2.92 |
| | 25.0 | 3.31 |
| | 40.0 | 4.04 |
| Carbon tetrachloride $CCl_4$ | 6.5 | 1.15 |
| | 14.8 | 1.27 |
| | 25.0 | 1.49 |
| | 40.0 | 1.78 |
| Toluene $C_7H_4$ | 6.8 | 1.66 |
| | 15.0 | 1.90 |
| | 25.0 | 2.26 |
| Benzene $C_6H_6$ | 5.9 | 1.58 |
| | 15.0 | 1.92 |
| | 25.0 | 2.09 |
| Water $H_2O$ | 9.0 | 0.76 |
| | 12.5 | 0.82 |
| | 17.0 | 0.92 |
| | 18.0 | 0.96 |

Fig.27 (a)

| TIME VALUE | BOX C. | BOX RH. | INNER CHAMBER C. | INNER CHAMBER RH. | INNER SUPPORT BOX C. | INNER SUPPORT BOX RH. | OUTER CHAMBER C. | OUTER CHAMBER RH. | OUTER SUPPORT BOX C. | OUTER SUPPORT BOX RH. | OUT-SIDE C. | OUT-SIDE RH. | SUR-FACE VOLTAGE OF MEM-BRANE 1 | SUR-FACE VOLTAGE OF MEM-BRANE 1 | SUR-FACE VOLTAGE OF MEM-BRANE 2 | SUR-FACE VOLTAGE OF MEM-BRANE 2 | SUR-FACE VOLTAGE OF MEM-BRANE 3 | SUR-FACE VOLTAGE OF MEM-BRANE 3 |
|---|---|---|---|---|---|---|---|---|---|---|---|---|---|---|---|---|---|---|
| 0.006944444 | 20.0 | 20.3 | 21.1 | 54.0 | 20.9 | 49.2 | 21.4 | 66.6 | 20.8 | 60.4 | 17.8 | 95.4 | 1.1 | −12.0 | −12.0 | −14.5 | −5.1 | −9.0 |
| 0.063194444 | 20.3 | 38.2 | 20.7 | 68.1 | 20.3 | 57.0 | 20.8 | 82.2 | 20.8 | 62.0 | 18.7 | 100.0 | 0.1 | −12.8 | −11.7 | −14.6 | −4.6 | −1.7 |
| 0.11875 | 20.3 | 45.5 | 20.5 | 73.3 | 20.2 | 58.7 | 20.7 | 87.6 | 20.5 | 63.5 | 19.5 | 100.0 | 0.6 | −12.5 | −11.2 | −14.0 | −4.5 | 0.2 |
| 0.174305556 | 20.5 | 50.2 | 20.7 | 78.0 | 20.5 | 59.7 | 21.0 | 90.0 | 20.9 | 64.5 | 19.5 | 100.0 | 0.5 | −11.2 | −10.7 | −13.3 | −3.3 | 2.2 |
| 0.229861111 | 20.5 | 53.5 | 20.8 | 79.4 | 20.6 | 60.5 | 21.2 | 90.2 | 20.9 | 65.3 | 19.5 | 100.0 | 0.2 | −12.9 | −11.0 | −13.3 | −3.0 | 3.3 |
| 0.285416667 | 20.2 | 56.1 | 20.8 | 79.3 | 20.6 | 61.0 | 21.0 | 89.9 | 20.9 | 65.7 | 19.1 | 100.0 | 0.4 | −12.4 | −11.0 | −14.1 | −2.3 | 1.7 |
| 0.340972222 | 19.8 | 58.2 | 20.7 | 78.6 | 20.4 | 61.4 | 20.8 | 89.1 | 20.8 | 66.1 | 18.6 | 100.0 | −0.3 | −12.8 | −11.8 | −14.4 | −3.6 | −0.2 |
| 0.396527778 | 20.0 | 59.2 | 20.5 | 80.0 | 20.2 | 61.9 | 20.7 | 91.0 | 20.4 | 66.8 | 19.0 | 100.0 | −0.3 | −11.8 | −11.5 | −14.1 | −3.6 | 3.2 |
| 0.452083333 | 20.0 | 60.3 | 20.5 | 81.3 | 20.2 | 62.3 | 20.7 | 92.1 | 20.4 | 67.3 | 19.9 | 100.0 | −0.2 | −12.9 | −11.6 | −14.2 | −3.8 | 2.2 |
| 0.507638889 | 20.1 | 61.4 | 20.5 | 81.5 | 20.2 | 62.7 | 20.7 | 92.1 | 20.4 | 67.7 | 19.0 | 100.0 | −0.5 | −12.8 | −11.4 | −14.1 | −4.6 | 2.6 |

Fig.28
(a)

| TIME VALUE | BOX C. | BOX RH. | INNER CHAMBER C. | INNER CHAMBER RH. | INNER SUPPORT BOX C. | INNER SUPPORT BOX RH. | OUTER CHAMBER C. | OUTER CHAMBER RH. | OUTER SUPPORT BOX C. | OUTER SUPPORT BOX RH. | OUTSIDE C. | OUTSIDE RH. | SURFACE VOLTAGE OF MEMBRANE 1 | SURFACE VOLTAGE OF MEMBRANE 1 | SURFACE VOLTAGE OF MEMBRANE 2 | SURFACE VOLTAGE OF MEMBRANE 2 | SURFACE VOLTAGE OF MEMBRANE 3 | SURFACE VOLTAGE OF MEMBRANE 3 |
|---|---|---|---|---|---|---|---|---|---|---|---|---|---|---|---|---|---|---|
| 0.408333333 | 18.6 | 21.6 | 19.4 | 56.0 | 19.2 | 57.5 | 19.6 | 65.1 | 19.3 | 67.5 | 15.8 | 94.8 | 0.2 | −14.0 | −13.9 | −15.3 | −4.8 | −10.2 |
| 0.429166667 | 18.6 | 32.6 | 19.4 | 64.4 | 19.2 | 61.2 | 19.7 | 78.5 | 19.0 | 68.1 | 17.6 | 100.0 | −0.2 | −14.1 | −13.4 | −15.2 | −3.5 | −4.6 |
| 0.484722222 | 19.3 | 43.6 | 19.4 | 73.5 | 19.3 | 63.9 | 19.8 | 87.5 | 19.3 | 69.6 | 18.3 | 100.0 | −0.9 | −13.1 | −13.4 | −15.2 | −4.8 | 2.8 |
| 0.540277778 | 19.4 | 48.9 | 19.5 | 79.3 | 19.3 | 65.2 | 20.0 | 91.7 | 20.0 | 70.5 | 18.8 | 100.0 | −1.2 | −13.5 | −13.2 | −14.9 | −5.5 | 1.6 |
| 0.595833333 | 19.8 | 53.0 | 20.1 | 81.5 | 19.8 | 65.9 | 20.3 | 93.6 | 20.0 | 71.4 | 19.0 | 100.0 | −1.5 | −13.7 | −12.9 | −14.7 | −5.2 | 5.2 |
| 0.651388889 | 19.9 | 55.6 | 20.5 | 82.4 | 20.2 | 66.4 | 20.7 | 94.3 | 20.3 | 72.0 | 19.4 | 100.0 | −1.5 | −13.7 | −13.0 | −14.5 | −6.1 | 3.0 |
| 0.706944444 | 20.1 | 57.9 | 20.5 | 82.5 | 20.2 | 66.8 | 20.7 | 93.7 | 20.5 | 72.4 | 19.4 | 100.0 | −1.6 | −14.1 | −12.6 | −14.2 | −6.4 | 5.3 |
| 0.7625 | 20.0 | 59.6 | 20.5 | 83.1 | 20.2 | 67.2 | 20.7 | 94.4 | 20.5 | 72.9 | 19.5 | 100.0 | −1.4 | −13.7 | −12.4 | −14.4 | −6.8 | 4.6 |
| 0.818055556 | 19.6 | 61.5 | 20.5 | 82.2 | 20.2 | 67.5 | 20.7 | 91.9 | 20.5 | 73.1 | 19.1 | 100.0 | −1.5 | −13.6 | −12.9 | −14.3 | −5.8 | 1.0 |
| 0.873611111 | 19.6 | 62.4 | 20.5 | 81.8 | 20.2 | 67.7 | 20.7 | 91.3 | 20.3 | 73.3 | 18.9 | 100.0 | −1.6 | −13.5 | −13.1 | −14.6 | −6.4 | 2.2 |

| TIME VALUE | BOX C. | BOX RH. | INNER CHAMBER C. | INNER CHAMBER RH. | INNER SUPPORT BOX C. | INNER SUPPORT BOX RH. | OUTER CHAMBER C. | OUTER CHAMBER RH. | OUTER SUPPORT BOX C. | OUTER SUPPORT BOX RH. | OUTSIDE C. | OUTSIDE RH. | SURFACE VOLTAGE OF MEMBRANE 1 | SURFACE VOLTAGE OF MEMBRANE 1 | SURFACE VOLTAGE OF MEMBRANE 2 | SURFACE VOLTAGE OF MEMBRANE 2 | SURFACE VOLTAGE OF MEMBRANE 3 | SURFACE VOLTAGE OF MEMBRANE 3 |
|---|---|---|---|---|---|---|---|---|---|---|---|---|---|---|---|---|---|---|
| 0.496527778 | 18.5 | 21.6 | 19.4 | 62.3 | 19.2 | 56.6 | 19.6 | 65.1 | 19.1 | 74.6 | 16.5 | 89.8 | 0.2 | -12.8 | -12.8 | -13.8 | -6.7 | -7.3 |
| 0.516666667 | 18.8 | 31.5 | 19.5 | 71.0 | 19.2 | 61.8 | 19.9 | 85.8 | 19.0 | 74.9 | 18.4 | 100.0 | -0.2 | -12.5 | -12.7 | -14.2 | -5.5 | 2.6 |
| 0.572222222 | 19.3 | 39.5 | 19.5 | 79.8 | 19.2 | 65.3 | 19.9 | 95.2 | 19.6 | 76.0 | 19.4 | 100.0 | -1.1 | -13.2 | -12.6 | -14.1 | -5.8 | 6.5 |
| 0.627777778 | 19.7 | 44.1 | 19.5 | 82.7 | 19.8 | 66.6 | 20.3 | 97.4 | 20.1 | 76.5 | 20.1 | 100.0 | -1.3 | -13.0 | -12.4 | -13.9 | -5.5 | 5.6 |
| 0.683333333 | 20.0 | 47.4 | 19.9 | 84.1 | 20.3 | 67.3 | 20.0 | 98.2 | 20.5 | 77.0 | 20.5 | 100.0 | -1.3 | -12.7 | -12.3 | -13.7 | -4.6 | 4.2 |
| 0.738888889 | 19.8 | 50.6 | 20.5 | 83.2 | 20.3 | 67.9 | 20.8 | 95.5 | 20.5 | 77.1 | 20.8 | 100.0 | -1.2 | -12.8 | -12.3 | -13.2 | -5.7 | 6.0 |
| 0.794444444 | 19.5 | 52.7 | 20.5 | 82.7 | 20.3 | 68.1 | 20.7 | 94.8 | 20.5 | 77.2 | 20.5 | 100.0 | -1.3 | -13.1 | -12.4 | -13.6 | -5.3 | 4.7 |
| 0.85 | 19.5 | 54.4 | 20.5 | 81.9 | 20.2 | 68.4 | 20.7 | 93.2 | 20.4 | 77.3 | 20.2 | 100.0 | -1.4 | -12.7 | -12.8 | -13.7 | -5.8 | 4.4 |
| 0.905555556 | 19.0 | 55.7 | 20.5 | 81.9 | 20.2 | 68.6 | 20.7 | 93.5 | 20.1 | 77.5 | 20.1 | 100.0 | -1.5 | -13.9 | -12.7 | -14.0 | -6.9 | 6.0 |
| 0.961111111 | 19.0 | 56.5 | 20.1 | 82.8 | 19.9 | 68.9 | 20.3 | 95.1 | 20.2 | 77.7 | 20.2 | 100.0 | -1.0 | -13.9 | -12.7 | -13.9 | -6.0 | 5.4 |

Fig.30 (a)

| TIME VALUE | BOX C. | BOX RH. | INNER CHAMBER C. | INNER CHAMBER RH. | INNER SUPPORT BOX C. | INNER SUPPORT BOX RH. | OUTER CHAMBER C. | OUTER CHAMBER RH. | OUTER SUPPORT BOX C. | OUTER SUPPORT BOX RH. | OUT-SIDE C. | OUT-SIDE RH. | SUR-FACE MEM-BRANE 1 | VOLT-AGE OF MEM-BRANE 1 | SUR-FACE MEM-BRANE 2 | VOLT-AGE OF MEM-BRANE 2 | SUR-FACE MEM-BRANE 3 | VOLT-AGE OF MEM-BRANE 3 | SUR-FACE VOLT-AGE OF MEM-BRANE 3 |
|---|---|---|---|---|---|---|---|---|---|---|---|---|---|---|---|---|---|---|---|
| 0.497916667 | 16.5 | 22.2 | 16.5 | 40.5 | 16.3 | 50.5 | 17.0 | 51.7 | 16.8 | 56.8 | 14.1 | 90.9 | −2.1 | −15.0 | −15.3 | −16.8 | −10.7 | −7.8 |
| 0.553472222 | 17.3 | 34.1 | 16.9 | 68.7 | 16.6 | 56.7 | 17.3 | 81.3 | 16.9 | 59.1 | 15.9 | 100.0 | −3.2 | −15.2 | −14.6 | −16.2 | −8.2 | 0.3 |
| 0.609027778 | 17.4 | 41.0 | 17.5 | 73.5 | 17.2 | 58.1 | 17.8 | 87.4 | 17.4 | 61.0 | 16.3 | 100.0 | −3.5 | −14.8 | −14.3 | −16.5 | −8.6 | 5.2 |
| 0.650694444 | 17.4 | 44.6 | 17.5 | 76.4 | 17.2 | 59.2 | 17.8 | 88.9 | 17.9 | 62.3 | 16.4 | 100.0 | −3.8 | −15.7 | −14.6 | −16.6 | −8.4 | 5.4 |
| 0.720138889 | 17.4 | 47.6 | 17.8 | 77.5 | 17.6 | 59.8 | 18.3 | 89.4 | 17.9 | 63.4 | 16.6 | 100.0 | −3.8 | −15.7 | −14.2 | −16.4 | −8.9 | 5.1 |
| 0.775694444 | 17.4 | 50.2 | 18.0 | 77.1 | 17.7 | 60.4 | 18.2 | 88.3 | 17.9 | 64.1 | 16.3 | 100.0 | −3.9 | −16.0 | −14.3 | −16.5 | −8.8 | 4.4 |
| 0.83125 | 17.5 | 50.2 | 18.0 | 76.8 | 17.7 | 60.9 | 18.2 | 88.4 | 17.9 | 64.7 | 16.1 | 100.0 | −3.7 | −15.4 | −14.2 | −16.8 | −7.6 | 1.9 |
| 0.886805556 | 17.5 | 53.5 | 17.8 | 77.3 | 17.6 | 61.3 | 17.9 | 88.8 | 17.9 | 65.3 | 16.0 | 100.0 | −3.9 | −14.9 | −14.4 | −16.6 | −8.7 | 1.8 |
| 0.942361111 | 17.4 | 54.6 | 17.6 | 78.0 | 17.3 | 61.7 | 17.8 | 89.3 | 17.9 | 65.7 | 15.8 | 100.0 | −3.5 | −15.5 | −14.2 | −17.2 | −9.4 | 5.3 |
| 0.997916667 | 17.0 | 55.8 | 17.5 | 78.9 | 17.2 | 62.1 | 17.9 | 90.3 | 17.5 | 66.4 | 16.1 | 100.0 | −3.6 | −15.0 | −14.3 | −16.7 | −8.8 | 2.7 |

Fig.31 (a)

| TIME VALUE | BOX C. | BOX RH. | INNER CHAMBER C. | INNER CHAMBER RH. | INNER SUPPORT BOX C. | INNER SUPPORT BOX RH. | OUTER CHAMBER C. | OUTER CHAMBER RH. | OUTER SUPPORT BOX C. | OUTER SUPPORT BOX RH. | OUT-SIDE C. | OUT-SIDE RH. | SURFACE VOLTAGE OF MEMBRANE 1 | SURFACE VOLTAGE OF MEMBRANE 1 | SURFACE VOLTAGE OF MEMBRANE 2 | SURFACE VOLTAGE OF MEMBRANE 2 | SURFACE VOLTAGE OF MEMBRANE 3 | SURFACE VOLTAGE OF MEMBRANE 3 |
|---|---|---|---|---|---|---|---|---|---|---|---|---|---|---|---|---|---|---|
| 0.897916667 | 19.9 | 99.2 | 20.4 | 68.8 | 20.2 | 69.2 | 20.5 | 64.3 | 20.3 | 72.0 | 18.6 | 70.9 | -1.0 | -13.4 | -13.1 | -14.1 | -5.1 | -10.3 |
| 0.953472222 | 20.0 | 95.8 | 20.4 | 68.9 | 20.4 | 69.2 | 20.5 | 64.7 | 20.3 | 72.0 | 19.1 | 70.1 | -0.5 | -13.3 | -13.0 | -14.3 | -5.9 | -6.4 |
| 0.009027778 | 19.9 | 95.0 | 20.4 | 68.5 | 20.3 | 69.0 | 20.5 | 64.1 | 20.3 | 71.8 | 18.9 | 70.1 | -0.6 | -12.5 | -12.7 | -14.4 | -5.0 | -7.5 |
| 0.064583333 | 19.4 | 95.0 | 20.3 | 67.8 | 20.2 | 68.9 | 20.5 | 63.4 | 20.1 | 71.7 | 18.5 | 70.1 | -0.8 | -14.2 | -13.0 | -14.3 | -4.6 | -10.1 |
| 0.120138889 | 19.2 | 94.3 | 20.3 | 67.2 | 19.8 | 68.8 | 20.5 | 62.9 | 20.0 | 71.4 | 18.2 | 69.9 | -0.7 | -14.2 | -13.0 | -14.4 | -4.9 | -9.9 |
| 0.175694444 | 18.9 | 93.3 | 19.9 | 66.8 | 19.5 | 68.7 | 20.0 | 62.6 | 20.0 | 71.2 | 18.0 | 69.6 | -0.9 | -13.1 | -13.5 | -15.0 | -5.4 | -8.7 |
| 0.23125 | 18.9 | 92.2 | 19.4 | 66.6 | 19.2 | 68.7 | 19.8 | 62.3 | 19.5 | 71.1 | 17.7 | 69.4 | -0.8 | -14.5 | -13.4 | -15.2 | -5.5 | -7.4 |
| 0.286805556 | 18.4 | 91.3 | 19.3 | 66.1 | 19.2 | 68.5 | 19.5 | 61.9 | 19.2 | 71.0 | 17.4 | 69.2 | -0.9 | -13.8 | -13.7 | -15.4 | -5.7 | -8.5 |
| 0.342361111 | 18.2 | 90.7 | 19.4 | 65.7 | 18.8 | 68.4 | 19.5 | 61.6 | 19.0 | 70.8 | 17.1 | 69.0 | -1.3 | -14.6 | -13.9 | -15.4 | -5.2 | -9.7 |
| 0.397916667 | 18.9 | 88.4 | 18.9 | 66.3 | 18.8 | 68.5 | 19.5 | 62.5 | 19.0 | 70.7 | 17.9 | 68.3 | -1.0 | -14.3 | -13.7 | -15.2 | -5.2 | -6.2 |

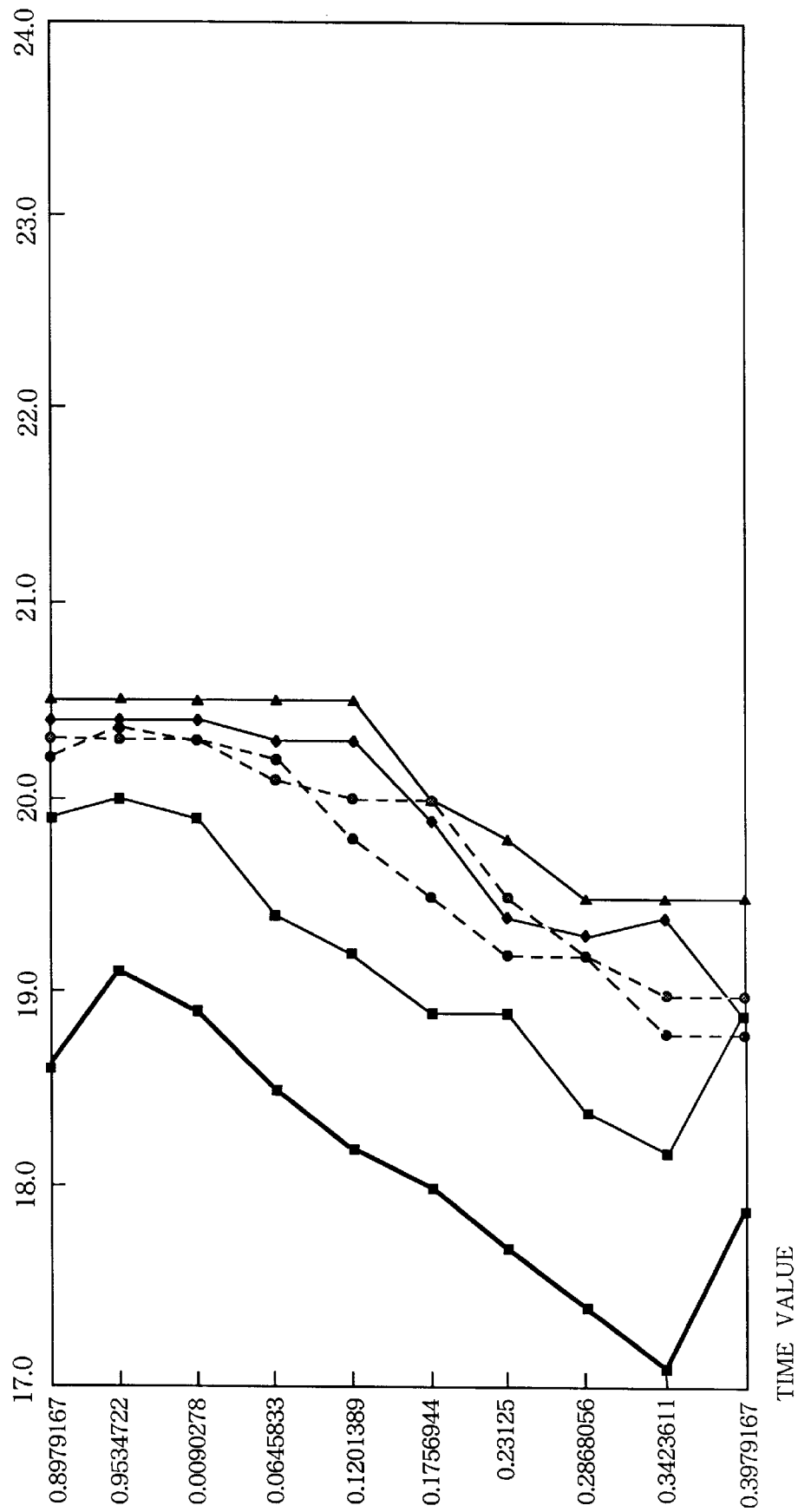

Fig.32 (a)

| TIME VALUE | BOX C. | BOX RH | INNER CHAMBER C. | INNER CHAMBER RH. | INNER SUPPORT BOX C. | INNER SUPPORT BOX RH. | OUTER CHAMBER C. | OUTER CHAMBER RH. | OUTER SUPPORT BOX C. | OUTER SUPPORT BOX RH. | OUTSIDE C. | OUTSIDE RH. | SURFACE VOLTAGE OF MEMBRANE 1 | SURFACE VOLTAGE OF MEMBRANE 1 | SURFACE VOLTAGE OF MEMBRANE 2 | SURFACE VOLTAGE OF MEMBRANE 2 | SURFACE VOLTAGE OF MEMBRANE 3 | SURFACE VOLTAGE OF MEMBRANE 3 |
|---|---|---|---|---|---|---|---|---|---|---|---|---|---|---|---|---|---|---|
| 0.691666667 | 19.4 | 99.2 | 19.3 | 63.0 | 19.3 | 66.1 | 19.4 | 57.1 | 19.1 | 66.6 | 17.6 | 64.1 | -1.3 | -13.8 | -13.9 | -15.0 | -11.0 | -8.6 |
| 0.747222222 | 19.8 | 93.4 | 19.4 | 62.6 | 19.2 | 66.0 | 19.4 | 56.8 | 19.1 | 66.7 | 17.6 | 63.7 | -1.6 | -14.4 | -14.0 | -14.8 | -10.6 | -9.1 |
| 0.802777778 | 19.4 | 91.5 | 19.3 | 61.8 | 19.2 | 66.0 | 19.4 | 55.8 | 19.1 | 66.7 | 17.4 | 63.0 | -1.5 | -14.9 | -13.8 | -15.5 | -8.8 | -10.0 |
| 0.858333333 | 19.3 | 90.2 | 19.3 | 61.2 | 19.2 | 66.0 | 19.5 | 55.3 | 19.0 | 66.7 | 17.6 | 62.1 | -1.2 | -14.2 | -13.8 | -15.2 | -9.9 | -8.6 |
| 0.913888889 | 19.4 | 88.6 | 19.4 | 61.0 | 19.2 | 65.8 | 19.5 | 55.2 | 19.0 | 66.7 | 17.9 | 61.6 | -1.1 | -13.6 | -13.6 | -14.9 | -8.5 | -8.9 |
| 0.969444444 | 19.2 | 87.8 | 19.4 | 60.5 | 19.2 | 65.9 | 19.5 | 54.7 | 18.9 | 66.6 | 17.6 | 61.5 | -1.3 | -14.7 | -14.0 | -15.2 | -8.2 | -8.2 |
| 0.025 | 18.8 | 87.3 | 19.3 | 59.9 | 19.2 | 65.6 | 19.4 | 54.1 | 18.8 | 66.4 | 17.1 | 61.6 | -1.7 | -13.5 | -14.3 | -15.6 | -8.3 | -9.7 |
| 0.080555556 | 18.8 | 86.8 | 19.2 | 59.3 | 18.7 | 65.6 | 19.4 | 53.7 | 18.8 | 66.2 | 16.9 | 61.6 | -1.8 | -15.3 | -14.4 | -15.9 | -8.1 | -6.4 |
| 0.136111111 | 18.3 | 85.9 | 18.7 | 59.3 | 18.4 | 65.5 | 19.0 | 53.9 | 18.8 | 66.0 | 16.9 | 61.5 | -1.6 | -14.8 | -14.3 | -15.6 | -8.5 | -7.7 |
| 0.191666667 | 17.9 | 85.0 | 18.4 | 59.3 | 18.2 | 65.5 | 18.9 | 53.9 | 18.4 | 66.0 | 16.9 | 61.2 | -1.7 | -13.9 | -14.3 | -16.0 | -8.4 | -9.7 |

| TIME VALUE | BOX C. | BOX RH. | INNER CHAMBER C. | INNER CHAMBER RH. | INNER SUP-PORT BOX C. | INNER SUP-PORT BOX RH. | OUTER CHAMBER C. | OUTER CHAMBER RH. | OUTER SUP-PORT BOX C. | OUTER SUP-PORT BOX RH. | OUT-SIDE C. | OUT-SIDE RH. | SUR-FACE VOLT-AGE OF MEM-BRANE 1 | SUR-FACE VOLT-AGE OF MEM-BRANE 1 | SUR-FACE VOLT-AGE OF MEM-BRANE 2 | SUR-FACE VOLT-AGE OF MEM-BRANE 2 | SUR-FACE VOLT-AGE OF MEM-BRANE 3 | SUR-FACE VOLT-AGE OF MEM-BRANE 3 |
|---|---|---|---|---|---|---|---|---|---|---|---|---|---|---|---|---|---|---|
| 0.865972222 | 18.9 | 99.8 | 18.3 | 63.7 | 18.2 | 65.1 | 18.4 | 57.7 | 18.3 | 65.4 | 16.7 | 64.9 | -1.3 | -14.4 | -14.2 | -15.6 | -6.7 | -10.2 |
| 0.921527778 | 18.9 | 93.3 | 18.4 | 63.0 | 18.3 | 65.0 | 18.5 | 57.2 | 18.3 | 65.4 | 17.0 | 64.1 | -1.4 | -15.1 | -13.8 | -15.7 | -8.8 | -10.1 |
| 0.977083333 | 18.9 | 90.9 | 18.4 | 62.3 | 18.3 | 64.9 | 18.5 | 56.4 | 18.3 | 65.3 | 17.0 | 63.6 | -1.5 | -14.0 | -13.8 | -16.0 | -7.5 | -6.7 |
| 0.032638889 | 18.4 | 90.0 | 18.4 | 61.5 | 18.3 | 64.9 | 18.5 | 55.7 | 18.3 | 65.3 | 16.7 | 63.2 | -1.6 | -14.9 | -13.9 | -15.8 | -7.5 | -6.1 |
| 0.088194444 | 18.3 | 89.2 | 18.3 | 60.9 | 17.8 | 65.0 | 18.5 | 55.2 | 18.0 | 65.1 | 16.5 | 62.9 | -1.8 | -14.7 | -14.1 | -15.9 | -7.7 | -9.6 |
| 0.14375 | 18.0 | 88.4 | 18.3 | 60.5 | 17.8 | 64.9 | 18.5 | 54.8 | 18.0 | 65.0 | 16.4 | 62.5 | -1.6 | -14.9 | -14.2 | -16.3 | -6.5 | -7.7 |
| 0.199305556 | 18.0 | 87.6 | 17.9 | 60.2 | 17.7 | 64.7 | 18.5 | 54.4 | 18.0 | 64.8 | 16.4 | 62.0 | -1.8 | -14.5 | -14.3 | -16.3 | -8.1 | -7.1 |
| 0.254861111 | 17.9 | 86.9 | 17.9 | 59.8 | 17.4 | 64.6 | 18.0 | 54.1 | 18.0 | 64.7 | 16.2 | 61.6 | -2.0 | -15.1 | -14.4 | -15.9 | -7.4 | -6.5 |
| 0.310416667 | 17.5 | 86.7 | 17.6 | 59.1 | 17.3 | 64.5 | 17.9 | 53.3 | 17.9 | 64.5 | 15.7 | 61.5 | -2.2 | -14.5 | -14.7 | -16.7 | -7.7 | -11.3 |
| 0.365972222 | 17.0 | 86.1 | 17.3 | 58.7 | 17.3 | 64.3 | 17.4 | 53.1 | 17.3 | 64.3 | 15.5 | 60.5 | -2.5 | -14.5 | -14.9 | -16.6 | -8.1 | -7.9 |

Fig.34 (PRIOR ART)

Measurements of Thermal Diffusion Ratio

| Liquids | | | | Gases | | | |
|---|---|---|---|---|---|---|---|
| System A – B | Temperature T [K] | Concentration xA | Thermal diffusion ratio kT | System A – B | Temperature T [K] | Concentration xA | Thermal diffusion ratio kT |
| $C_2H_2Cl_4 - n - C_6H_{14}$ | 298 | 0.5 | 1.08 | Ar – Ne | 179 | 0.488 | 0.0350 |
| $C_2H_2Br_2 - C_2H_2Cl_2$ | 298 | 0.5 | 0.225 | | 261 | 0.488 | 0.0415 |
| $C_2H_2Cl_4 - CCl_4$ | 298 | 0.5 | 0.060 | | 406 | 0.488 | 0.0477 |
| $CCl_4 - CH_3OH$ | 313 | 0.5 | 1.23 | $D_2 - H_2$ | 327 | 0.90 | 0.0145 |
| $H_2O - CH_3OH$ | 313 | 0.5 | 0.137 | | 327 | 0.50 | 0.0432 |
| cyclo – $C_6H_{12} - C_6H_6$ | 313 | 0.5 | 0.100 | | 327 | 0.10 | 0.0166 |

Note : component A is condensed at the lower temperature side and component B is condensed at the higher temperature side.

Fig.35 (PRIOR ART)

Physical Property

| | $D_2O$ | $H_2O$ |
|---|---|---|
| Lattice parameter A  a | 4.517 | 4.514 |
| 〃        〃   c | 7.354 | 7.352 |
| Melting temperature °C (760mm) | 3.82 | 0.0 |
| Boiling temperature 〃 (〃) | 101.42 | 100.0 |
| Specific weight $d^{25}$ | 1.10714 | 0.99708 |
| Temperature at the max.density °C | 11.6 | 3.8 |
| Critical temperature 〃 | 371.5 | 374.2 |
| Critical pressure atm | 218.6 | 217.7 |
| Specific heat cal/deg·g (15°) | 1.02 | 1.00 |
| Heat of fusion cal/mol | 1520 | 1436 |
| Heat of evaporation 〃 | 9969 | 9710 |
| Heat of sublimation 〃 (triple point) | 12631 | 12170 |
| Molcular freezing point drop | 2.05 | 1.86 |
| Normal viscosity millipoise (20°) | 12.60 | 10.09 |
| Surface tension dyne/cm 〃 (〃) | 67.8 | 72.75 |
| Index of refraction nD (〃) | 1.32844 | 1.33300 |
| Dipole moment (in benzene,25°) | 1.78 | 1.76 |
| Dielectric constant (0°) | 80.7 | 81.5 |
| Molar magnetic susceptibility $x_M \cdot 10^{-6}$ e.m.u.(20°) | 12.96 | 12.97 |
| Ion product × $10^{14}$(25°) | 0.16 | 1.0 |
| Ion mobility (18°) $D^+,H^+$ | 213.7 | 315.2 |
| 〃        $K^+$ | 54.5 | 64.2 |
| 〃        $Cl^-$ | 55.3 | 65.2 |
| Solubility g/100g (25°) NaCl | 29.7 | 35.8 |
| 〃        $BaCl_2$ | 28.9 | 35.7 |

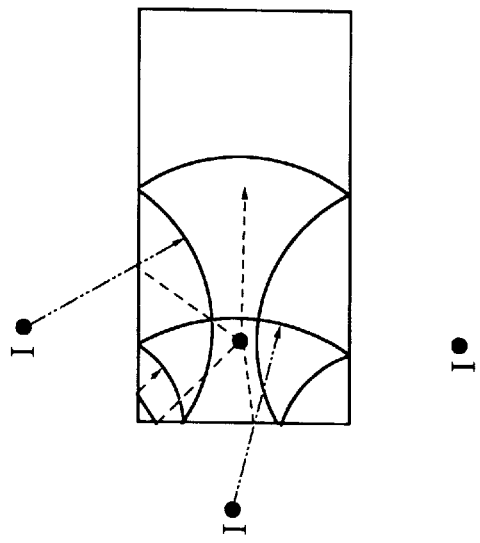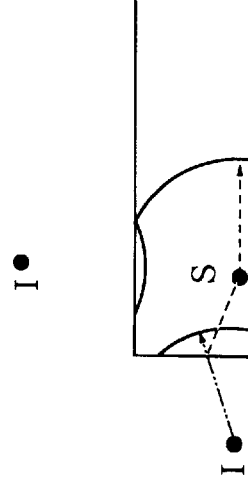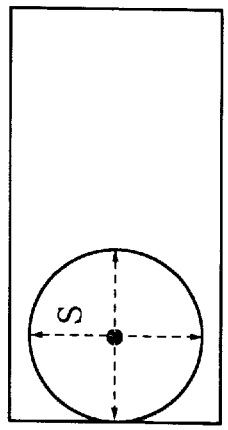
Fig.37 (a) (PRIOR ART)  Fig.37 (b) (PRIOR ART)  Fig.37 (c) (PRIOR ART)
S : Sound source
I : Imaginary image
Propagation of sound wave in a chamber with single sound source

SEPARATION MODULE PROVIDED WITH ANTISTATIC DEVICE

FIELD OF TECHNOLOGY

This invention relates to a separation module (including a dehumidifier, a humidifier and the like) utilizing the gas separation property of waterproof membranes having fine moisture-proof through holes therein, more particularly to a miniaturizable separation module.

BACKGROUND

In view of the fact that most of electrical appliances and containers exposed outdoors for extended service life of time rarely have a separation module as adjusting means for internal humidity, thus resulting in performance degradation or damage, this inventor et al. have proposed a variety of dehumidifiers and humidifiers utilizing waterproof membranes having fine moisture permeable through holes therein.

Aiming at no power provision, the separation module according to the present invention comprises:

a cylindrical casing installed at the wall of a box of a moisture-proof and drip-proof construction so as to form a gas passage communicating the inside and the outside of the box;

a plurality of chambers formed in the gas passage, in which waterproof membranes consisting of mono-layer having fine moisture-permeable through holes therein are disposed inside of the cylindrical casing at intervals of spacing; and conductive porous structures disposed in the proximity of the waterproof membranes so as to be grounded to the earth In designing the super-miniaturized separation module of the dehumidifier and humidifier already proposed, it should be noted that an electrification phenomenon of gas (water vapor) to be transported may take place when the gas to be transported is passed through the separation membranes or chamber walls, or by an adverse effect from electrical appliances installed in the box. This electrification phenomenon of gas (water vapor) to be transported can be particularly problematic because of a significant reduction of the chamber wall area for the membrane area associated with miniaturization, in making effectively the separation process of the gas (water vapor) to be removed.

Further, in the miniaturization design of the separation module, temperature gradient should be stabilized, in order to obtain a preferable inclination of Knudsen diffusion coefficient associated with the generation of temperature gradient or of vacancy percentage. However, a reduction of chamber wall area is disadvantageous for the stabilization of chamber temperature gradient or fluctuation velocity.

In other words, the miniaturization design of this separation module, which intends to establish a preferable inclination of Knudsen's diffusion coefficient following the generation of temperature gradient or of porosity percentage, will be necessarily followed by a decrease in chamber wall area in the chamber cavities in which it may become more difficult to produce temperature gradient, so that it may become more difficult for passing gas to receive not only temperature effect but also electrostatic effect from chamber wall. These decreasing effects may combine together to newly produce limitations to the types and physics of control means for the separation process, thereby resulting in efficiency retardation or effect diminishing.

Aiming at no power provision, this invention intends to provide a miniaturized separation module making most use of waterproof membranes having fine moisture-permeable through holes therein.

Further, this invention intends to provide a design for high magnetic-flux density and high conductive porous structure or high conductive porous structure as conductive porous structure; or arrangement method or design of reverse-polarity conductive substance; and setting means and method of capacitance gradient of the whole system; as well as control means and device of separation process in the capacitance gradient field; and further a dehumidifier and humidifier.

SUMMARY OF THE INVENTION

A separation module of the present invention comprises:

a cylindrical casing installed at the wall of moisture-proof and drip-proof box so as to form a gas passage communicating the inside and the outside of said box;

a plurality of chambers formed in the gas passage by placing a plurality of mono-layered waterproof membranes having fine moisture-permeable through holes in the cylindrical casing at intervals of spacing; and a conductive porous structures disposed in proximity of the waterproof membranes; and is further characterized in that:

the longitudinal section in the solid portion around the holes of the conductive porous structures is formed into an essentially egg-like shape; and the acute angle side of the egg-like longitudinal section of the conductive porous structure is so disposed as to be directed to the waterproof membrane side.

A separation module with an antistatic device of the present invention is further characterized in that:

the distance between the waterproof membrane and the conductive porous structure facing each other has the same length as the diameter of the holes.

A separation module with an antistatic device of the present invention is further characterized in that:

the conductive porous structure has connection to an earthed circuit, and electrical field intensifying and adjusting means of the local portion of separation membrane.

A separation module with an antistatic device of the present invention is further characterized in that:

oscillating means for membranes and gas in the chamber is provided, and projections are formed around the inner wall of the chamber.

A separation module with an antistatic device of the present invention is further characterized in that:

provided is setting means for temperature gradient by making most of a differential diffusion velocity due to thermal diffusion.

BRIEF DESCRIPTION OF DRAWINGS

FIG. 1(a) is a table showing measurement results such as the temperature, humidity and surface voltage at each part under the moisture of 100% in the box and 60% at the outside atmosphere, without setting the conductive porous structures.

FIG. 1(c) is an enlarged view showing temperature change in the table.

FIG. 2(a) is a schematic diagram showing charges in a molecule having an orientation under an electrical field.

FIG. 2(b) is a schematic diagram showing an electron cloud.

FIG. 2(c) is a schematic diagram showing an orientation-direction reversion and water repellency of an electron cloud.

FIG. 3(a) is a table showing measurement results such as the temperature, humidity and surface voltage at each part under the moisture of 70% at the outside atmosphere, without setting the conductive porous structures.

FIG. 3(c) is an enlarged view showing temperature change in the table.

FIG. 4 is a prior art table showing electrification rank (excerpted from Chijin Syokan: Static Electricity Handbook 11th edition, p. 72).

FIG. 7(a) is a sectional view showing a prior art membrane used in an embodiment of the invention.

FIG. 7(b) is a sectional view showing another prior art membrane used in an embodiment of the invention.

FIG. 7(c) is a sectional view showing yet another prior art membrane used in an embodiment of the invention.

FIG. 8 is a prior art table showing physical properties of membranes used in embodiments according to the invention.

FIGS. 14(a) and (b) are prior art graphs showing viscosity of gases and liquids.

FIG. 18 is a prior art table showing corrosion potential ranks.

FIGS. 20–26 are prior art tables showing thermal conductivity and diffusion coefficients of solids, liquids and gases.

FIG. 34 is a table showing the measurements of thermal diffusion ratio.

FIG. 35 is a table showing the physical properties of light water and heavy water.

FIG. 37(a) is a schematic diagram showing the starting point for propagation of sound.

FIG. 37(b) is a schematic diagram showing the propagation of reflected sound.

FIG. 37(c) is a schematic diagram showing further propagation of reflected sound.

DETAILED DESCRIPTION OF PREFERRED EMBODIMENTS

First, description will be made for the surface voltage and electrical field of the waterproof membrane:

1. It is necessary for a low resistant conductor to be accessed to the membrane electrically, in order to homogenize a surface voltage distribution condition in the membrane portion and to make an electrostatic field stronger so as to accelerate the separation process smoothly.

This increase in electrical field strength does not develop as the increase in electric charges.

At this time, the mesh configuration should be designed so as not only to have a two-dimensional design requirement (section ratio) but also to set the access distance smaller than the hole diameter in the high conductive porous structure.

In other words, when the mesh sections are a certain distance apart from each other, such an equi-potential line as to be seen on a flat plate can be obtained, but, on the contrary, when the distance is approaching the mesh diameter, there will develop such a fact relating to the distance that a strong electrical field will be generated.

This nearer approach can reduce more spaces which will cause to settle passing gas, and the nearer membranes are more strongly subject to the influence of thermodynamic characteristics of conductive porous structure.

On the contrary, when the distance between conductive porous structure and membrane surface is larger than the mesh diameter of the conductive porous structure, the electrical field strength may gradually decrease until the distance becomes equal to the mesh diameter.

2. As seen in the graphs shown in FIGS. 1(a), (b) and (c), with dry membrane, an electrical field distribution in the membrane portion is arranged at the anode, the cathode and the outer atmosphere side than the box side.

Figure 1B:
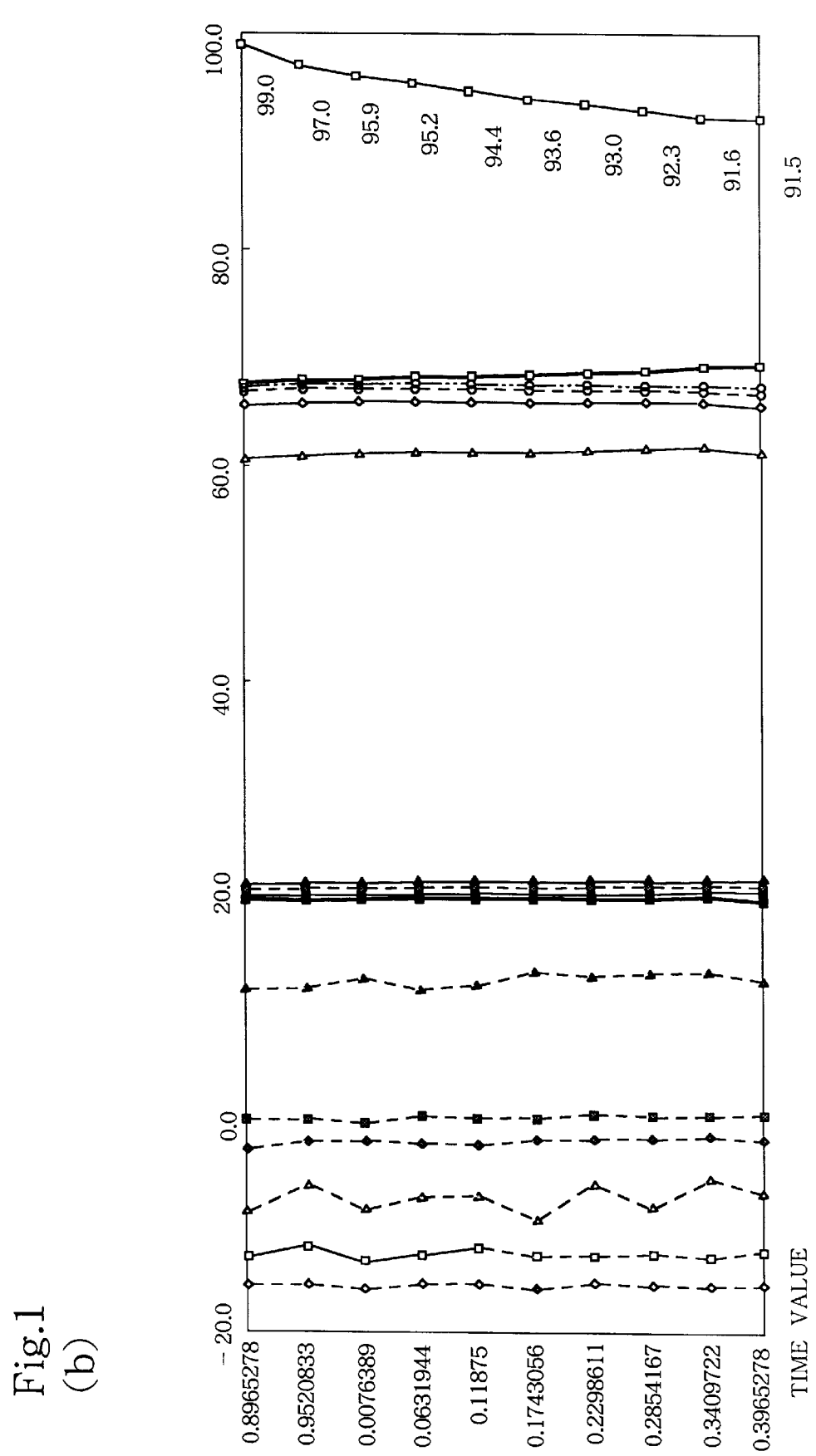
FIG. 1(b) is a graph representing the above table data.

It is naturally understood that an arrangement of a high conductive porous structure relative to the membrane proximity can bring about an action as discharging electrode to the porous structure. In this connection, the column item headings in FIG. 1 are as follows: (the columns in following similar tables have the same headings.)

a: Time value
b: Temperature ° C. inside of box;
c: Relative humidity RH inside of box;
d: Temp. ° C. inside of inner chamber;
e: Relative humidity RH inside of inner chamber;
f: Temp. ° C. inside of inner support box;
g: Relative humidity RH inside of inner support box;
h: Temp. ° C. inside of outer chamber;
i: Relative humidity RH inside of outer chamber;
j: Temp. ° C. inside of outer support box;
k: Relative humidity RH inside of outer support box;
l: Temp. ° C. in the outside atmosphere; m: Relative humidity RH in the outside atmosphere;
n: Surface voltage at the box side of membrane 1;
o: Surface voltage at the inner chamber side of membrane 1;
p: Surface voltage at the inner chamber side of membrane 2;
q: Surface voltage at the outer chamber side of membrane 2;
r: Surface voltage at the outer chamber side of membrane 3;
S: Surface voltage at the outer atmosphere side of membrane 3.

In this connection, as an ideal electrical theory, the most effective needle electrode might be preferable as discharging electrode. The portions facing each other are membranes, so that a parallel arrangement of a structure having such a sharp edge and the membrane body may cause damage to the core membrane portion when it is subjected to pressure fluctuation or physical vibration of passing gas. In short, outbreak of damage in the membrane may cause degradation of the separation performance and the structure of the membrane, so that the parallel arrangement will be unacceptable in the case of setting in proximity of membrane.

Therefore, a composition element with a windbreak finlike shape is considered advantageous for intensifying the uniform electrical field in the membrane.

In this case, considering acquisition of a desirable efficiency, that is, obtaining an electrical field strength as equalized as possible, the mesh diameter must be small and equally distributed, as well as have a configuration which can create a flat-plate-like field. Therefore, ideally, it is desirable that the holes of high conductive porous structure should have a one-to-one correspondent quantity ratio for the membrane holes.

This is because: An ideal satisfaction of not only (1) the quantity ratio of holes on unit area but also (2) a positional correspondence required from the standpoint of more reduced resistance elements standing in the passing direction of gas passage would be able to suppress possible turbulent flow in discharging space to be formed in between the membrane and the high conductive porous structure in the separation process so as to establish smooth transport of gas.

In considering the affection of the viscosity of fluid in the passing direction, to suppress resistance elements appearing in the passing direction of gas so as to establish smooth transport of gas, it is desirable that the vertical arrangement geometry of the porous structure relative to the membrane surface be such as to reduce the surface contact area of passing gas flow in the passing direction as much as possible.

Therefore, in relation to a section in the passing route of gas, which will not interfere with gas compression or vaporization, it is advantageous to use an egg-like section including a secondary curve satisfying an orientation for membrane surface compatible to compression.

3. On the other hand, when high conductive porous structure advances forward membrane surface so as to intensify electrical field, a plurality of staggered steps may be formed at both ends in the gas passing direction by the very approach of the porous structure to the membrane. This formation of steps may generate an electrical polarization in the intended bilateral gas passing directions of the separation module, inclusive of the electrification of the chamber and chamber wall as well as electro-magnetic field influence as a relational element positional to the main box, so that total charges in the plurality of steps may surpass an electrical field strength at one separation process in the separation vital points, that is, the membrane and the high conductive porous structure. But, any way, in order for a substance to transport bilaterally, this fact would cause the variable charge condition to be varied in accordance with the actual variation of the electrical field strength, so as to follow the condition of the charging inclination. Therefore, interaction of transport substances in such a variation process would affect as variation in the magnitude of transport resistance, thereby resulting in the suppression of transport velocity.

Then, however, in case the porous structure is grounded, the structure can be an electrical neutral point, thereby generating an electrical field given to the membrane surface.

This electrical field relation may be schematically presented in FIGS. 2(a) and (b). In this case, it is assumed that the side of chamber cavities of the chamber wall is charged to positive polarity. FIGS. 2(a) and (b) show the conditions of droplets to be charged in relation to the charge-oriented field of droplets under an electrical field environment.

FIG. 2(c) is a schematic diagram showing a charging in a molecular level. (From a Numerical Simulation of Warm Fog Dissipation by Electrically Enhanced Coalescence, J. Appl. Meteorol. 16.7. p 683–696)

FIG. 2(b) shows a transitory change in oxygen-hydrogen atom orientation and a fluctuation of charge condition. This electrical field has negative polarity so as to produce an electrical field in the directions of the arrows shown by dotted line.

Therefore, when intensifying an electrical field with a grounded high conductive porous structure disposed, it is necessary to pay attention to the orientation of the field in addition to the orientation of temperature gradient.

Figure 3B:
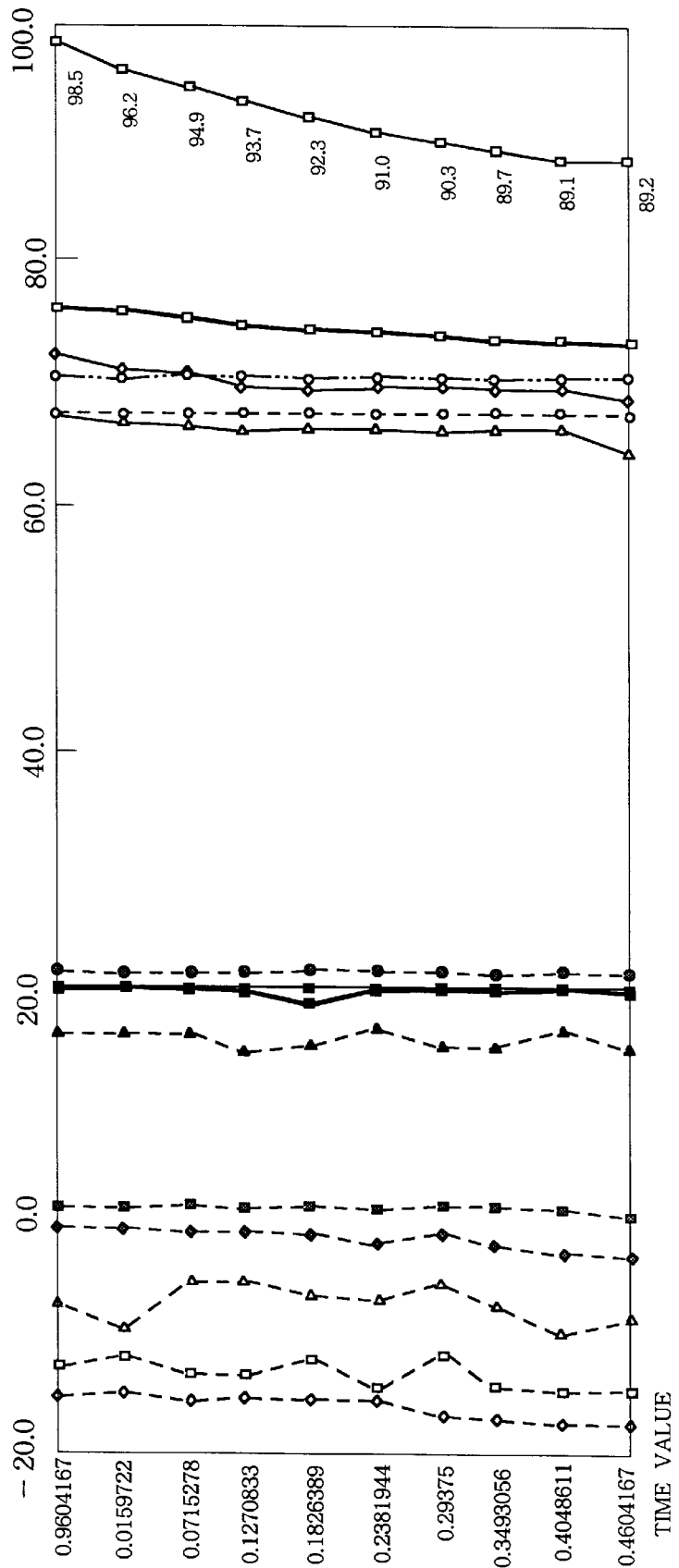
FIG. 3(b) is a graph representing the above table data.

Now, the above will be illustrated using the graph shown in FIG. 3: In the test 1-0, the membrane voltage at the side of main box is inclined to the anode side and the membrane voltage at the outer atmosphere to the cathode side.

Further, their inclination angles seem to have a tendency to maintain respective fixed inclinations.

Figure 5:
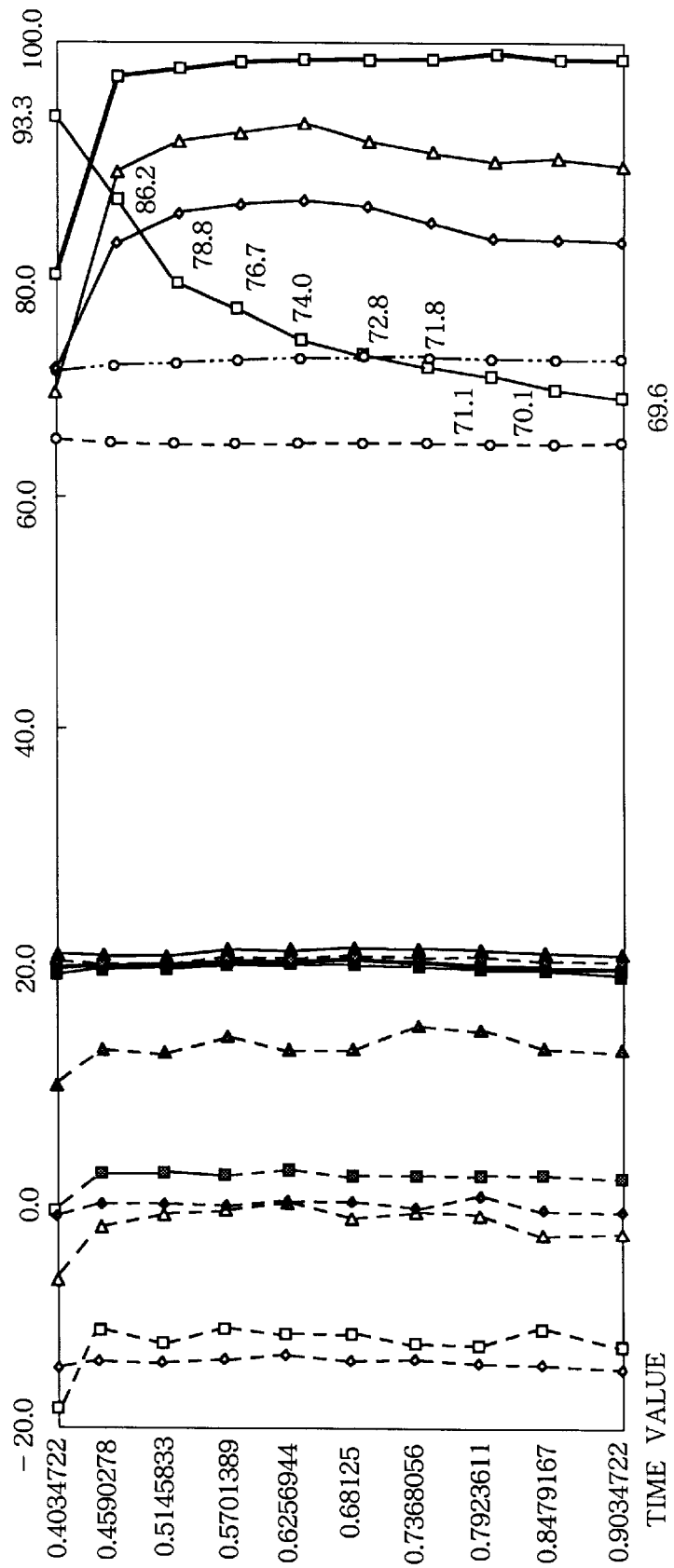
FIG. 5(a) is a table showing measurement results such as the temperature, humidity and surface voltage at each part under the moisture converging from 93% in the box to 73% at the outside atmosphere, without setting the conductive porous structures.
FIG. 5(b) is a graph representing the above table data.
FIG. 5(c) is an enlarged view showing temperature change in the table.
Figure 6:
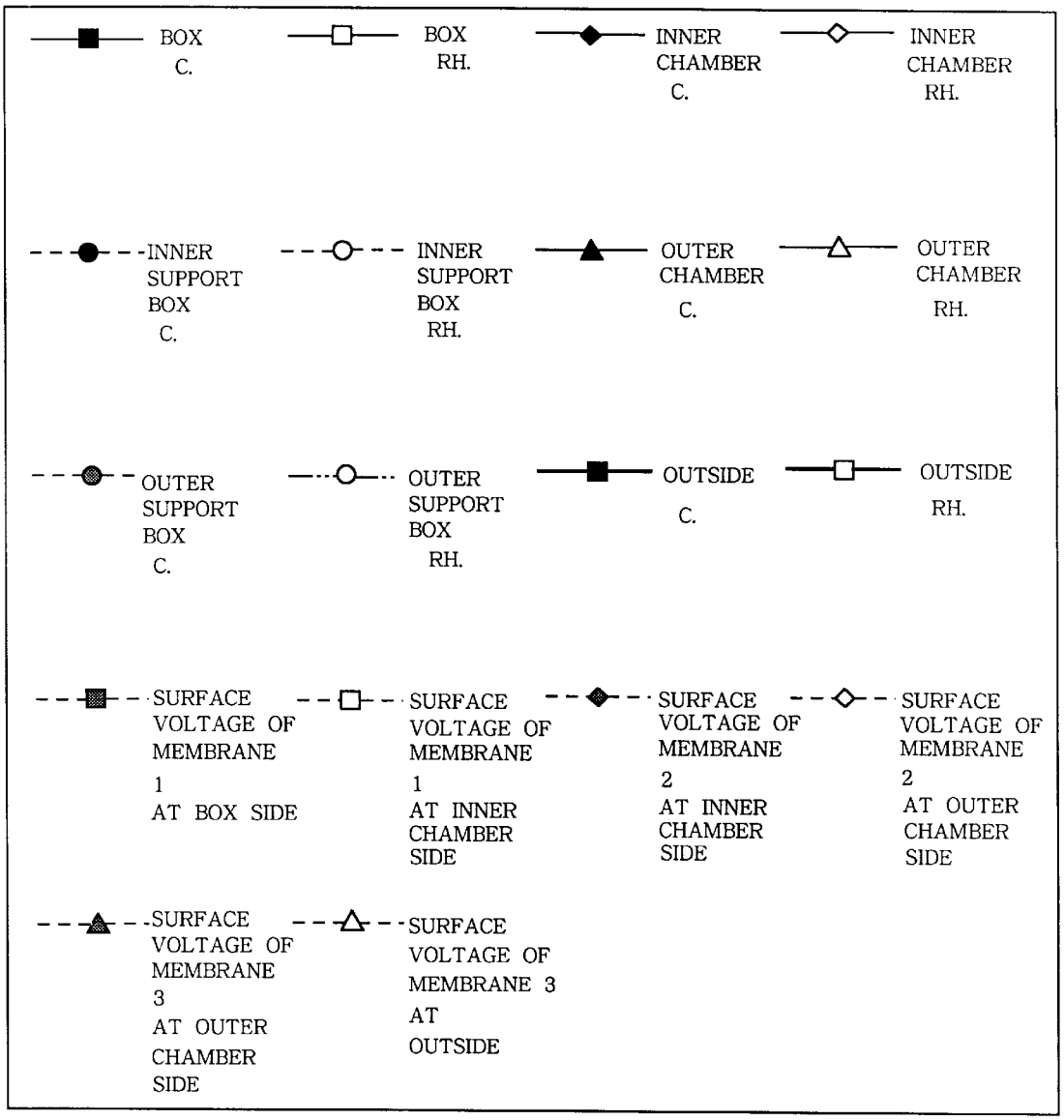
FIG. 6 is an illustration showing the meanings of marks used in the graph in FIG. 5(b).

Consideration of these effects in the separation process shows that, in the process where the humidity inside the box is dropping from 100%, not only the initial drop condition but also its fluctuation are acting as influential factors in the aforementioned gas passage slightly but continuously. (Refer to the table showing electrification rank (excerpted from Chijin Syokan: Static Electricity Handbook 11th edition, p 72) Refer to the graphs shown in FIGS. 5(a), (b) and (c). In this connection, FIG. 6 is an illustration showing the meanings of marks used in the graphs.

Now, description will be made for the types, component arrangement and sensor arrangement of the separation module models used in the invention: (Refer to the separation module shown in FIG. 9)

The first membrane 1 used Model BREATHRON 1108-N40C.

The second membrane 2 used Model BREATHRON 1100-C40A.

The third membrane 3 used Model BREATHRON 1050-P20B.

FIG. 7 shows respective sections (from Nitto Denko catalog). FIG. 8 shows respective physical properties (from Nitto Denko catalog). BRN is the abbreviation for BREATHRON.

In this case, the first membrane, the second membrane, and the third membrane are respectively disposed from the box 4 toward outer chamber (outer atmosphere). Respective membranes form two chambers: (1) an inner chamber 5 at the side of the box 4 and (2) an outer chamber 6 at the side of outer atmosphere. Both chambers 5 and 6 constitute a gas passage, around which an inner support box insulation cavity 7 and an outer support box insulation cavity 8 is formed Temperature and humidity sensors are disposed in the box, inner chamber, inner support box insulating cavity, outer chamber, outer support box insulating cavity, and outer atmosphere.

Surface voltage was measured for the three membranes; (1) at the non-woven fabric side locating above the respective membranes and (2) at the water repellency side locating under the respective membranes. The dimensions of the cylindrical chamber 5 or 6 are diameter of 92 mm; height of 50 m. The dimensions of the rectangular parallelepiped box 1 with cavity there inside are 300×300×400 mm.

Figure 9:
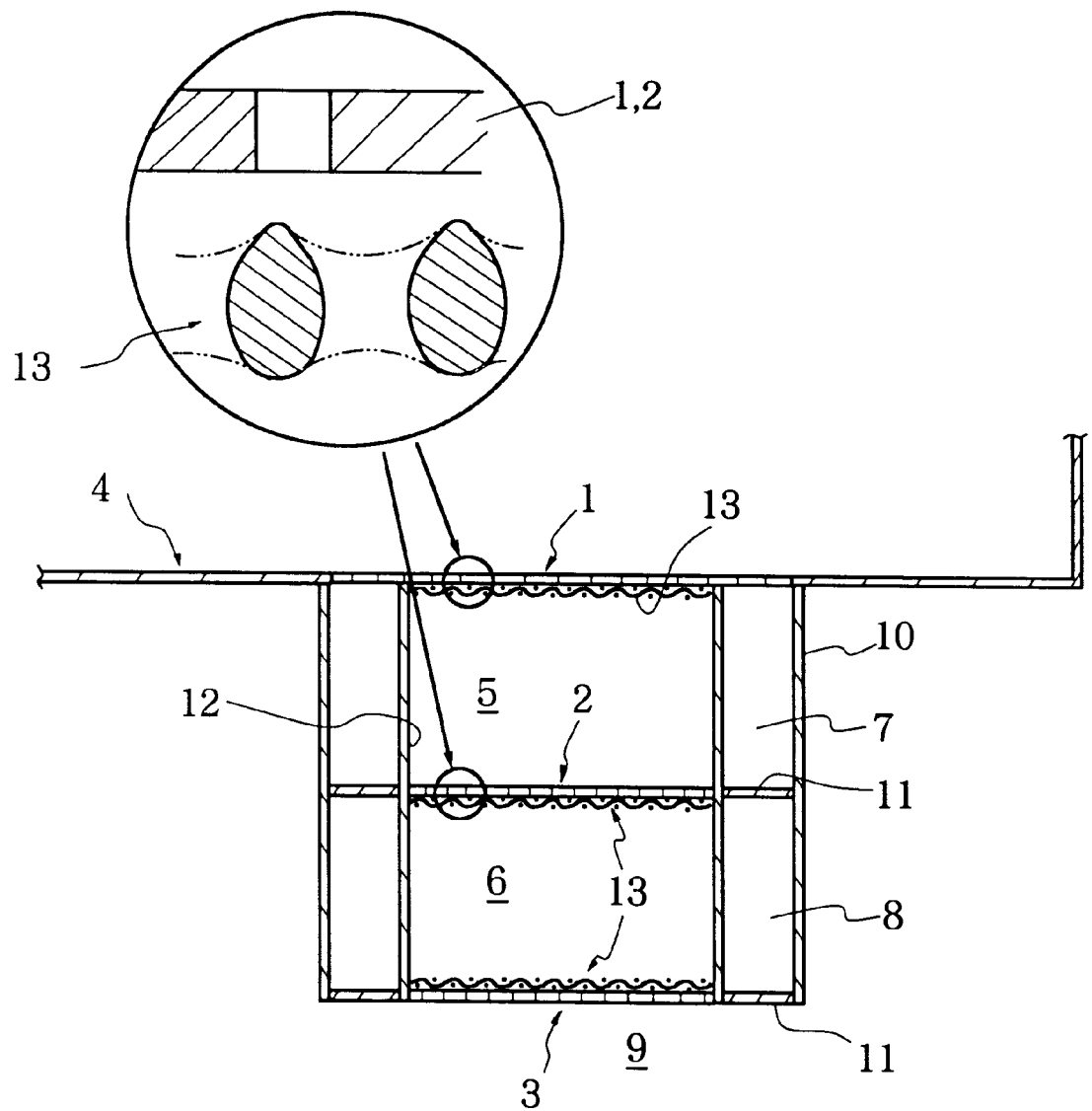
FIG. 9 is an illustration showing a separation module.

In FIG. 9, Numeral 10 is a cylindrical casing, 11 is partition plate, 12 is chamber wall, 13 is meshes forming the conductive porous structures.

When a reverse polarity of conductive substance is arranged, since the field strength also can be intensified, an electrical field appearing in the case where the separation membrane is held with nylon mesh also can be intensified. This case, however, may have a change of an electrical field with a polarity reverse to the setting of the conductive structure.

As described above, such relational arrangement of the orientation of the water repellent side and the non-woven fabric side would produce different non-conductivity at the both surfaces. Further, since water vapor is electrified by the friction of droplets, the friction phenomenon in the porous membrane associated with vapor passing through it or the friction phenomenon of water vapors with each other significantly affects the surface voltages on both surfaces. (This accounts for the record that there was no dust attached.)

Further, setting of resistor to the grounding line may be not adaptable for setting capacitance gradient, but may be effective for adjusting drying speed.

Therefore, for provision of capacitance gradient, gradient formation in the space between a grounded chamber and an ungrounded chamber is effective. According to this means, since an intensified field means an increase in capacitance, arrangement of a high conductive porous structure in a chamber to increase the number of structures or conductor volume results in an increase of capacitance or an intensification of electrical field.

Therefore, adaptation of this law for the temperature gradient arrangement can not only realize the most effective miniaturization, but also achieve a stable function enhancement.

Ideally, an environment where temperature tends to lower in the compression direction of gas passage can easily accelerate a decrease in capillary condensation, or an environment where temperature tends to rise in the depressurization direction of gas passage can suppress dew point lowering, so that it is expected that capillary condensation may be suppressed.

Figure 10:
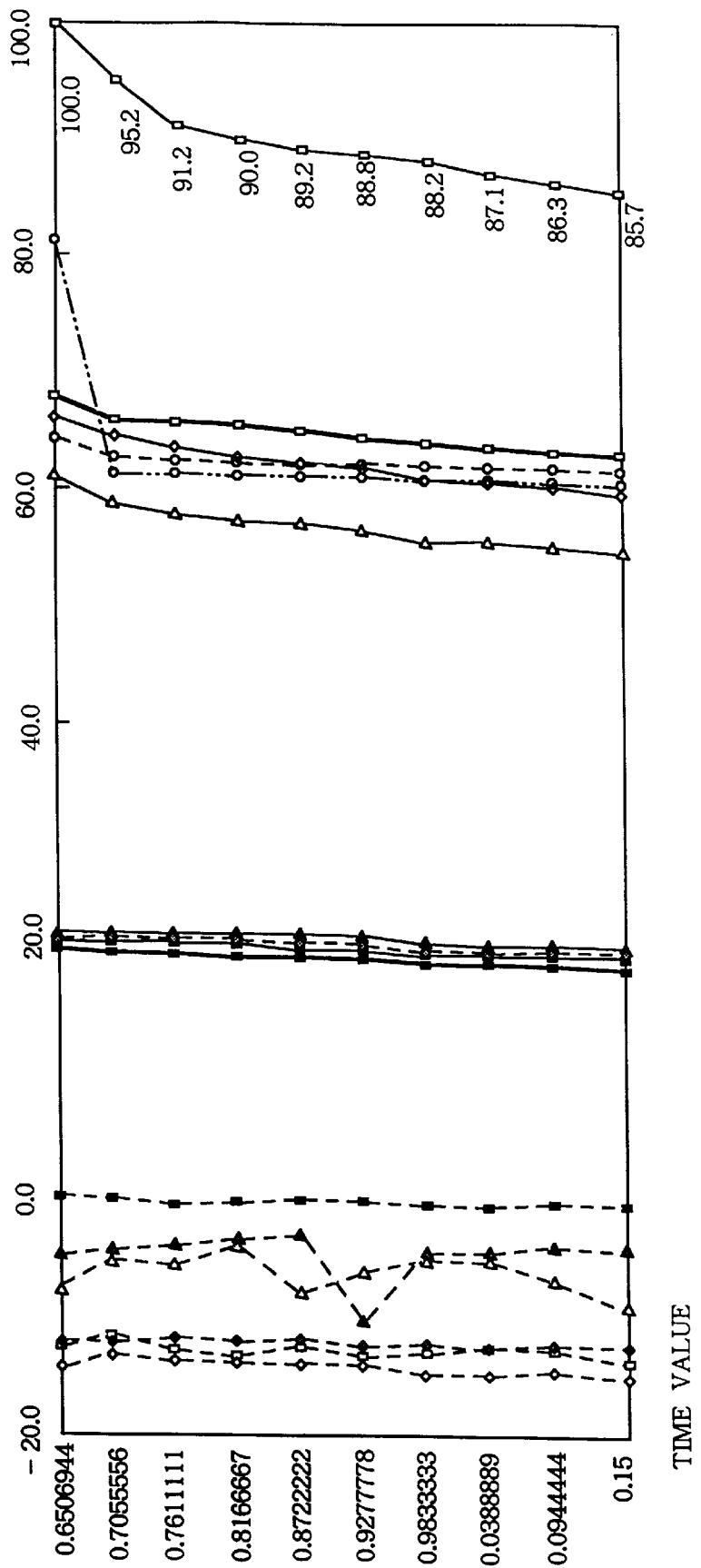
FIG. 10(a) is a table showing measurement results such as the temperature, humidity and surface voltage at each part when the moisture starts from 100% in the box and 60% at the outside atmosphere, with the three conductive porous structures grounded to the earth.
FIG. 10(b) is a graph representing the above table data of FIG. 10(a).
FIG. 10(c) is an enlarged view showing temperature change in the table of FIG. 10(a).
Figure 10C:
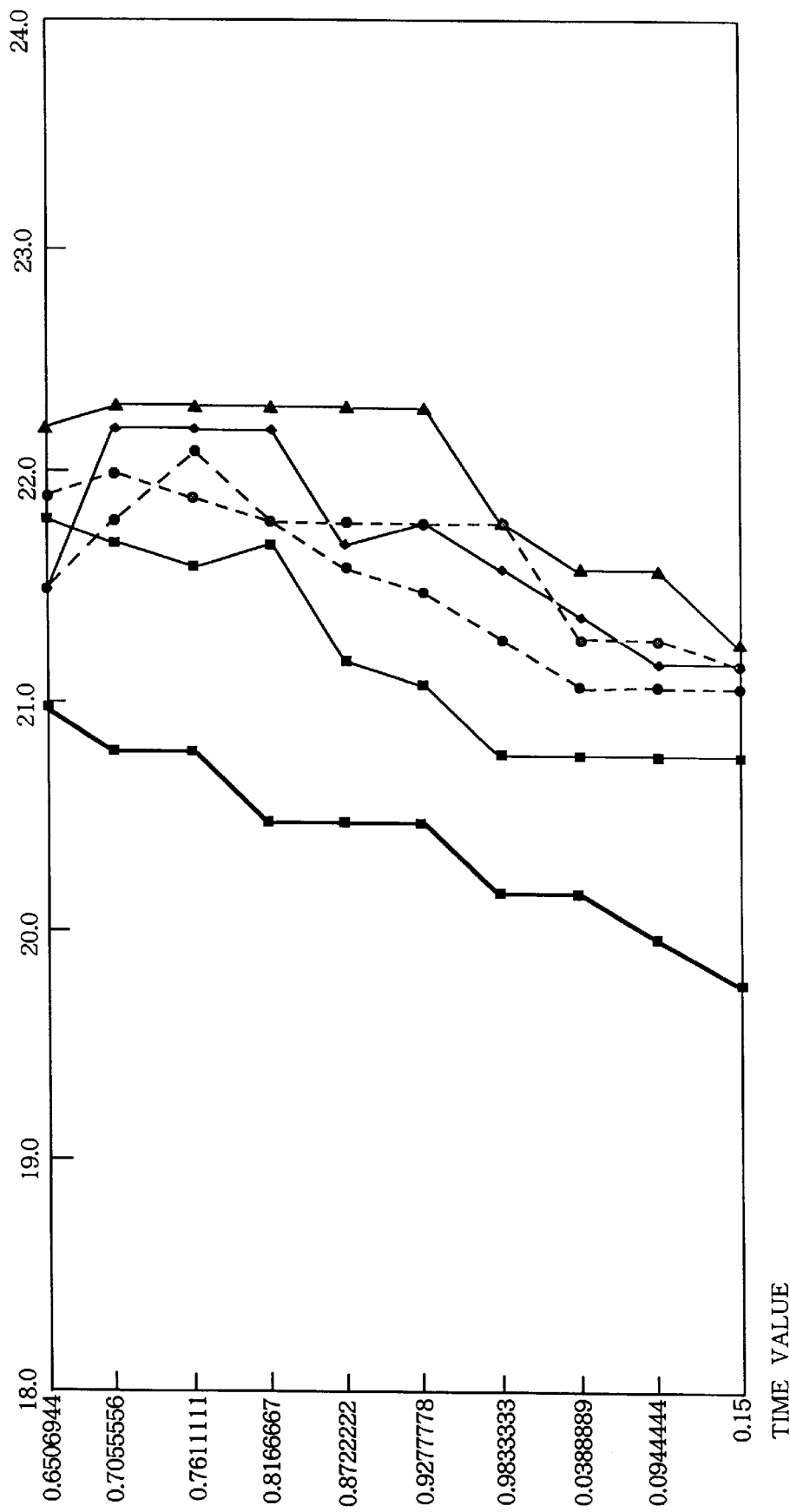
Figure 11:
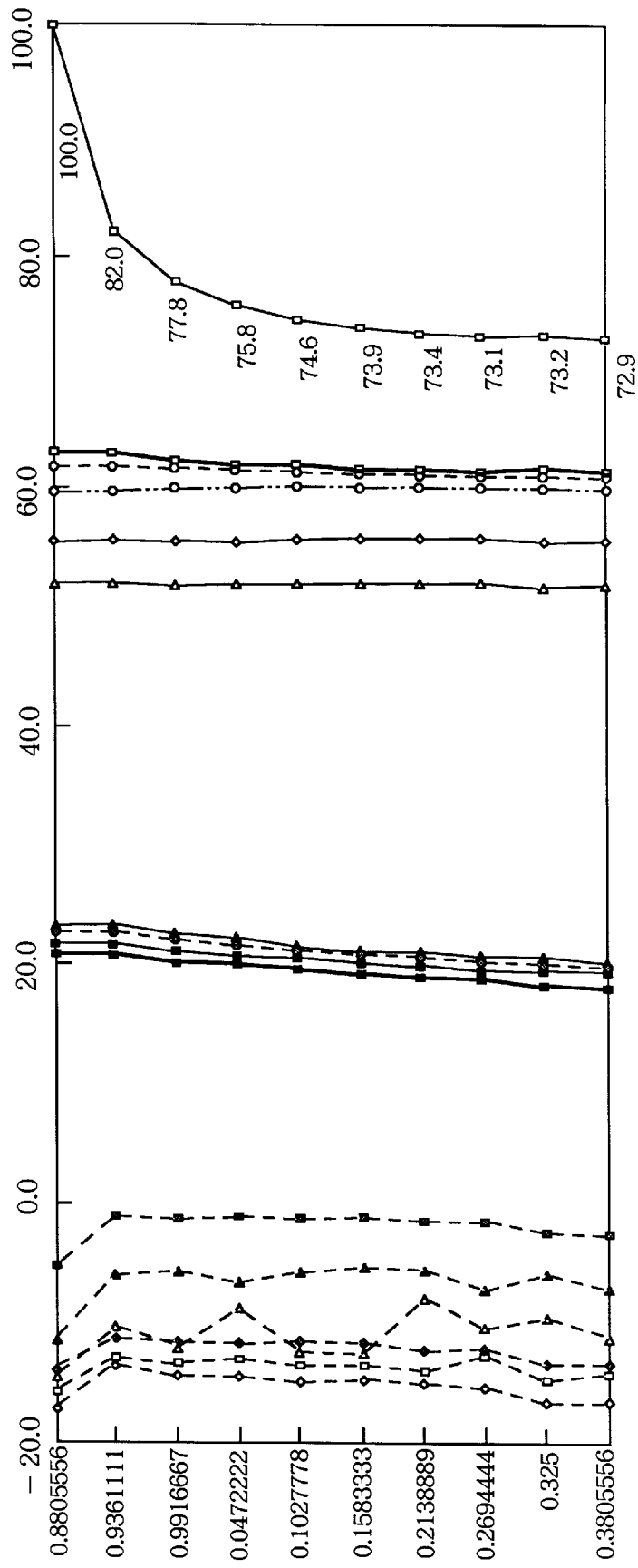
FIG. 11(a) is a table showing measurement results such as the temperature, humidity and surface voltage at each part when the moisture starts from 100% in the box and 60% at the outside atmosphere, with the three conductive porous structures grounded to the earth.
FIG. 11(b) is a graph representing the above table data of FIG. 11(a).
FIG. 11(c) is an enlarged view showing temperature change in the table of FIG. 11(a).
Figure 11:
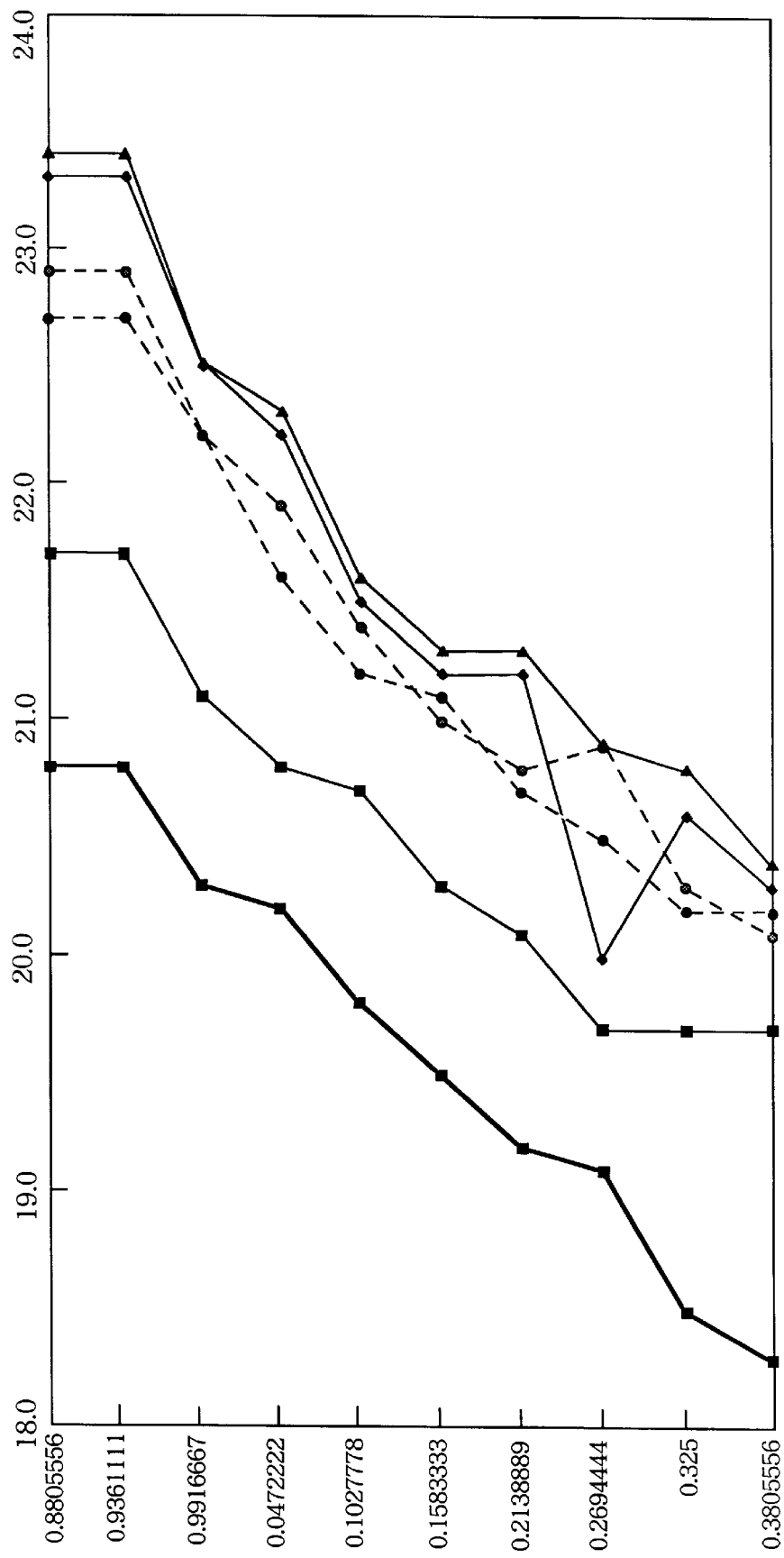
Figure 12:
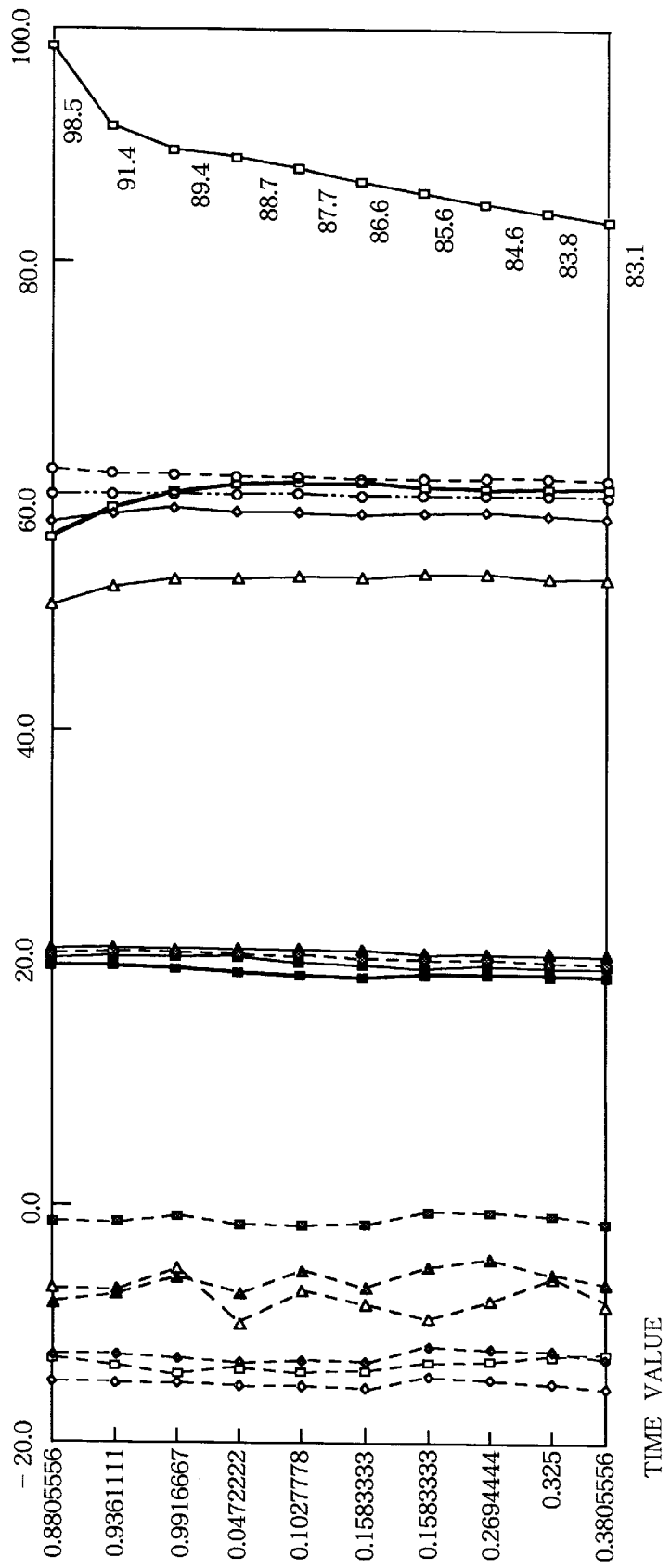
FIG. 12(a) is a table showing measurement results such as the temperature, humidity and surface voltage at each part when the moisture starts from 100% in the box and 60% at the outside atmosphere, with the three conductive porous structures grounded to the earth.
FIG. 12(b) is a graph representing the above table data of FIG. 12(a).
FIG. 12(c) is an enlarged view showing temperature change in the table of FIG. 12(a).
Figure 12C:
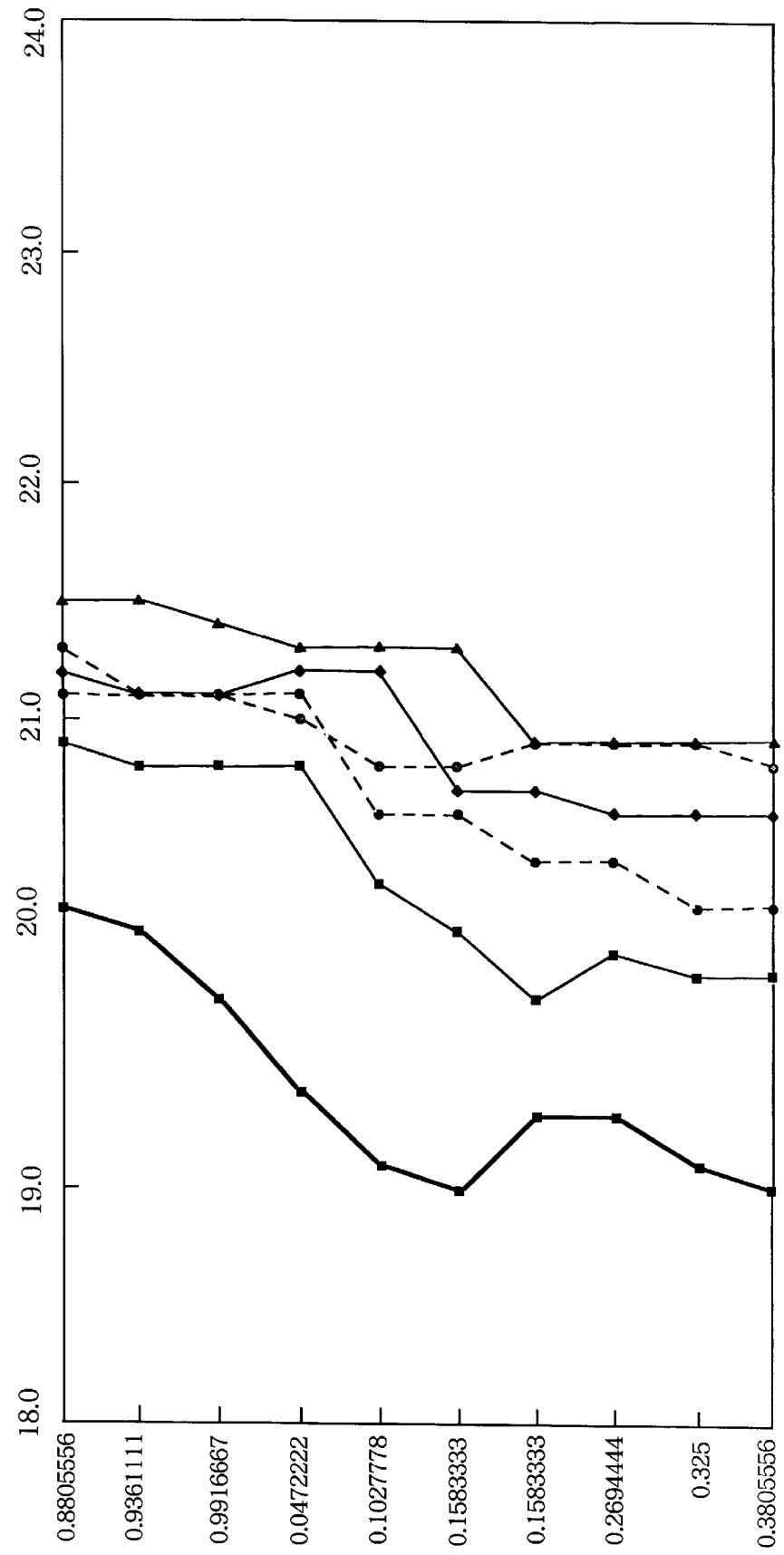
Figure 13:
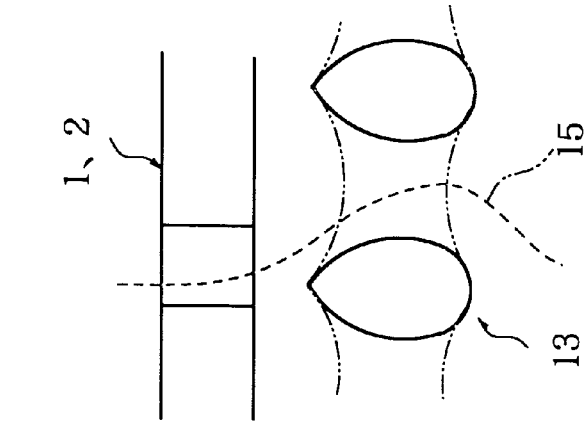
FIG. 13 are illustrations showing gas flow, when the position of the rear portion of conductive porous structures having (a) square, (b) circular, (c) elliptical and (d) egg-like sections is shifted from the center of the membrane hole.
Figure 13:
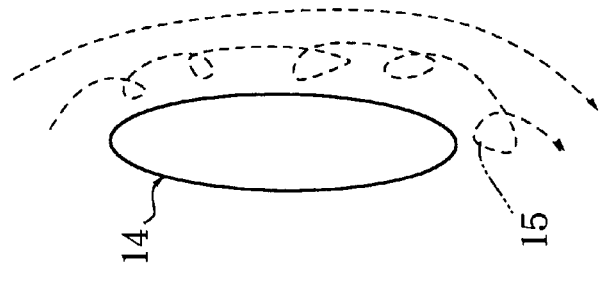
Figure 13:
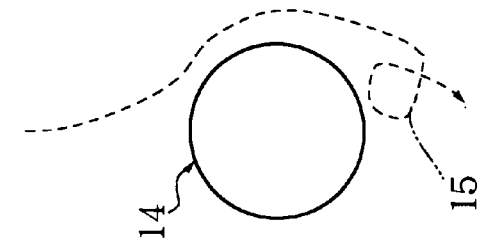
Figure 13:
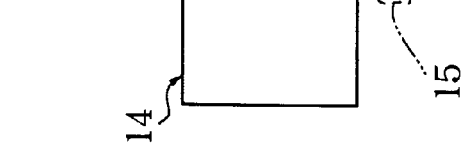

When temperature change is continuously taking place in accordance with the graphs shown in FIGS. 10(*a*), (*b*) and (*c*), FIGS. 11(*a*), (*b*) and (*c*), FIGS. 12(*a*), (*b*) and (*c*), and in FIG. 1, if temperature gradient between chambers does not continuously exceed the outbreak point of these capillary condensation phenomena, a continuous vapor transport tends to take place. On the contrary, if temperature gradient runs counter to ideal one, sealing of holes may take place, thereby symbolically resulting in water vapor transporting into such chamber space as gas passage and the like, caused by the natural diffusion of the water droplets sealing the holes.

The grounding of the conductive porous structure may accelerate temperature lowering of the porous structure caused by heat of vaporization, thus leading to the generation of temperature gradient, and further, the more important thing is that the heat conduction of the porous structure is faster than the membrane, so that temperature dissipation also becomes faster, thus resulting in an outstanding temperature gradient.

Therefore, let us assume that temperature change takes place or temperature is kept low as the results of following reasons: (1) temperature change speed due to attaching or scattering of the water vapor totally exceeds the membrane temperature change speed, and further (2) temperature change speed under the transition of water vapor in a space formed by the membrane and the conductive structure is always subject to the influence of vaporization heat and the like caused by various phenomena such as attaching or scattering of water vapor in the porous structure. Then, it may offer an invitation to a calculation of a mass or surface area required for the conductive porous structure.

To sum up, in the calculation of necessary mass, surface area and volume, calculate temperature change speed per unit mass using conduction speed. Pay attention so as not to fail to have this temperature change exceeding the temperature change speed of the membrane portion.

On the other hand, to suppress condensation phenomenon or dewing phenomenon in the conductive porous structure, an excessively large mass of the conductive porous structure leads to the suppression of the temperature change speed and to the acceleration of dewing phenomenon, thus resulting in the suppression of the passing-through of separated gas.

This relation may be schematically described as follows:

Condensation temperature of transport gas on membrane surface

>

Condensation temperature on surface of conductive porous structure

Concentration of passing gas at the holes of membrane

> or <

Concentration of passing gas at the holes of conductive porous structure

Temperature change speed of membrane

<

Temperature change speed of conductive porous structure

In practice, all of these above relations must be satisfied in the environment where convection in chamber space, temperature or radiation heat of chamber wall, gas transport by electrical field, and flow speed or volume of passing gas delicately affect each other. Therefore, the above-described porous structure having an egg-like section in the gas passing direction is considered preferable.

FIGS. 13(*a*), (*b*) (*c*) and (*d*) are illustrations showing typical sections of the conductive porous structure 14 in an arrangement in the gas passing direction. In the drawings, waved lines show assumed flow lines 15; FIG. 13(*a*) shows a geometry which may easily have turbulent flow or disturb flow velocity; FIG. 13(*c*) shows that too large area causes turbulent flow which tends to disturb and suppress flow velocity; and FIG. 13(*d*) shows a geometry which generates compression, thereby suppressing turbulent flow.

Such some geometry of the conductive porous structure as to eliminate turbulent flow are applied as curves conforming to hydrodynamics, by estimation of viscosity in accordance with the product of gas permeability and moisture permeability corresponding to each membrane portion, and by estimation of gas flow velocity based on gas passing velocity (volume ratio).

For example, when gas speed is fast, turbulent flow becomes more problematic rather than viscosity; on the contrary, when extremely slow, not only viscosity but also turbulent flow may become problematic. In particular, when small water vapor particles are emerging, the gas may have high viscosity, but, when relatively larger, this tendency may be negligible.

Such phenomena are particularly important factors for electrostatic water vapor. In other words, viscosity is considered to appear in the electrostatic water vapor. Further, the membrane is a dielectric substance, thus causing water vapor having passed through the membrane to be subject at least to some electrostatic influence from the membrane, or to slightly affect the membrane while transporting. Under wet condition, the membrane would bear a behavior like a conductor.

FIGS. 14(*a*) and (*b*) are graphs showing viscosity of gases and liquids. (Excerpted from Sangyo Tosyo: "Transport Phenomena", 8th edition, p. 316)

Therefore, at membrane portion of low moisture permeability with high concentration of water vapor at the portion, it is necessary to take much account of viscosity, and make total length in the gas passing direction as short as possible. On the contrary, at membrane portion of high moisture permeability with high concentration of water vapor at the portion, it is necessary to make the total length further shorter than at the membrane portion of low moisture permeability.

The distribution density of the holes is considered to be tight at the membrane portion of low moisture permeability with high concentration of water vapor, and coarse at the membrane portion of high moisture permeability with high concentration of water vapor. Conversely, with non-Newton fluid, the former may be coarse and the latter tight so as to set heat diffusion inclination in accordance with the viscosity and flow speed. In principle, intentional formation of inclination at the temperature gradient is the main target for the porous structure, but this formation may result in a cause for generating turbulent flow, thereby further helping to produce mixing effect.

Therefore, a setting of conductive porous structure, in which the structure is so arranged as to have the best temperature inclination disposition and grounded to the earth in arbitrary application of such a geometry of hydrodynamics characteristics as described above, is a very effective means, and particularly effective when the chamber cavity area of the chamber wall portion is extremely reduced.

Therefore, this means is very effective in preventing the back pressure of concentration gradient from building up, or in setting an intentional reverse concentration gradient, and very effective as a means for solving contradictions such as an increase of the minimum value or a decrease of the maximum value caused by setting a reverse inclination in the inclined water vapor transport quantity due to the moisture permeability of the membrane and the gas permeability.

The reason is as follows: (1) when flow speed is fast, selection of the above geometry that does not produce turbulent flow can secure a fast flow speed. On the contrary, (2) when flow speed is slow and a geometry is intentionally selected so as to produce a remarkable turbulent flow, a reverse concentration gradient will be formed in the space in between adjacent porous structures, natural diffusion following the concentration decrease at the outer atmosphere will speedily take place by the grounding of the porous structure, and further, as described previously, temperature gradient will be stably set by heat of vaporization from the porous structure.

Therefore, without using an extreme arrangement, the above situation may advantageously act on the concentration drop in the chamber. Otherwise, for the same geometry of porous structure, the tight and coarse portions of the porous structure may be arranged in accordance with the positional relation of the chamber wall and the membrane and with chamber volume, flow rate and flow velocity so as to have an enhanced stabilization of temperature inclination. For example, (1) for a cylinder type of sectional split arrangement, the porous structure may be formed into concentric circles or rings, and (2) for multiple-cylinder type, formed into bands of cylinders.

In addition to such a setting, connection of the second membrane portion to a grounding system having the contact point on a spiral-shaped contact extension by moving the membrane completes a system which can regulate, for example, the loss of heat of vaporization in accordance with the natural displacement.

In short, an approach over a certain degree would secure not only a reduction in contact resistance but also a complete contact over the entire area.

Figure 15:
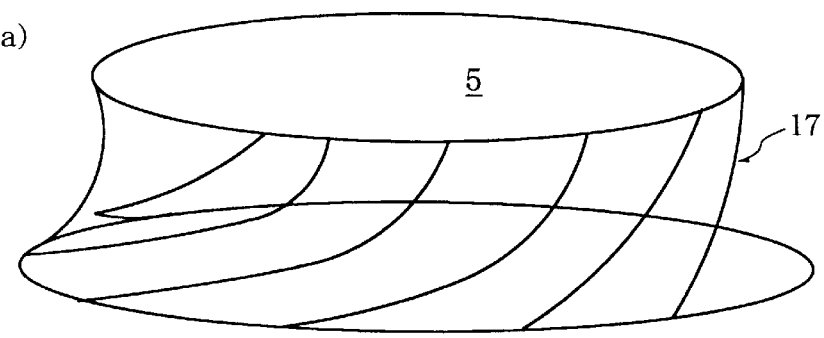
FIGS. 15(a) and (b) are (a) a sketch drawing and (b) a horizontal sectional view showing a drawn construction of a chamber wall.
Figure 15:
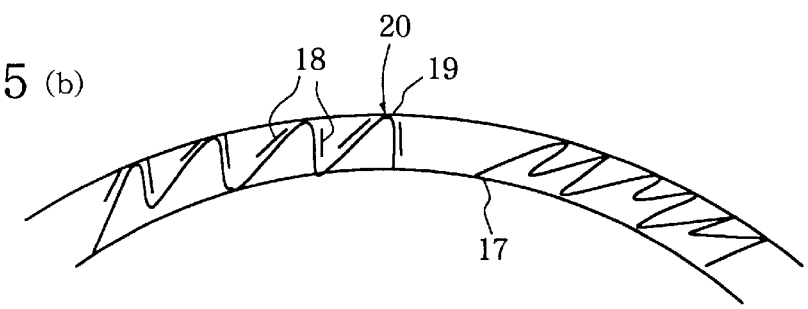

Now, preferable embodiments according to the invention will be described as follows:

FIGS. 15(a) and (b) show a configuration which can obtain a decrease in chamber volume as a twisting movement runs and a chamber wall easy to generate turbulent flow, as well as a connection to the grounding system which reduces resistance gradually. In the drawings, Numeral 17 is a chamber wall; 18 is a conductor, and 19 is a discontinued portion.

The conductor 18 is not located at a folding portion 20, so as to secure a weak rigidity.

Figure 16:
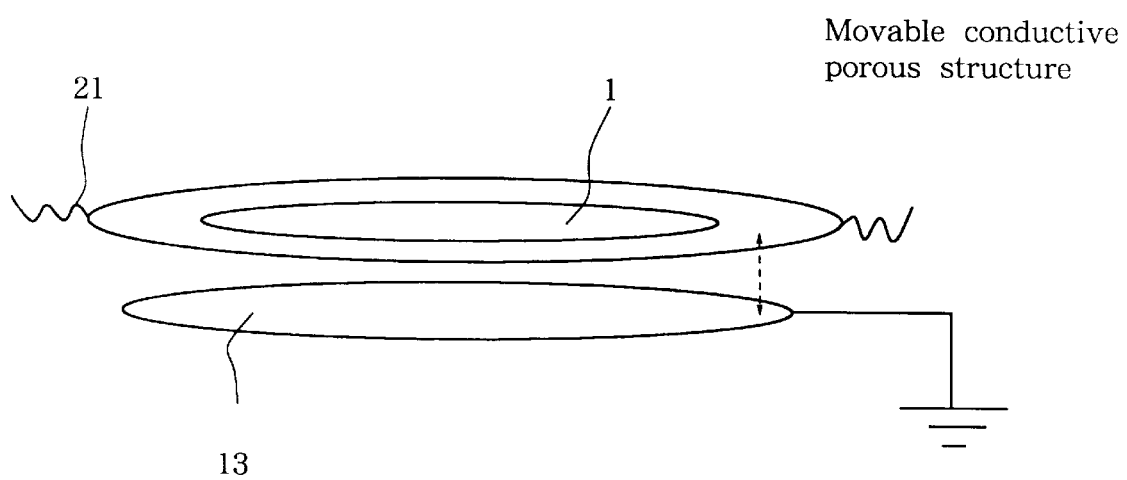
FIG. 16 is a sketch showing a security method of contact point of a movable conductive porous structure.

Their positions may be adequately changed at the inner side and the corner position in accordance with the displacement FIG. 16 is a sketch showing an embodiment with a movable waterproof membrane 1: the contact by movement in the dotted line direction can obtain a simple and easy method which completes the connection with the grounding system. Numeral 21 is a movable and flexible support.

Important thing is that the membrane be located at a position compatible with temperature gradient and voltage rise.

With the membrane oscillation means, the oscillation coefficients of respective membranes may depend on the distance from the oscillation source, the volume of chamber cavity, and the construction of membrane hole portion. The reason why this configuration is employed is that membrane deformation due to oscillation induces a fluctuation of hole shape, thus causing an unstable characteristic.

In this case, clogging in the membrane hole may tend to incline toward the easily-displaced side, thereby easily transporting the water particles inside of the hole toward water repellency surface side.

As the result of transporting, the transported water particles will not easily stay in the portion by the water repellency phenomenon generated by the water repellency surface after transport, thus easily transporting to the chamber rather than to the non-water-repellency surface. Since there may take place a rapid decrease in water repellency following a lowering voltage caused by longer residence of water vapor and water itself on the membrane surface, such a configuration may be conceived of, as water repellency and gas permeability is higher successively from the oscillation source, and the moisture permeability decreases toward the outer atmosphere. But, in this case where the oscillation source, the heat source (coil portion) and the porous structure constitute a heat transfer system, the oscillation source must make an arrangement reversal to the embodiment.

A sound pressure level SPL at a location a distance "r" apart from the point sound source is expressed as SPL= PWL-20 $\log^{10}$ r-k (where PWL=acoustic power level). The attenuation is influenced by the distance r from the sound source, but considered as the same regardless of sound field geometry such as free space, semi-free space and so on.

There is a following relational expression between acoustic power level PWL and acoustic power P (W):

$$PWL=10 \log^{10} P/Po, \text{ where } Po=10^{-12} W$$

Sound intensity I is expressed by I=P/4 $\pi r^2$ (W/m$^2$)

There is a following relational expression between sound intensity I and acoustic power P (W):

$$I/10^{-12}=(P/10^{-12})(1/4\pi r^2)$$

Sound intensity depends on the distance from the sound source, and the geometry of sound field such as free space, semi-free space and so on.

In principle, temperature gradient can be a sustaining strong thrust, so that an arrangement incompatible with this gradient relationship may result in the outcome of ineffective results with respect to transport direction.

In a case where natural diffusion is progressed from higher temperature to lower temperature, particularly in an application to a separation of specific gas considering the existing electrical field, an enforced transport retrogressive to condensation point may produce a phenomenon close to an ultra separation.

1. Now, design of the high conductive porous structure in the gas passing direction will be made paying attention to the generation of turbulent flow.

1-1

When the development of turbulent flow is clearly recognized, flows close to the turbulent flow tend to be unstable. In such a static condition as with in the separation module, particularly in such a slow flow speed as evolving when the differential temperature between the temperature inside of the box and the temperature at the side of outer atmosphere is very small, a hydrodynamic influence of the porous structure to be set close to the membrane may not be neglected. In this case, it is necessary to make a geometrical design of the hole portion taking into consideration a possible influence of heat of evaporation during the time when the gas to be removed is passing through the hole portion of the porous structure in the transport direction, so as to have an agreement of the compression or depressurization geometry of the hole portion with a static flow speed.

1-2

If the transport condition is dynamical, that is, there is a significant differential temperature between the temperature inside of the box and the temperature at the side of outer atmosphere, it is expected that the porous structure is subject to a strong hydrodynamic influence, so that the compression or depressurization geometry of the hole portion should be designed in expectation of a geometry less causing the development of turbulent flow.

1-3

When the evolution of turbulent flow can be neglected, influence of the surface area of the porous structure should be taken into account.

More particularly, there are two intended cases: (1) de-humidification and (2) humidification or humidity maintenance. In both cases, the porous structure should be located at a proper position for which an influence of the temperature of the very porous structure (to be expected after the gas is passing through an orifice or the minimum restricted portion) is taken into consideration. In this case, for example, in the case where a high thermally and electrically conductive porous structure is placed, an exchange of thermal energy can be made between the porous structure and the passing gas (water vapor), at the time when gas is passing while producing turbulent flow and attaching/ removing gas particles (water vapor) assisted by the stagnation of the turbulent flow.

At this time, it must be taken into account that expected temperature change behaviors after and before passing the orifice are placed under different conditions.

More particularly, there exists a strong influence as heat of vaporization, at the side of the chamber viewed from the narrowest portion of the holes in the porous structure, or, in other words, this side is under the condition where the loss of heat capacity tends to take place, while the condition at the opposite side or at the side of membrane tends to form stagnation between the membrane and the porous structure, thus easily making conservation of heat capacity.

As a result, in considering the chamber side of the porous structure viewing from the narrowest portion of the hole of the porous structure, influence as heat of vaporization is strong. In short, since this space tends to produce the loss of heat capacity, the surface area of the porous structure at the side of the chamber viewing from the narrowest portion of the hole should be minimized so as to stabilize the insulation characteristics of the porous structure, so that the section at the chamber side should be circular or near-circular. On the other hand, to stabilize the natural cooling characteristics of the porous structure, this surface area should be secured as large as possible.

Further, when the space between the opposite side of porous structure and the membrane is named "membrane side", in considering the membrane side of the porous structure viewing from the narrowest portion of the hole of the porous structure, the condition at the membrane direction tends to form stagnation in between the membrane and the porous structure, so as to conserve the heat capacity. Therefore, to strongly reflect the temperature characteristics of the conductive porous structure to the space between the porous structure and the membrane, the surface area of the porous structure in the space direction viewing from the narrowest portion of the hole in the porous structure should be secured as large as possible. On the other hand, to have less influence from the porous structure, the sectional shape of the porous structure at the side of membrane should be circular or near-circular.

In other words, as described above, to have a larger loss of heat capacity caused by the surface area, the surface area should be enlarged, while, to have a smaller loss of heat capacity caused by the surface area, the surface area should be minimized.

Figure 17:
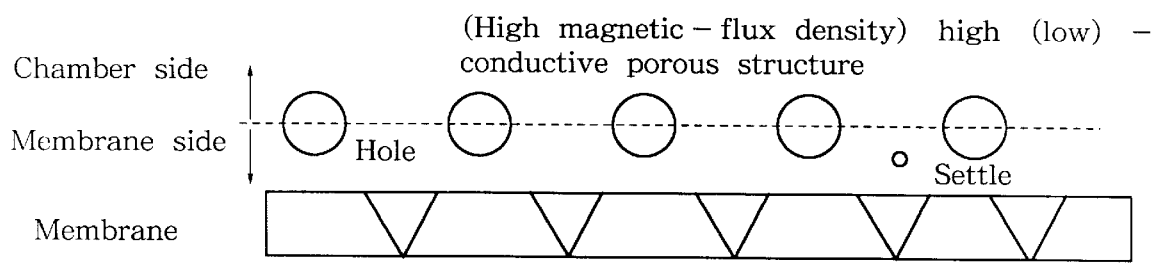
FIGS. 17(a) and (b) are schematic diagrams showing vertical sections in the vicinity of the membrane and the conductive porous structure.
Figure 17:
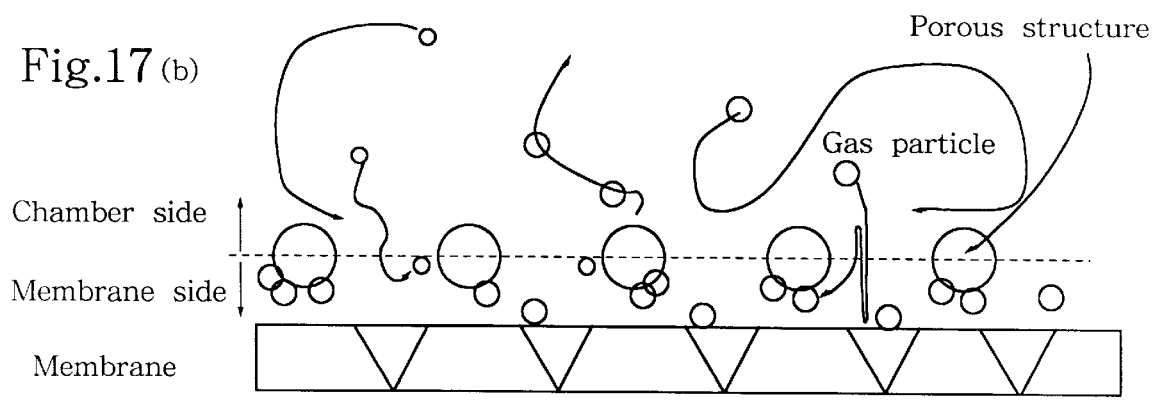

FIGS. 17(*a*) and (*b*) are illustrations showing such relation.

In the drawings, at the side of the membrane, gas (water vapor) particles tend to settle due to flow stagnation, so that the probability that the gas particles attach to the side becomes higher. On the other hand, at the side of the chamber, there is no such restriction that gas particles tend to be transported by convection and other flows, thereby resulting in a relatively low probability of attachment of gas particles.

Such relation depends on the relation between the flow and dew point of passing gas. The dew point (condensation temperature) is subject to the influences of the temperature of sites involved and atmospheric pressure. In this case of high flow speed and under compression, gas pressure decreases after passing the hole portion. In the case of gas flow speed where condensation takes place in this portion, the gas flow assists to develop temperature change to the porous structure.

In consideration of such unsteady factors, a surface treatment at the both membrane and chamber sides of the porous structure equivalent to the membrane, as well as a field-stabilization-oriented arrangement of membrane considering the influence of evolved field may combine to help to make an effective adjustment of stagnation and field distribution, thereby resulting in a suppression of electro-chemical reactions in the separation process, thus promoting an effective transport As a design method for activating same phenomenon as the loss of heat of vaporization on the water repellency surface by making surface treatment of electrical field on the porous structure, such water repellents made of resin as used on a repellency surface of the membrane may have a high adiabatic effect, but expectedly they are poor in transmitting the heat of vaporization to the porous structure entity, so that principally an application of metallic oxide film to the side intended for heat loss of the porous structure is advantageous in expecting heat change of the porous structure.

As with such surface treatment technique as described above, there is a typical method available, which manufactures the porous structure using high thermal conductivity aluminum: After lost wax process or embossing forming, alumina surface treatment is applied on one side only. Copper is a metal effective in shield purpose, and it is advisable to make a metal treatment listed up in the table on copper.

In accordance with corrosion potential rank (from Corona Co. Ltd: Revision Edition: "Corrosion Chemistry and Anti-Corrosion Technology", 1990, p. 88), as shown in Table of corrosion potential ranks in FIG. 18, since aluminum is extremely sensitive to electrical corrosion, aluminum will produce an initiator for surface contamination leading to functional degradation of membrane surface without making surface treatment.

When using a high heat conductor made of conductive resin or carbon fiber to prevent the characteristic impairment property of metallic conductive porous structure, vapor deposition, plating, one-surface removal after plating or other treatment (for example, sand blasting) can form a high heat conductive surface and a low heat conductive surface together.

Application of these methods are considered to be able to manufacture a high heat conductive separation membrane itself.

Selection of a high heat conductive porous structure excellent in electrical conductivity for the essential portion of the porous structure can expect good cooling effect, while selection of a low heat conductive porous structure poor in electrical conductivity can expect good insulation effect.

Design of a heat insulation-oriented porous structure utilizing intermediate characteristics of the above selections can be made as follows: (1) As described above, a high conductive substance exists as core, the treated surface of passive processed membrane is exposed to the cooling surface, and an electrically non-conductive substance generally poor in heat conductivity exists on the surface; or (2) the relation between the core portion and the surface treatment is reversed.

In these days, since hollow strings have been able to be manufactured inexpensively, these strings may be used in the core portion, particularly when heat insulation is highly emphasized.

However, temperature change in the chamber space and in the space in between the porous structure and the membrane depends on membrane and porous structure as well as chamber wall in the chamber space, and the temperature change in the space between the porous structure and the membrane has a strong tendency depending on the membrane and the porous structure. Further, actually, the temperature change is affected by heat of vaporization, that is, heat capacity loss following the diffusion of transport gas, and heat capacity accumulation in the condensation or coagulation of transport gas.

Considering operatives or stressors for membrane, chamber wall, and porous structure, the most influential are mass, density and heat conductivity.

Among these constituting elements such as membrane, chamber wall, porous structure and chamber gas, the most influential may be chamber wall, assuming that it must belong to the largest mass.

Figure 19:
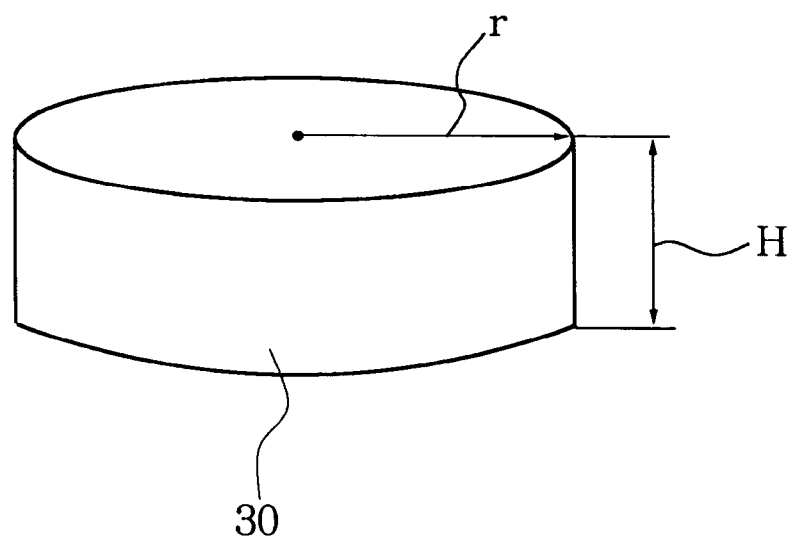
FIG. 19 is a schematic diagram showing the relation between chamber wall and membrane.
Figure 27:
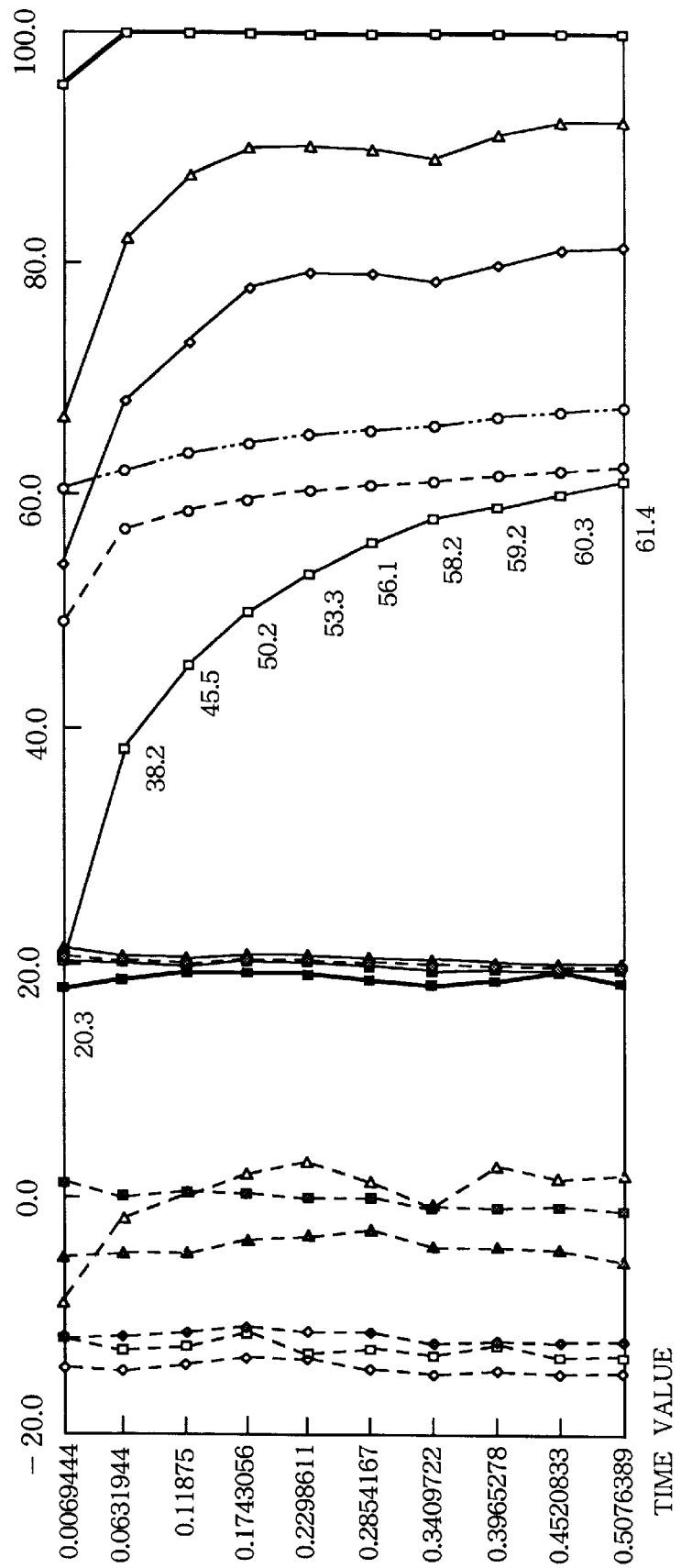
FIG. 27(a) is a table showing measurement results such as the temperature, humidity and surface voltage at each part when the moisture starts from 20% in the box and over 95% at the outside atmosphere, with three conductive porous structures respectively set at the chamber side inside the first membrane, at the chamber side outside the second membrane and at the chamber side outside the third membrane.
FIG. 27(b) is a graph representing the above prior art table data.
FIG. 27(c) is an enlarged view showing temperature change in the prior art table.
Figure 27C:
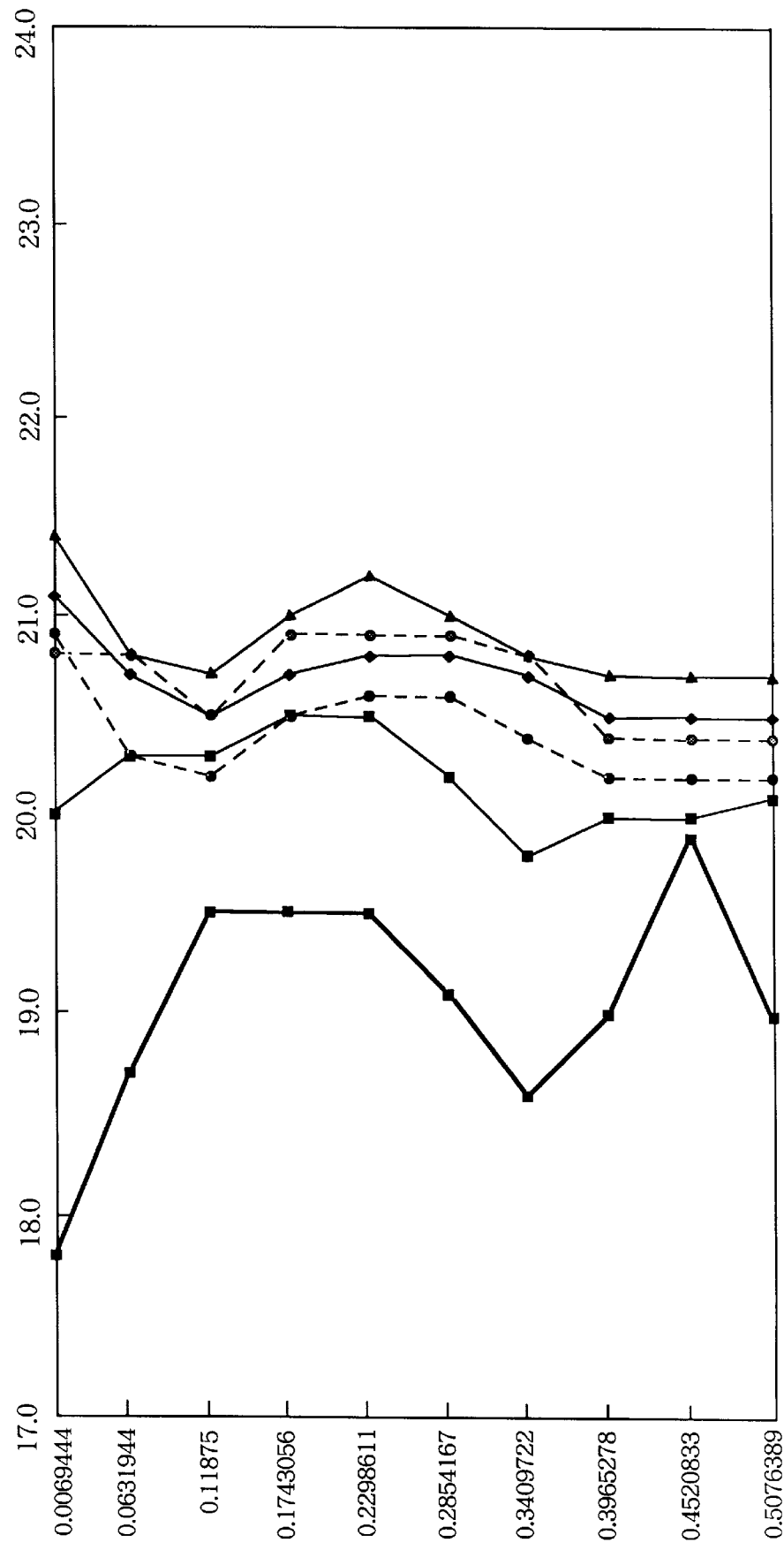
Figure 28:
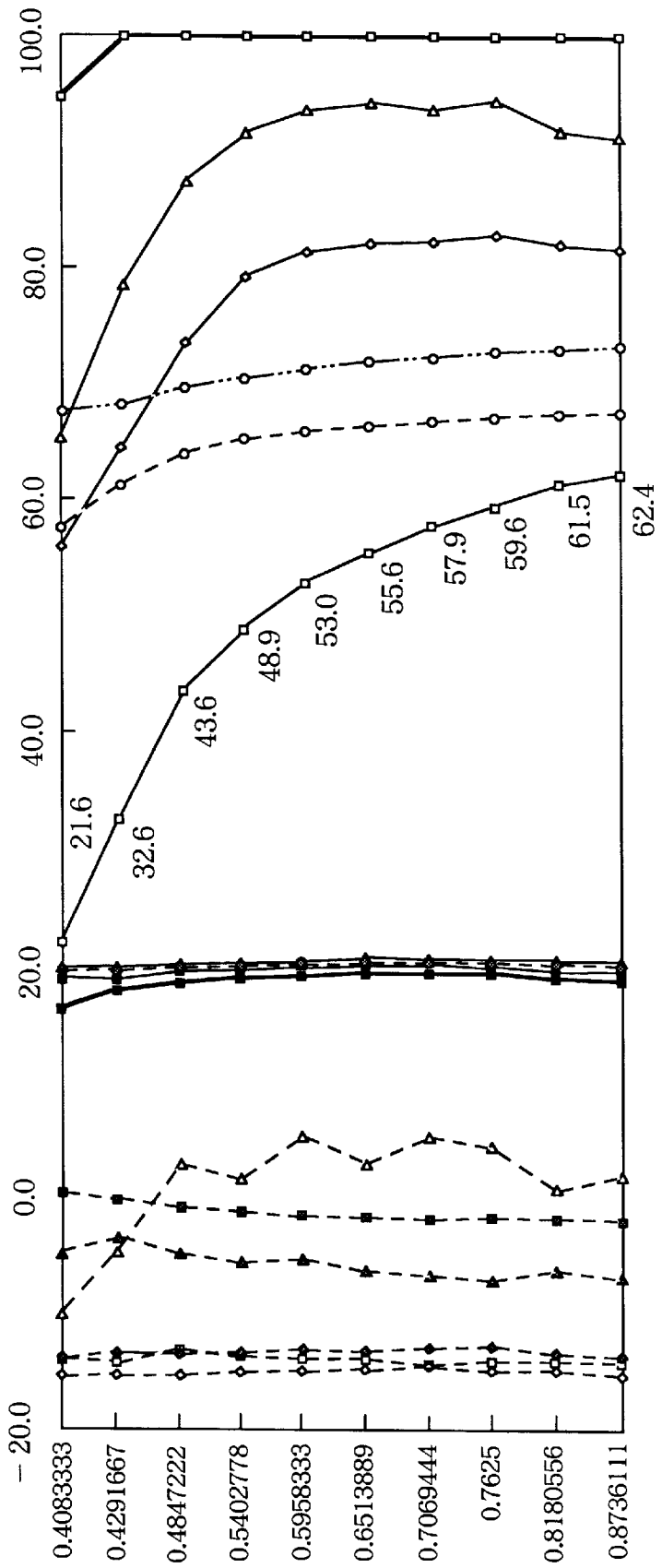
FIG. 28(a) is a table showing measurement results such as the temperature, humidity and surface voltage at each part when the moisture starts from 20% in the box and over 95% at the outside atmosphere, with the above three conductive porous structures in FIG. 27 where the porous structures 1 and 2 are grounded, and the porous structure 3 is not grounded
FIG. 28(b) is a graph representing the above table data
FIG. 28(c) is an enlarged view showing temperature change in the table.
Figure 28:
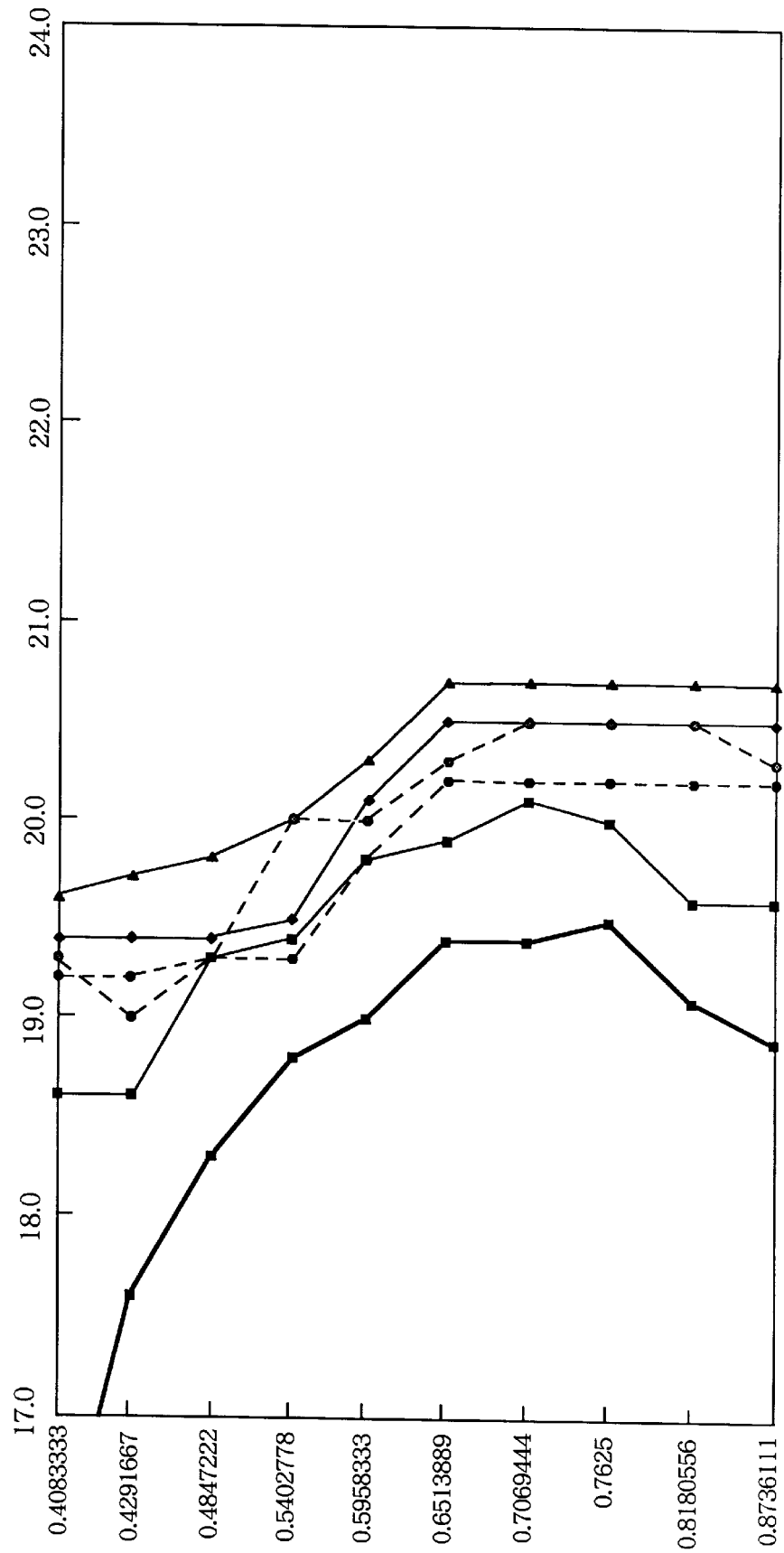
Figure 29:
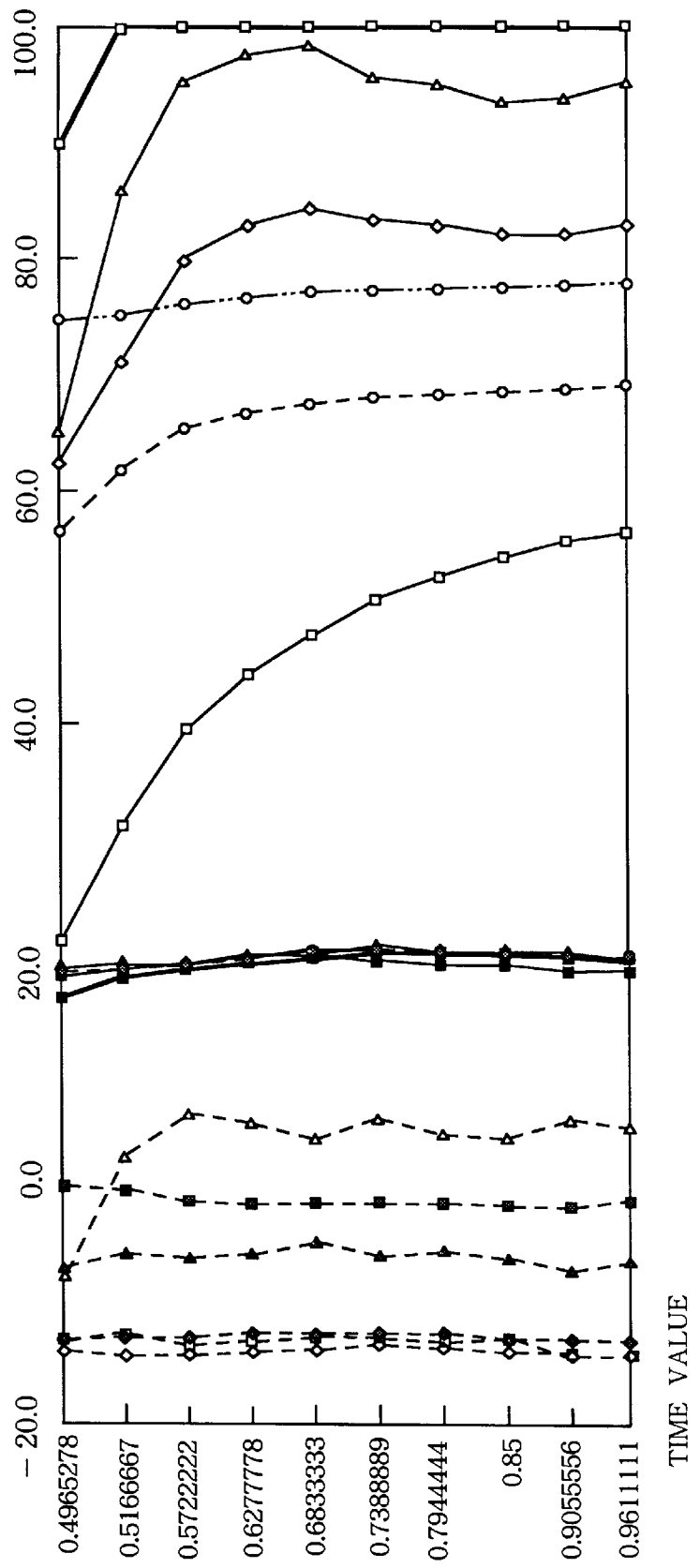
FIG. 29(a) is a table showing measurement results such as the temperature, humidity and surface voltage at each part when the moisture starts from 20% in the box and over 95% at the outside atmosphere, with the above three conductive porous structures in FIG. 27 where the porous structure 1 is grounded, and the porous structures 2 and 3 are not grounded.
FIG. 29(b) is a graph representing the above table data
FIG. 29(c) is an enlarged view showing temperature change in the table.
Figure 29:
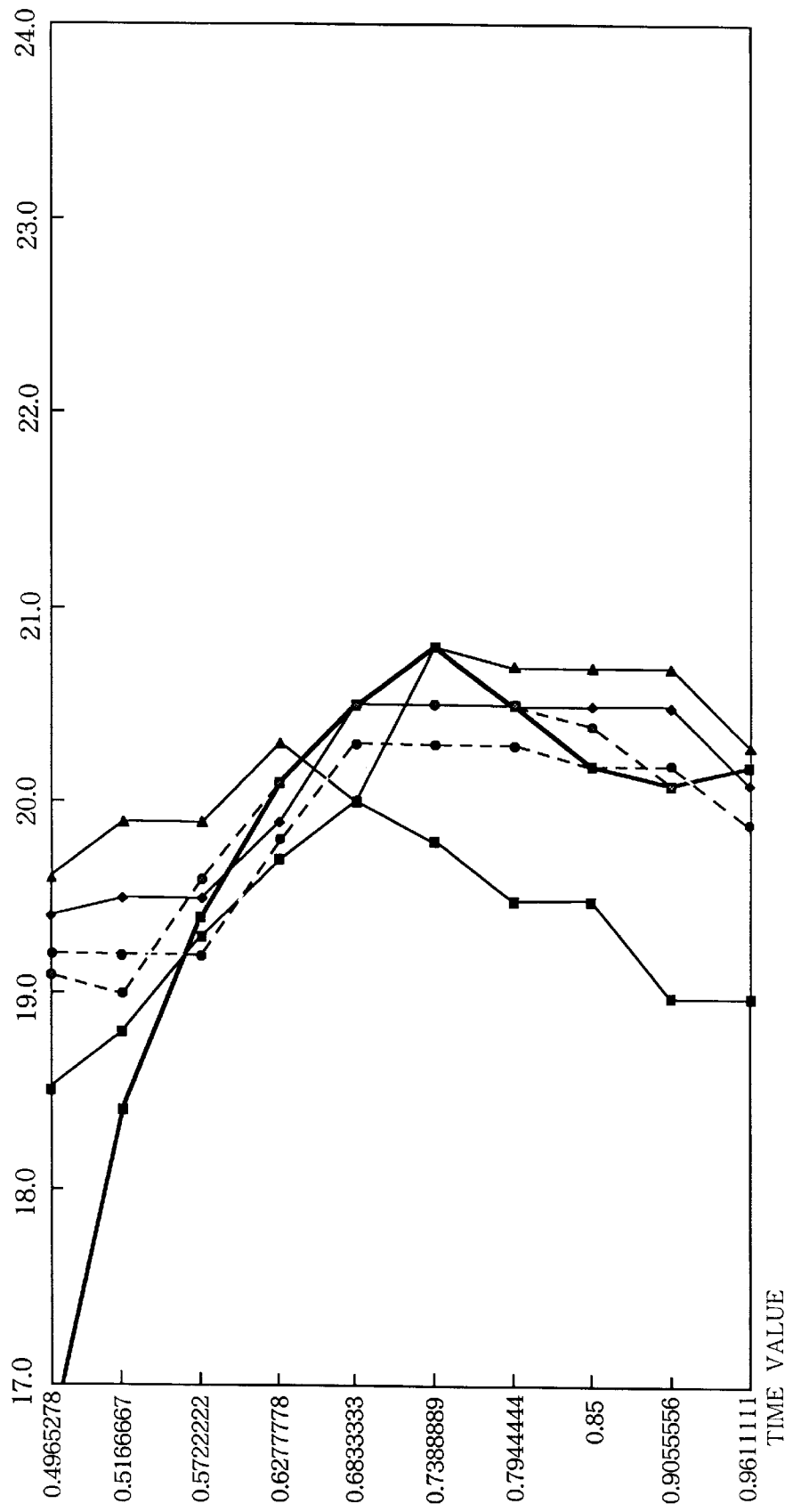
Figure 30:
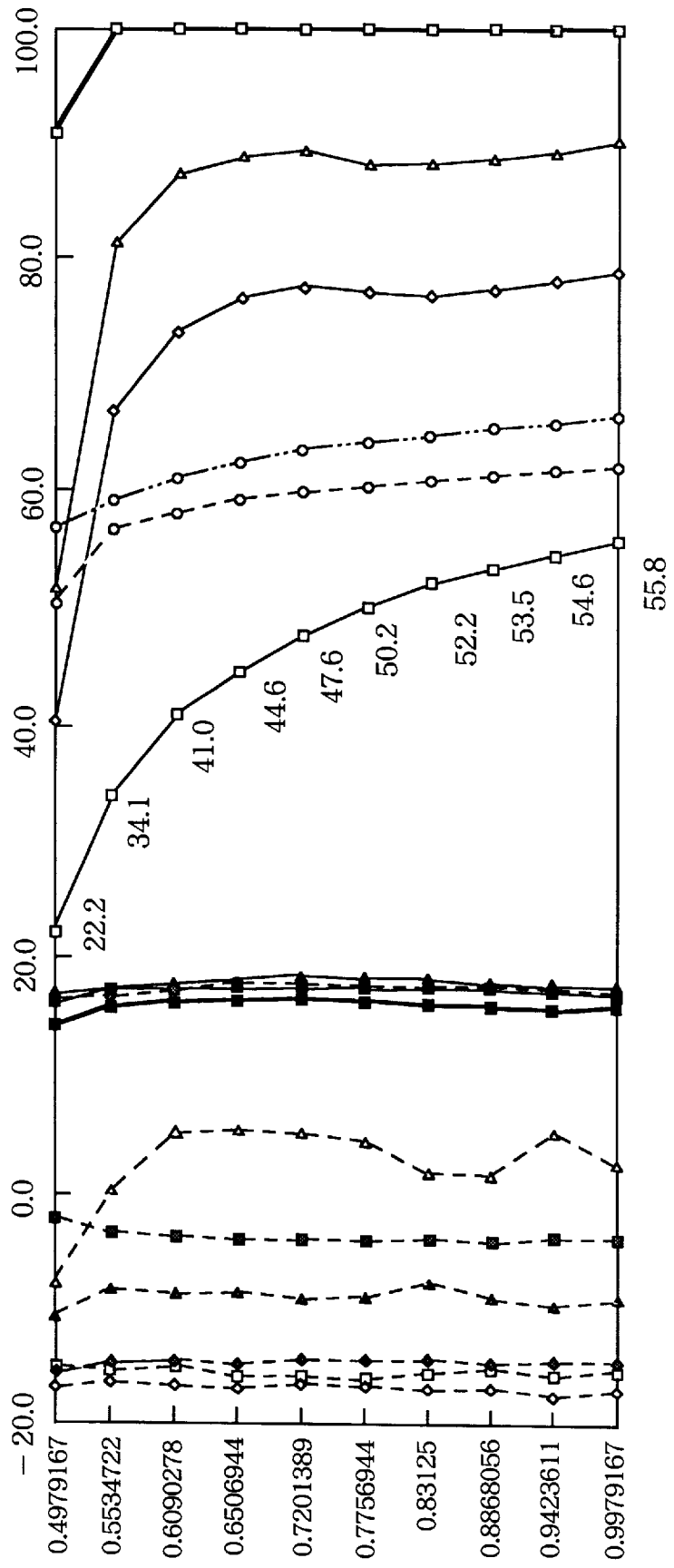
FIG. 30(a) is a table showing measurement results such as the temperature, humidity and surface voltage at each part when the moisture starts from 20% in the box and over 95% at the outside atmosphere, with the above three conductive porous structures in FIG. 27 where the porous structure 1 is grounded, and the porous structure 2 is connected to the porous structure 3.
FIG. 30(b) is a graph representing the above table data.
FIG. 30(c) is an enlarged view showing temperature change in the table.
Figure 30:
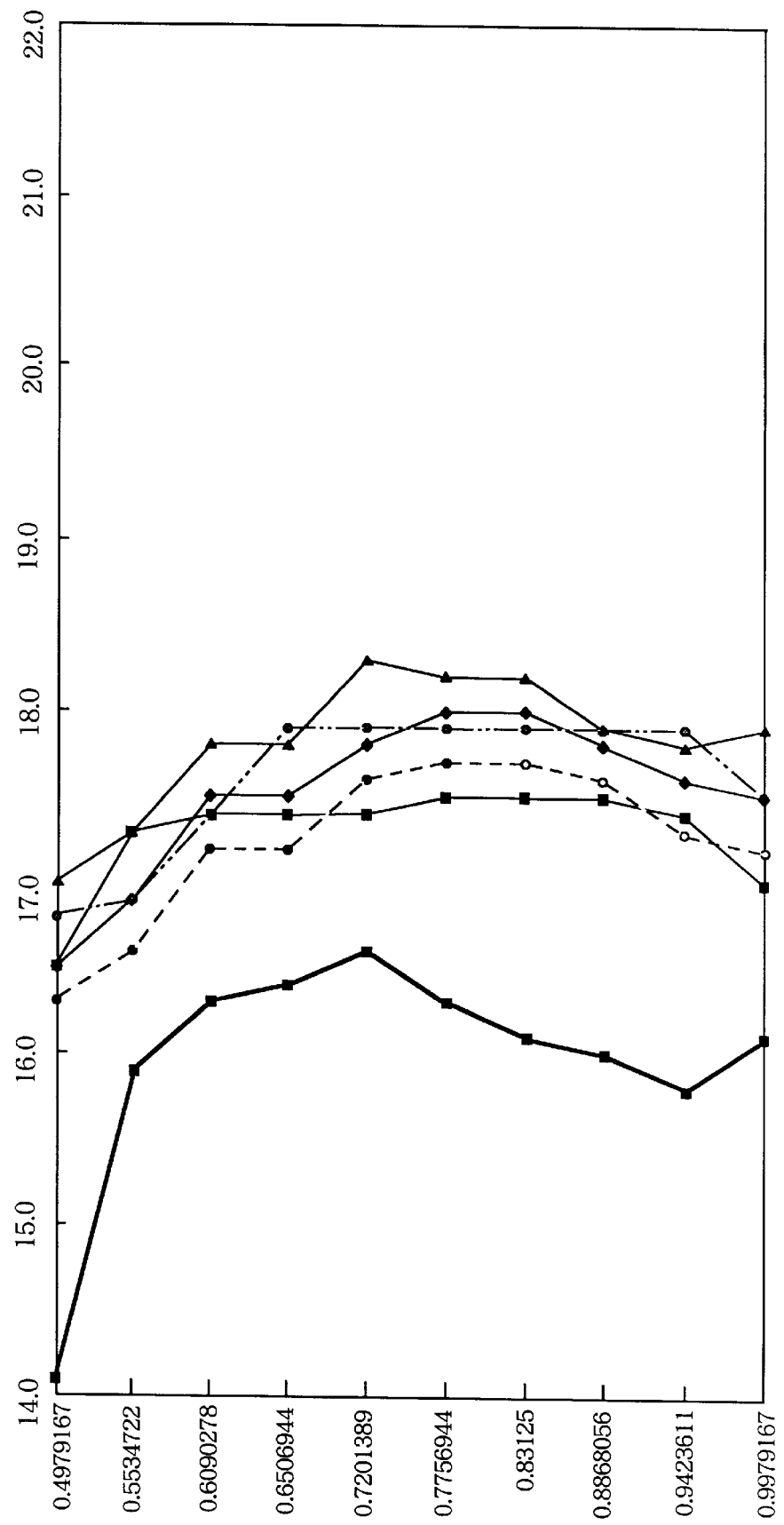

Now, consideration will be made for the relation between chamber wall area and membrane area forming the chamber 30, referring to FIG. 19:

| | | |
|---|---|---|
| Membrane area | $Sm = \pi r^2$ | (1) |
| Membrane area in chamber cavity | $Smt = 2Sm = 2Sm$ | |
| | $= 2\pi r^2$ | |
| Outer periphery of membrane | $L = 2\pi r$ | |
| Chamber wall area in chamber cavity | $Sc = 2\pi r \times H$ | |
| | $= 2\pi rH$ | |
| Surface area of total chamber cavities | $St = 2Sm + Sc$ | |
| | $= 2\pi r^2 + 2\pi rH$ | |
| | $= 2\pi r(r + H)$ | |
| Volume of chamber cavity | $V = Sm \times H$ | |
| | $= \pi r 2H$ | |

When membrane area is larger than chamber wall area in chamber cavity $$Smt = 2\pi r^2 > Sc = 2\pi r \times H = 2\pi rH$$

When membrane area is equal to chamber wall area in chamber cavity $$Smt = 2\pi r^2 > Sc = 2\pi r \times H = 2\pi rH \qquad (2)$$

When membrane area is smaller than chamber wall area in chamber cavity $$Smt = 2\pi r^2 < Sc = 2\pi r \times H = 2\pi rH$$

$$Smt = 2\pi r^2 = Sc = 2\pi r \times H = 2\pi rH \qquad (2)$$

$2\pi r^2 = 2\pi rH$ Divide both sides by $2\pi r$ $r = H$

From equation (2), when r is equal to H, membrane area in all chamber cavities becomes equal to chamber wall area in chamber cavity. In this case, since r=H, substituting r for H in Equation (1) obtains surface area of total chamber cavities $$\begin{aligned} St &= 2Sm + Sc \\ &= 2\pi r^2 + 2\pi rH = 2\pi r(r+H) = 2\pi r(r+r) = 2\pi r \times 2r \\ &= 4\pi r^3 \text{ or } = 2\pi H(H+H) = 2\pi H \times 2H = 4\pi H^3 \end{aligned}$$

This relation is also the condition at which the surface area of straight column with a constant volume has the minimum surface area. Assuming the volume is $ra^3$, the surface area S becomes as follows: (where radius of the bottom face of the straight column is x, and the height is y)

$$S = 2\pi x^2 + 2\pi xy \qquad (3)$$

From $\pi x^2 y = \pi a^3$, substituting $a^3/r^2$ for y in Equation (3) obtains following equation:

$$S = 2\pi(2x - a^3/x^2) = 4\pi/x^2(x - a/2) \text{ Then, } y = 4^{-3}a = 2/2^{-3}xa$$

Therefore, when the diameter of the bottom face is equal to the height, the surface area becomes minimum.

When the efficiency of the heat conduction at the surface to a substance in the space inside of chamber is equal, a relation taking the ratio of the area into consideration may be brought into existence, but, since actually vaporization or coagulation takes place at the membrane portion so as to produce a significant temperature change, such comparison must multiply a constant to respective area values.

Further, in this case, since two sheets of membranes forming one chamber have a configuration in which equal temperature relation does not exist, simple comparison may not be performed at the membrane surface, so that an arrangement in accordance with the average specific heat capacity of general structural materials and an order in arrangement in accordance with a difference in heat conduction speed should be taken into consideration.

To sum up, it is necessary to satisfy the relation between the average specific heat conductivity and the heat conductivity considering the chamber temperatures to which membranes are subject, so as to stabilize temperature inclination. Refer to FIGS. 20–26 (Sangyo Tosho: "Transport Phenomena", 8th edition, pp. 317–323) In this case, as a method in which sectional temperature is changed so as to use the differential of this temperature variation as an index of the variation due to fluid or gas temperature at the surface portion, direct observation with ultra red camera has been taken, which will help to back up the final design material for confirmation of performance.

Field Adjustment Means

The results of a series of G test (test of grounded mesh) showed that the humidity adjustment of the outer chamber was most important as a means for suppressing, for example, a dehumidification effect in a dehumidifier, or a reverse flow phenomenon from the outer atmosphere to the box.

Further, it has been already identified that in relation to operational effect of grounded conductive porous structure, primarily, since not only the grounded conductive porous structure is easy to be dried, but also, when copper mesh is used for the conductive porous structure to be set close to the same membrane surface due to its good heat conductivity of metal, the temperature of the near membrane surface tends to be homogenized, thereby resulting in homogenization in the diffusion direction on the same membrane surface.

Figure 31:
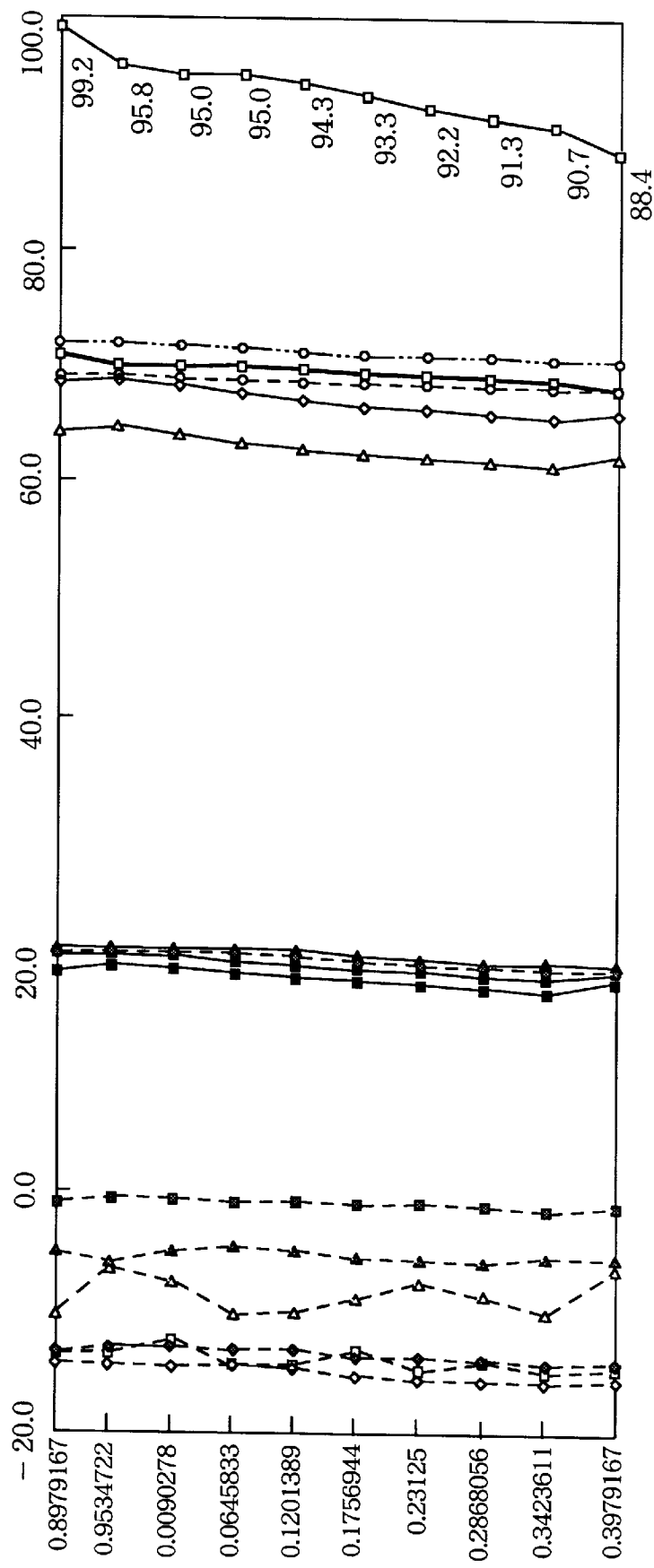
FIG. 31(a) is a table showing measurement results such as the temperature, humidity and surface voltage at each part when the moisture starts from 100% in the box and about 60% at the outside atmosphere, with the above three conductive porous structures in FIG. 27 where the porous structure 1 and the porous structures 2 are grounded, and 3 is not grounded.
FIG. 31(b) is a graph representing the above table data
FIG. 31(c) is an enlarged view showing temperature change in the table.
Figure 32:
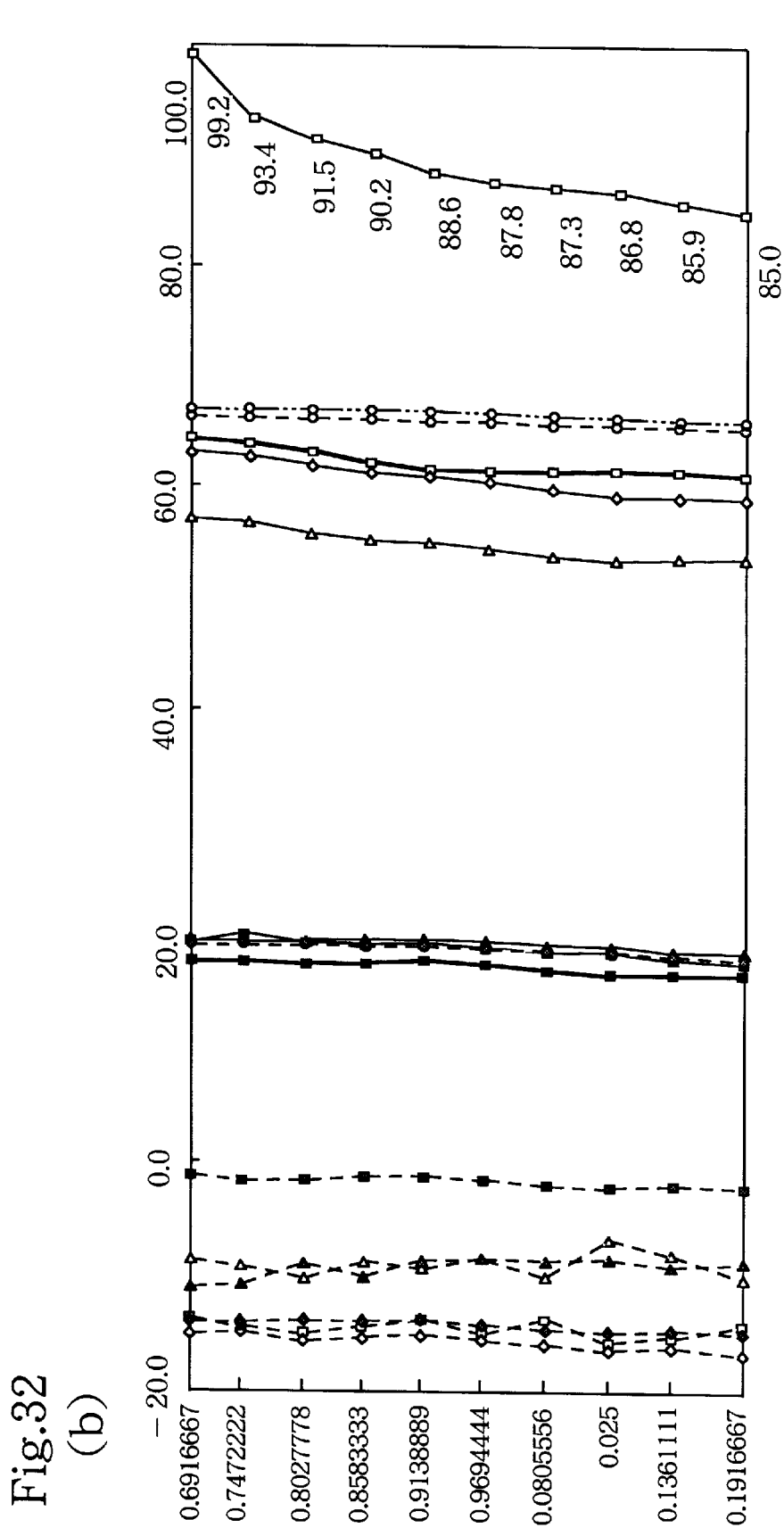
FIG. 32(a) is a table showing measurement results such as the temperature, humidity and surface voltage at each part when the moisture starts from 100% in the box and about 60% at the outside atmosphere, with the above three conductive porous structures in FIG. 27 where the porous structure 1 is grounded, and the porous structures 2 and 3 are not grounded.
FIG. 32(b) is a graph representing the above table data.
FIG. 32(c) is an enlarged view showing temperature change in the table.
Figure 32C:
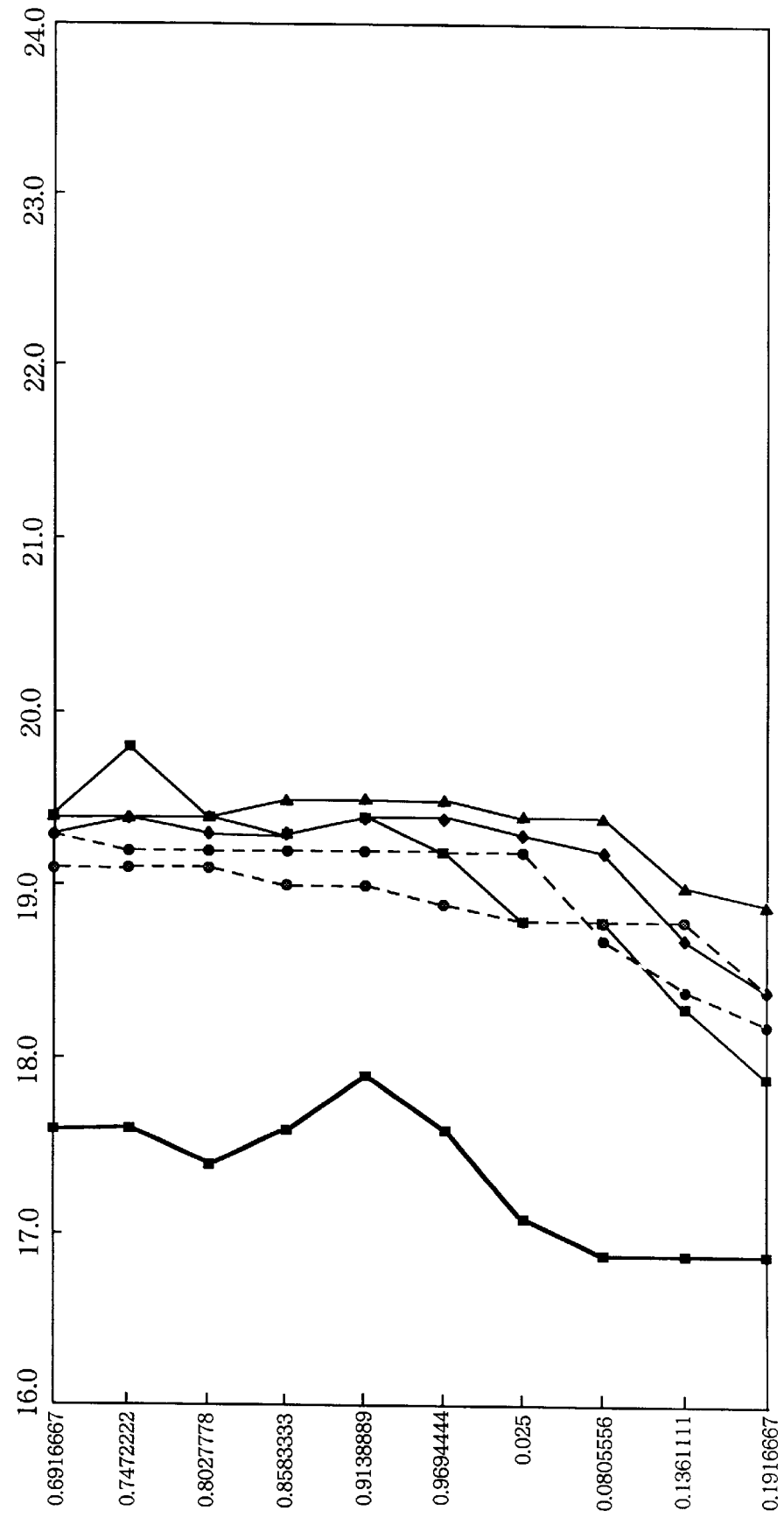
Figure 33:
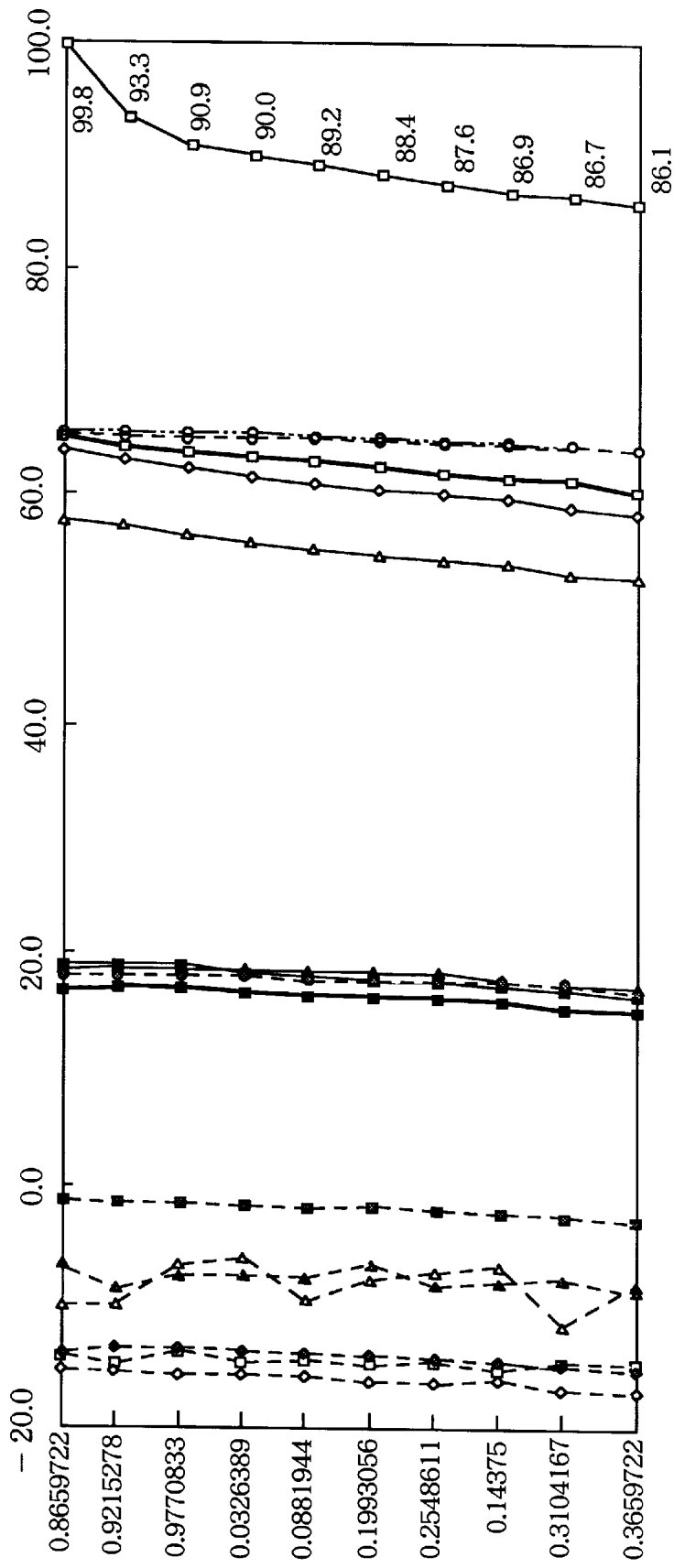
FIG. 33(a) is a table showing measurement results such as the temperature, humidity and surface voltage at each part when the moisture starts from 100% in the box and about 60% at the outside atmosphere, with the above three conductive porous structures in FIG. 27 where the porous structure 1 is grounded, and the porous structure 2 is connected to the porous structure 3.
FIG. 33(b) is a graph representing the above table data
FIG. 33(c) is an enlarged view showing temperature change in the table.
Figure 33:
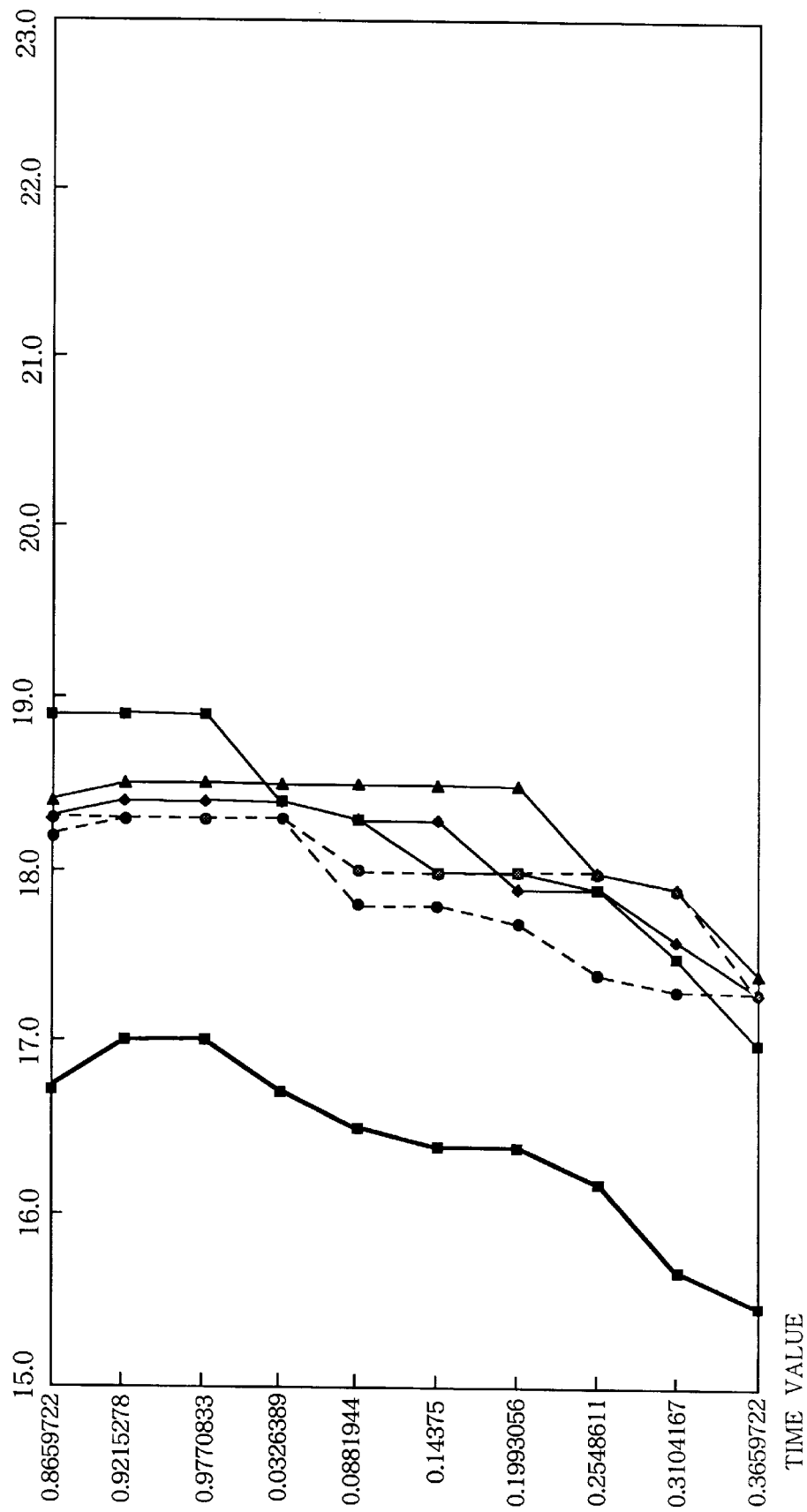
Figure 36:
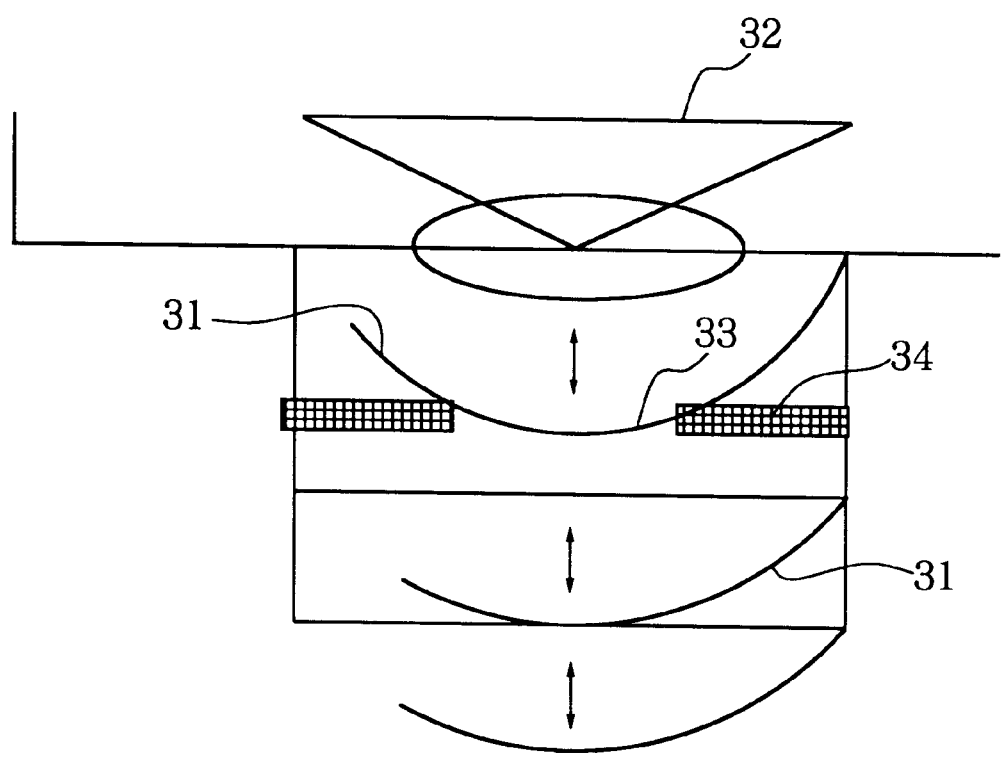
FIG. 36 is a schematic illustration showing oscillation of uniform membrane portions due to sound pressure and an orifice for enlarging chamber wall portion.

Refer to the graphs shown in FIGS. 27–30(*a*), (*b*) and (*c*).
Refer to FIG. 10.
Refer to the graphs shown in FIGS. 31–33(*a*), (*b*) and (*c*).

The series of the G test resulted in confirmation that, as described in this application, the grounded conductive porous structure would bring about the stabilization of dehumidifying operational effect, and further, suggested that an action caused by field generation might be a slight field effect, but very effective.

To sum up, the humidity adjustment in the outer chamber was found as one of the most important factors of effect determination in this invention. Further, it was found that the measurements of surface voltage in the very membrane configuration to form the outermost chamber of the outer chambers tended to be most variable.

Because of the necessary orientation of the water repellent surface toward the side of outer atmosphere, the surface voltages of these membranes have a relative relation that the box side and the outer atmosphere side of the same membrane are respectively of positive and negative polarity. The three membranes tested for the embodiments showed a common orientation.

As with the surface voltage at the outermost membrane, because the water repellent surface exists in the direction of outer atmosphere and the non-water repellent surface exists in the direction of outer chamber, the surface voltage at the side of outer atmosphere was supposed to have a relatively stable surface voltage. But, the measurements of the surface voltages showed that, when the humidity of outer atmosphere reached 100% so as to be fog-covered, the membrane surface changed into wet or moist condition This may be contributed by a temperature drop phenomenon in the water repellent surface, but, the previous literature described that, the electrification inclination of water vapor might run either to positive or negative polarity, thus resulting in various electrification conditions in accordance with the situation, and further that even when droplets were produced, such result was expected.

Therefore, since water vapor or passing gas is subject to an influence of electrification due to the field activated by a feeble surface voltage on the water repellent surface, there may arise a limitation to the total magnitude of a force displayed to remove the water vapor or passing gas from the membrane surface, so that the display of conductivity by water particles, which results in an excitation of reverse field inclination on the surface, is further enhanced, together with the generation of temperature environment in vicinity of a dew point as well as with temperature drop and other phenomena by the attachment of water droplets. As the result, coagulation phenomenon at the surface is considered to be accelerated. Such relation is a phenomenon arising not only in the water repellent surface of the outermost membrane but also in all membrane surfaces.

Further, in the case of wet condition in such a water repellent surface, a phenomenon of reverse polarity of absolute values are measured also in the opposite field.

Therefore, with the G test, in the case of copper conductive porous structures to be set successively to the inner chamber side of the first membrane, the outer chamber side of the second membrane and the outer chamber side of the third membrane from the chamber side of the box, when all the porous structures are grounded, dehumidification drop speed is very fast, and reverse flow phenomenon from the outer atmosphere to the box side is also fast, so that inconvenient cases may be anticipated to maintain low humidity inside the box.

Now, comparison will be made for the case where the first and second membranes but the third membrane are grounded and the case where only the first membrane is grounded: The comparison showed the following facts:

(1) Both cases significantly affected the temperature in each chamber portion; (2) The dry-prone grounded conductive porous structure easily generates temperature drop: (3) The non-grounded conductive porous structure, which went over the limitation of its essential heat capacity or mass, is weak in temperature adjusting feature, thus resulting in wet environment in vicinity of the conductive porous structure under a wet condition over a certain degree.

Therefore, in the case when each copper conductive porous structure is respectively placed at the inner chamber side of the first membrane, at the outer chamber side of the second membrane and at the outer chamber side of the third membrane, in consideration that, because of a fast-heat-conductivity and electrically conductive porous structure being located at the side of the outer chamber, a reverse flow phenomenon tends to take place from the outer atmosphere to the box side, non-grounded conductive porous structures which went over the limitation of their own essential heat capacity or mass may be poor in temperature adjustment capability, and as the result, the vicinity of the conductive porous structures may tend to be wet and moist under a wet environment over a certain degree. Therefore, making most of the above facts, a preferable field regulation means can be conceived of With the transport of heat capacity in the separation system, a change in the heat capacity evolves by the transfer of its initial heat capacity assisted by a high transport speed of water vapor.

And, then, a gradual temperature change of the box or the chamber wall will follow nearly in accordance with the change in heat capacity of the water vapor.

Therefore, it is considered that, when (1) adjustment is made so as to have a stable transfer of the most important factor or heat capacity in the initial stage of temperature change at every portion, and (2) heat conduction in the separation module structural components completely or nearly match the stable heat capacity transfer, a most stabilized temperature gradient can be obtained.

Accordingly, in the case when water vapor transport speed is to be suppressed, particularly when reverse flow phenomenon from the outer atmosphere side to the box side is to be suppressed, the embodiments of the dehumidifier according to the invention has demonstrated that: Blocking of membrane hole portions by water can make the transport speed of water vapor slower than the reverse flow speed by the water vapor. Therefore, to make an effective blocking of the hole portions at the outermost membrane, and to accelerate dehumidification effect while preventing resulting loss, (1) non-grounded conductive porous structure is placed at the outer chamber side of the third membrane, as well as (2) an electrical connection to reflect this field polarity to the second membrane is made to the conductive porous structure at the outer chamber side of the second membrane, so as to have a sharp striking reflection of the change state of the third membrane portion to the one of the second membrane portion. In short, because mutual adjustment of the field state can be successfully obtained by the field intensity of the third membrane portion, the reverse flow phenomenon from the outer atmosphere side to the box side can be effectively adjusted.

Further, to have a successful dehumidification effect at that time, and to prevent the transport phenomenon from being suppressed by an useless electrification of water vapor, the grounded conductive porous structure (s) is set to the inner chamber side of the first membrane.

Such means may be useful as an automatic adjustment means to follow field change in the outer atmosphere. But, fundamentally speaking, introduction of a reverse polarity of substance may suffice to minimize the generation of irregularity in the temperature gradient.

Essentially, the followings are the satisfactory conditions for that:

(1) The porous structure at the outer chamber side of the outermost (third) membrane is non-conductive; and (2) The third porous structure should have a heat insulation characteristics enough to prevent irregularities in temperature gradient/inclination between the first membrane portion and the second membrane portion as well as the inner chamber side.

Now, a molar flow flux caused by thermal diffusion can be given as follows:

$J_{AY}^{(T)} = -J_{BY}^{(T)}$ $10 = -p/c\, M_A\, M_B\, XD_A^{(T)}\, d\ln T/dy = -cD_{AB}K_7\, d\ln/dy$ $D_A$: Thermal diffusion coefficient of component A $k_7 = (p/c^2\, M_A\, M_B)(D_A^{(T)}/D_{AB})$: Thermal diffusion ratio $M_A$: Molecular weight of component A $M_B$: Molecular weight of component B $p = p_A + p_B$: Density $p_A$: Mass density of component A $P_B$: Mass density of component B c: Molar concentration Therefore, as shown in the table cited in FIG. 34 (Sangyo Tosyo: Transport phenomena, 8th edition), separation in accordance with thermal diffusion ratio matching the temperature gradient relation can be performed. With the two components contraposed in the two-components table, respective separation membrane surfaces are set against each other, depending on their affinity or non-affinity, so as to maintain a temperature relation in accordance with the aforementioned temperature gradient relationship, thereby obtaining a high-efficiency separation refining. For example, in the separation of rare gas or heavy water, an extremely effective high-efficiency separation may be expected, and in the heavy water separation process, for example, even a $H_2O$—HDO—$D_2O$ system may be separated.

An arrangement of catalytic reaction system in this separation process can achieve a temperature gradient making most of the reaction temperature. This means can enhance the separation refining efficiency, by (1) contraposition substances with affinity or non-affinity for each kind of component to both surfaces of the separation membranes; and (2) arranging them at positions without contradiction with the temperature gradient relation, as well as (3) maintaining temperatures adaptable to the thermal diffusion ratio in the separation module. A heat dissipation and a sheet-like heat generator can be provided at the outer periphery of the chamber wall portion or inside of the chamber wall so as to accelerate the generation of temperature gradient.

Conventionally, heavy water has been separated bit by bit using the plural stages of column with a high temperature of column top and a low temperature of bottom. Contrary to the conventional device (Clusius and Dickel column), this method according to the present invention can separate effectively but gradually re-inclusions after diffusion separation process in a differential-acting separation membrane portion using the differential generated by thermal diffusion ratio, thereby succeeding in miniaturization of the system.

With heavy water, it has been known that the aforementioned electrification phenomenon to be triggered by voltage inclination may not take place easily, and its electronegativity is also different. Using the electrolysis speed of heavy water fractional to the one of light water, and making most of the fact that the aforementioned intensification of the electrification of the chamber wall portion and the separation membrane portion can create a difference in permittivity, so as to make the transport speed slower, plural stages of separation process similar to the reverse permeation phenomenon can be achieved in the chamber portion and the membrane portion at a relatively reasonable cost.

Because of its easy absorption of water in the air, heavy water can generate HDO while accompanied by a feeble thermal reaction.

$H^2O + D^2O = 2HDO + 0.036$ kcal

The physical properties of mixtures in an $H^2O$—$D^2O$ system are changed linearly in proportion to their heavy water content.

Refer to the table in FIG. 35 (Kyoritsu Publishing Co.: Chemical Dictionary, 4th volume, 23rd printing).

Among these physical properties, it is recognized that there is a significant difference in the temperature at which the maximum density is obtained, so that this characteristic must be fully exploited, so as to produce the aforementioned molar flow flux difference caused by thermal diffusion, and to adjust the separation membrane portion to the temperature which can achieve the most suitable maximum density with plural stages. Therefore, taking advantage of the properties of low-permittivity heavy water, the aforementioned model suffices to have the concentration side at the box side (non-water repellent surface side) as well as to have the box side placed in the cooler direction.

With vaporization heat too, there may be a significant difference identified between them, but the difference is not so large, so that separation in such a system must be subject to a strict temperature control. Required are several means such as control by water circulation of the thermal insulation cavities of the module; surface treatment of the chamber insulation cavity side for radiation heat adjustment: and surface treatment of the chamber side for surface radiation heat adjustment.

In this case, since non-metallic surface treatment easily produce oxidation or other electro-chemical reactions, surface coating treatment using gold, platinum or other rare metals should be carried out.

The portions subjected to the surface treatment suffice to be arranged at positions which do match with the measurements of the afore-mentioned embodiments.

The poor reactivity of heavy water restricts its application mainly to water to be used for preventing the intrusion of impurities during the separation process.

The geometry of the porous structure like a windbreak fin which may reject droplets is extremely useful, from the standpoint of the minimization of droplet settlement and an effective transfer speed of heat of vaporization In an oscillation system, the uniform vertical movement of the membrane portion cannot be completely suppressed, so that a projection toward dehumidification direction must be provided at the membrane portion. This projection obtains such a deformation suppression effect as shown in FIG. 36, and the stable maintenance of the function of the membrane portion 31 can be obtained as the results of the maintenance of the hole portion geometry. As the oscillation source 32, applied are a vibrator with coil, an oscillator, a mechanical vibrator such as motor-driven vibrator.

In this case, a drooping partial spherical surface 33 can not only resist a deformation of the membrane hole portion under vibration, but also apply a constant directional pressure thanks to its gravity even in the transport direction of gas.

Further, a design on a vibration engineering basis can be easily made because of the stable motion elements. Further, in this case, this partial spherical surface 33 has a shape near to the one matching the propagation pattern of sound wave, so that a uniform sound pressure can be easily applied to the membrane surface Refer to FIG. 37 (Corona Co. Ltd.: "Acoustic Engineering of Mechanical System", 1st printing, p 124)

Provision of a hydraulic orifice 34 to the chamber wall portion in a ring shape in consideration of echo may result in suppression of reverse directional vibration phenomenon caused by the echo, stabilization of convection phenomena, and an increase in the surface area, thus enhancing the influence of gas in the chamber caused by the chamber wall temperature. Therefore, this provision of the hydraulic orifice is advantageous for the stabilization of the temperature gradient in the separation process.

Of course, this ring-shaped orifice should bear a geometry similar to temperature inclination to be produced in accordance with temperature gradient (excepting that it should not produce hydro-dynamic turbulent flow). Further, its connection portion should be finished into smooth curved surface, so as to have a residual-proof geometry for water or liquid droplets like the afore-mentioned windbreak net. In this connection, the target to be vibrated may be limited to the chamber structures, so as to vibrate the chamber and the membrane.

An orifice (which may increase the surface area)

The schematic diagram is obtained by drawing a geometry which will not interfere with the fluid flow at a position which can achieve silencer effect in the reflective sound.

Further, the orifice may help to homogenize the propagation of sound pressure to the next membrane.

As described above in detail, the separation module with an anti-static device of the present invention has the afore-mentioned configuration, so as to make the total dimensions as small as possible.

The separation module with an antistatic device has a high separation efficiency which can maintain processing speed and enhance the total throughput efficiently, so as to make the total dimensions as small as possible.

The separation module with an antistatic device has a high separation efficiency which can suppress the reentry of impurities, so as to make the total dimensions as small as possible.

The separation module with an antistatic device can apply a uniform sound pressure to membrane surface, stabilize convection phenomenon in the chamber, and increase the surface area of the chamber cavities, so as to have a stabilized temperature gradient and a low level of sound pressure, thereby resulting in the minimum total dimensions.

The separation module with an antistatic device can have a separation process in which not only the thermal diffusion speed differential between the separation substance (extractions) and impurities is fully utilized but also the Knudsen diffusion direction in the membrane hole space due to the heat of vaporization in the membrane portion can be stabilized, thereby resulting in a leap forward of refining efficiency of purity of target substance with less processings, so as to make the total dimensions as small as possible.

What is claimed is:

1. A separation module comprising:

a cylindrical casing installed at a wall of a moisture-proof and drip-proof box so as to form a gas passage communicating the inside and the outside of said box;

a plurality of chambers formed in the gas passage by placing a plurality of mono-layered waterproof membranes having fine moisture-permeable through holes in said cylindrical casing at intervals of spacing; and conductive porous structures disposed in proximity of said waterproof membranes; and the longitudinal section in the solid portion around the holes of said conductive porous structures being formed into an essentially egg shape, and the acute angle side of the egg shape longitudinal section of said conductive porous structure being disposed so as to be directed to the waterproof membrane side.

2. A separation module with an antistatic device as claimed in claim 1, wherein the distance between said waterproof membrane and said conductive porous structure facing each other has the same length as the diameter of the holes.

3. A separation module with an antistatic device as claimed in claim 1, wherein said conductive porous structure has connection to an earthed circuit, and to electrical field intensifying and adjusting means of the local portion of a said waterproof membrane disposed in proximity of said conductive porous structures.

4. A separation module with an antistatic device as claimed in claim 1, wherein oscillating means for said waterproof membranes and gas in said chamber is provided, and projections are formed around the inner wall of said chamber.

5. A separation module with an antistatic device as claimed in claim 1, wherein setting means is provided for temperature gradient by making most of a differential setting the diffusion velocity due to thermal diffusion.

* * * * *

UNITED STATES PATENT AND TRADEMARK OFFICE
CERTIFICATE OF CORRECTION

PATENT NO : 6 059 862
DATED : May 9, 2000
INVENTOR(S) : Kunitaka Mizobe, et al.

It is certified that error appears in the above-identified patent and that said Letters Patent are hereby corrected as shown below:

Column 22, line 54; after "for" insert ---setting the---.

Column 22, lines 55 and 56; after "differential" delete ---setting the---.

Signed and Sealed this

Seventeenth Day of April, 2001

Attest:

NICHOLAS P. GODICI

Attesting Officer    Acting Director of the United States Patent and Trademark Office